(12) United States Patent
Xin et al.

(10) Patent No.: US 12,520,239 B2
(45) Date of Patent: Jan. 6, 2026

(54) INFORMATION TRANSMISSION METHOD BASED ON A MAPPING PERIOD, AN OFFSET, AND A BEAM

(71) Applicant: HUAWEI TECHNOLOGIES CO., LTD., Shenzhen (CN)

(72) Inventors: Tingyu Xin, Shenzhen (CN); Bingzhao Li, Beijing (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 319 days.

(21) Appl. No.: 18/165,082

(22) Filed: Feb. 6, 2023

(65) Prior Publication Data
US 2023/0189146 A1    Jun. 15, 2023

Related U.S. Application Data

(63) Continuation of application No. PCT/CN2021/085120, filed on Apr. 1, 2021.

(30) Foreign Application Priority Data

Aug. 6, 2020 (CN) .................. 202010785158.X

(51) Int. Cl.
*H04W 52/02* (2009.01)
*H04B 7/06* (2006.01)
(Continued)

(52) U.S. Cl.
CPC ..... *H04W 52/0219* (2013.01); *H04W 72/044* (2013.01); *H04W 72/121* (2013.01)

(58) Field of Classification Search
CPC .......... H04W 52/0219; H04W 72/044; H04W 72/121; H04W 72/232; H04W 72/30;
(Continued)

(56) References Cited

U.S. PATENT DOCUMENTS

2016/0095076 A1    3/2016 Xiong et al.
2017/0339723 A1    11/2017 Fujishiro et al.
(Continued)

FOREIGN PATENT DOCUMENTS

CN    102067636 A    5/2011
CN    109803297 A    5/2019
(Continued)

OTHER PUBLICATIONS

Ericsson, Additional paging transmission opportunities in NR-U. 3GPP TSG-RAN WG2 #106, Reno, USA, May 13-17, 2019, R2-1907588, 6 pages.
(Continued)

*Primary Examiner* — Harry H Kim
(74) *Attorney, Agent, or Firm* — HAUPTMAN HAM, LLP

(57) ABSTRACT

A method to resolve a problem of resource waste caused by a communication device listening to, on all listening occasions, information scrambled by using a first radio network temporary identifier RNTI. A network device determines a mapping period of a first RNTI, where in the mapping period, a beam and a listening occasion form a mapping relationship, so that the network device sends, to a terminal device on a target listening occasion by using a target beam, information scrambled by using the first RNTI. The terminal (Continued)

device receives, on the target listening occasion by using the target beam, the information scrambled by using the first RNTI.

20 Claims, 10 Drawing Sheets

(51) Int. Cl.
| | |
|---|---|
| H04L 5/00 | (2006.01) |
| H04W 4/06 | (2009.01) |
| H04W 72/044 | (2023.01) |
| H04W 72/0446 | (2023.01) |
| H04W 72/121 | (2023.01) |
| H04W 72/232 | (2023.01) |
| H04W 72/30 | (2023.01) |
| H04W 76/28 | (2018.01) |

(58) Field of Classification Search
CPC ... H04W 4/06; H04W 72/0446; H04W 76/28; H04L 5/0053; H04B 7/0695; Y02D 30/70
See application file for complete search history.

(56) References Cited

U.S. PATENT DOCUMENTS

| | | | |
|---|---|---|---|
| 2018/0049060 A1* | 2/2018 | Fujishiro | H04W 72/30 |
| 2019/0110314 A1 | 4/2019 | Abedini et al. | |
| 2019/0261323 A1 | 8/2019 | Lee et al. | |
| 2020/0045569 A1 | 2/2020 | Seo et al. | |
| 2020/0053670 A1 | 2/2020 | Jung et al. | |
| 2020/0112941 A1 | 4/2020 | Yerramalli et al. | |
| 2020/0288506 A1* | 9/2020 | Lei | H04W 74/0833 |
| 2023/0164702 A1* | 5/2023 | Lee | H04W 52/32 |
| | | | 455/522 |
| 2023/0198713 A1* | 6/2023 | Grossmann | H04L 5/006 |
| | | | 370/329 |
| 2023/0209485 A1* | 6/2023 | Wei | H04W 56/0015 |
| | | | 370/503 |

FOREIGN PATENT DOCUMENTS

| | | |
|---|---|---|
| CN | 109803376 A | 5/2019 |
| CN | 110062461 A | 7/2019 |
| CN | 110121211 A | 8/2019 |
| CN | 110167036 A | 8/2019 |
| CN | 110475211 A | 11/2019 |
| CN | 110740025 A | 1/2020 |
| WO | 2020042783 A1 | 3/2020 |

OTHER PUBLICATIONS

3GPP TS 38.211 V16.2.0 (Jun. 2020), 3rd Generation Partnership Project; Technical Specification Group Radio Access Network; NR; Physical channels and modulation(Release 16), 131 pages.
3GPP TS 38.331 V16.1.0 (Jul. 2020), 3rd Generation Partnership Project; Technical Specification Group Radio Access Network; NR; Radio Resource Control (RRC) protocol specification(Release 16), 906 pages.
3GPP TS 38.213 V16.2.0 (Jun. 2020), 3rd Generation Partnership Project; Technical Specification Group Radio Access Network; NR; Physical layer procedures for control(Release 16), 176 pages.
3GPP TS 37.324 V16.1.0 (Jul. 2020), 3rd Generation Partnership Project; Technical Specification Group Radio Access Network; E-UTRA and NR; Service Data Adaptation Protocol (SDAP) specification (Release 16), 16 pages.
3GPP TS 38.212 V16.2.0 (Jun. 2020), 3rd Generation Partnership Project; Technical Specification Group Radio Access Network; NR; Multiplexing and channel coding(Release 16), 151 pages.
3GPP TS 38.214 V16.2.0 (Jun. 2020), 3rd Generation Partnership Project; Technical Specification Group Radio Access Network; NR; Physical layer procedures for data(Release 16), 163 pages.
3GPP TS 38.321 V16.1.0 (Jul. 2020), 3rd Generation Partnership Project; Technical Specification Group Radio Access Network; NR; Medium Access Control (MAC) protocol specification(Release 16), 151 pages.
3GPP TS 38.322 V16.1.0 (Jul. 2020), 3rd Generation Partnership Project; Technical Specification Group Radio Access Network; NR; Radio Link Control (RLC) protocol specification(Release 16), 33 pages.
3GPP TS 38.323 V16.1.0 (Jul. 2020), 3rd Generation Partnership Project; Technical Specification Group Radio Access Network; NR; Packet Data Convergence Protocol (PDCP) specification(Release 16), 40 pages.
International Search Report issued in corresponding International Application No. PCT/CN2021/085120, dated Jun. 24, 2021, 8 pages.
Chinese Office Action issued in corresponding Chinese Application No. 202010785158.X, dated Sep. 27, 2022, 16 pages.
Chinese Notice of Allowance issued in corresponding Chinese Application No. 202010785158.X, dated May 2, 2023, 5 pages.
Extended European Search Report issued in corresponding European Application No. 21853160.6, dated Dec. 5, 2023, pp. 1-8.

* cited by examiner

INFORMATION TRANSMISSION METHOD BASED ON A MAPPING PERIOD, AN OFFSET, AND A BEAM

CROSS-REFERENCE TO RELATED APPLICATIONS

This application is a continuation of International Application No. PCT/CN2021/085120, filed on Apr. 1, 2021, which claims priority to Chinese Patent Application No. 202010785158. X, filed on Aug. 6, 2020. The disclosures of the aforementioned applications are hereby incorporated by reference in their entireties.

BACKGROUND

A multimedia broadcast multicast service (Multimedia Broadcast Multicast Service, MBMS) or a multicast broadcast service (multicast broadcast service, MBS) is a service oriented to a plurality of terminal devices, for example, live streaming or scheduled program playing. A multicast transmission technology is a technology in which a base station simultaneously sends MBS service information to a plurality of terminal devices. In the conventional technology, a base station sends a broadcast beam to a terminal device in a beam sweeping manner, the terminal device selects, in a beam training manner, a beam with best signal quality for the terminal device, and a network device and the terminal device transmit information by using the selected beam, to achieve a best transmission effect.

In a current protocol, for an MBS service, a network device configures listening occasions of a plurality of terminal devices, and the plurality of terminal devices perform listening on the listening occasions, and decode corresponding downlink control information (Downlink Control Information, DCI) carried on a physical downlink control channel (Physical Downlink Control Channel, PDCCH), to obtain broadcast information. For a terminal device, listening is performed on a beam. However, in this case, the network device may not transmit information by using the beam, or a beam swept in this case is not a beam selected by the terminal device through beam training, and the terminal device cannot obtain information sent by the network device. All these reduce listening efficiency of the terminal device and cause power consumption of the terminal device, resulting in a waste of resources.

SUMMARY

Embodiments described herein provide an information transmission method and an apparatus, to improve information transmission efficiency in a communication system, and avoid as much as problems of power consumption and resource waste caused in response to a terminal device blindly listening to information on all listening occasions.

According to a first aspect, at least one embodiment provides a communication method. The method is performed by a network device or a chip in the network device. The following provides descriptions by using an example in which the method is performed by the network device.

The network device determines a mapping period of a first radio network temporary identifier RNTI, and the network device sends first information to a terminal device on a first listening occasion corresponding to a first beam by using the first beam. The first information is scrambled by using the first RNTI. The first beam and the first listening occasion that is in a first mapping period of the first RNTI meet a first mapping relationship, and the first mapping period is any mapping period of the first RNTI. Specifically, the first listening occasion is a set of listening occasions that correspond to the first beam and that are located in a first mapping window.

Based on this solution, the network device obtains, by configuring the mapping period of the first RNTI, the first mapping period that appears consecutively in time domain. The first beam and the first listening occasion meet the first mapping relationship in the first mapping period.

The network device configures a transmission resource of the first beam on the first listening occasion based on the first mapping relationship. This avoids a case in which the network device configures the listening occasion but does not configure the transmission resource of the beam, thereby improving a success rate of information transmission and air interface resource utilization, and avoiding a waste of resources.

In an optional manner, there are a plurality of listening occasions corresponding to a plurality of beams in the first mapping period. The plurality of listening occasions belong to listening occasions of the first RNTI, the plurality of listening occasions are in one or more periods of a search space, and the plurality of beams are beams sent by the network device in a cell to which the terminal device belongs. Specifically, the listening occasions of the first RNTI are a set of listening occasions of downlink control information scrambled by using the first RNTI.

Based on this optional manner, in response to the network device sending a plurality of beams in the cell to which the terminal device belongs, there are a plurality of listening occasions corresponding to the plurality of beams in the first mapping period. In other words, the plurality of beams and the plurality of listening occasions all meet the first mapping relationship in the first mapping period. Because one terminal device corresponds to one beam, in this case, a success rate of transmitting information by the network device to a plurality of terminal devices is improved in the first mapping period, thereby avoiding invalid listening caused by performing resource transmission by the network device by using a beam that is not corresponding to the terminal device at a listening moment of the terminal device.

In an optional manner, the method further includes: The network device sends at least one piece of configuration information to the terminal device, where the at least one piece of configuration information indicates a first offset and/or a mapping period of the first RNTI. The plurality of listening occasions are located in the first mapping window. The first mapping window is determined based on the mapping period of the first RNTI and the first offset, and is duration within the first mapping period, and the plurality of listening occasions include the first listening occasion.

In an optional manner, a time domain start location of the first mapping window is determined based on the mapping period of the first RNTI and the first offset.

In an optional manner, the time domain start location of the first mapping window includes a system frame number and a slot number of the time domain start location, and the system frame number and the slot number meet the following rule:

$$(\text{SFN} \cdot N + n_{Slot} - O_g) \bmod K_g = 0, \text{ where}$$

$K_g$ is the first mapping period;
N is a quantity of slots in a radio frame;
$O_g$ is the first offset;
SFN is the system frame number of the time domain start location of the first mapping window; and $n_{Slot}$ is the slot number of the time domain start location of the first mapping window.

In an optional manner, the time domain start location of the first mapping window includes a system frame number and a slot number of the time domain start location, and the system frame number and the slot number meet the following rule:

$$\text{SFN mod } K_g = \text{floor}(O_g/N); \text{ and}$$

$n_{Slot} = O_g \bmod N$, where $K_g$ is the first mapping period;
$N$ is a quantity of slots in a radio frame;
$O_g$ is the first offset;
SFN is the system frame number of the time domain start location of the first mapping window; and
$n_{Slot}$ is the slot number of the time domain start location of the first mapping window.

Based on this optional manner, the network device determines the time domain start location of the first mapping window according to the rule. Based on the mapping period of the first RNTI and the first offset, or duration of the first mapping period and duration of the first offset, the network device determines a location and duration of the first mapping window.

In an optional manner, in the first mapping window, a plurality of listening occasions correspond to a plurality of beams. The plurality of beams in ascending order of index values correspond to the plurality of listening occasions arranged in time-domain order.

Based on this optional manner, each listening occasion in the first mapping window corresponds to one beam, and starting from the first listening occasion in time-domain order in the first mapping window, the network device sequentially and cyclically sends a plurality of beams in ascending order of beam index values. The terminal device also determines, based on a beam sending order, the first listening occasion on which the network device sends the first beam.

In an optional manner, the first beam and the first listening occasion meet a predefined rule, and the predefined rule meets the following formula:

$$M \bmod L = K, \text{ where}$$

$L$ is a quantity of the plurality of beams;
$M$ is a sequence number of the first listening occasion in the plurality of listening occasions; and
$K$ represents a location or an order of the first beam in the plurality of beams.

In an optional manner, the first offset is an offset of the search space. In this case, the at least one piece of configuration information further indicates a period of the search space. The first offset indicates an offset between a time domain start location of each period of the search space and a time domain start location of the search space in each period.

In an optional implementation, a system frame number and a slot number of the time domain start location of the search space in each period of the search space meet the following formula:

$$(SFN1 \cdot N + n_{Slot1} - O_g) \bmod K_s = 0, \text{ where}$$

$K_s$ is the period of the search space;
$N$ is a quantity of slots in a radio frame;
$O_g$ is the first offset;
SFN1 is the system frame number of the time domain start location of the search space; and
$n_{Slot1}$ is the slot number of the time domain start location of the search space.

Based on this optional manner, the first offset indicates an offset between a time domain start location of the first mapping period and a time domain start location of the first mapping window, and also indicates an offset between a time domain start location of each period of the search space and a time domain start location of the search space in each period. The network device configures the search space of the first RNTI more simply and effectively, and has better compatibility with the conventional technology. Further optionally, the network device configures the time domain start location of the first mapping window to coincide with a time domain start location of at least one search space, the network device configures the mapping period of the first RNTI to be an integer multiple of the period of the search space, or the network device configures the period of the search space to be an integer multiple of the mapping period of the first RNTI.

In an optional manner, the first offset is a dedicated offset configured by the network device for the first mapping window, and the at least one piece of configuration information further indicates the period of the search space and a second offset of the search space. The second offset indicates an offset between a time domain start location of each period of the search space and a time domain start location of the search space in each period.

In an optional implementation, a system frame number and a slot number of the time domain start location of the search space in each period of the search space meet the following formula:

$$(SFN1 \cdot N + n_{Slot1} - O_s) \bmod K_s = 0, \text{ where}$$

$K_s$ is the period of the search space;
$N$ is a quantity of slots in a radio frame;
$O_s$ is the second offset;
SFN1 is the system frame number of the time domain start location of the search space; and
$n_{Slot1}$ is the slot number of the time domain start location of the search space.

Based on this optional manner, the network device configures the dedicated offset for the first mapping window without being affected by the second offset of the search space. The network device more flexibly configures the time domain start location of the search space and the time domain start location of the first mapping window.

In an optional manner, the search space is a common search space, or the search space is a dedicated search space configured by the network device for the first RNTI, or an MBS search space configured by the network device for RNTIs that scramble DCI of all MBS services.

In an optional manner, the first information includes control information, the control information is used to schedule a multicast service for a group of terminal devices, and the group of terminal devices include the terminal device; or the control information is used to schedule a dedicated system information block.

In an optional manner, the method further includes: The network device sends DRX configuration information to the terminal device, where the DRX configuration information is used to configure DRX, and includes an active period and an inactive period in a DRX cycle.

In an optional manner, that the network device sends first information to a terminal device on a first listening occasion corresponding to a first beam by using the first beam includes: The network device sends the first information to the terminal device on a first listening sub-occasion of the first listening occasion by using the first beam, where the first listening sub-occasion is one or more listening occasions that are in an active period of at least one DRX cycle in the first listening occasion.

In an optional manner, the network device does not send the first information to the terminal device by using the first beam on a second listening sub-occasion of the first listening occasion corresponding to the first beam. The second listening sub-occasion is one or more listening occasions that are in an inactive period of at least one DRX cycle in the first listening occasion.

In an optional manner, the time domain start location of the first mapping window coincides with a time domain start location of an active period in at least one DRX cycle.

According to a second aspect, at least one embodiment provides a communication method. The method is performed by a terminal device or a chip in the terminal device. The following provides descriptions by using an example in which the method is performed by the terminal device. The terminal device determines a mapping period of a first radio network temporary identifier RNTI, and the terminal device receives, on a first listening occasion corresponding to a first beam by using the first beam, first information sent by a network device. The first information is scrambled by using the first RNTI. The first beam and the first listening occasion that is in a first mapping period of the first RNTI meet a first mapping relationship, the first mapping period is any mapping period of the first RNTI, and the first listening occasion is a set of listening occasions that correspond to the first beam and that are in the first mapping window.

Based on this solution, the first beam and the first listening occasion meet the first mapping relationship in the first mapping period. The terminal device listens to the first information on the first listening occasion based on the first mapping relationship by using the first beam, thereby improving listening efficiency, and avoiding invalid listening caused in response to the terminal device listening and there is no transmission resource of a beam in this case, or a beam for sending information in this case is not a beam corresponding to the terminal device.

In an optional manner, there are a plurality of listening occasions corresponding to a plurality of beams in the first mapping period. The plurality of listening occasions belong to listening occasions of the first RNTI, the plurality of listening occasions are in one or more periods of a search space, the plurality of beams are beams sent by the network device in a cell to which the terminal device belongs, and the listening occasions of the first RNTI are a set of listening occasions of downlink control information scrambled by using the first RNTI.

Based on this optional manner, in response to the network device sending a plurality of beams in the cell to which the terminal device belongs, there are a plurality of listening occasions corresponding to the plurality of beams in the first mapping window. In other words, the plurality of beams and the plurality of listening occasions all meet the first mapping relationship in the first mapping window. Because one terminal device corresponds to one beam, listening efficiency of a plurality of terminal devices is improved in the first mapping window.

In an optional manner, the method further includes: The terminal device receives at least one piece of configuration information from the network device, where the at least one piece of configuration information indicates the first offset and/or the mapping period of the first RNTI. The plurality of listening occasions are located in the first mapping window. The first mapping window is determined based on the mapping period of the first RNTI and the first offset, and is duration within the first mapping period, and the plurality of listening occasions include the first listening occasion.

In an optional manner, a time domain start location of the first mapping window is determined based on the mapping period of the first RNTI and the first offset.

In an optional manner, the time domain start location of the first mapping window includes a system frame number and a slot number of the time domain start location, and the system frame number and the slot number meet the following rule:

$$(SFN \cdot N + n_{Slot} - O_g) \bmod K_g = 0, \text{ where}$$

$K_g$ is the first mapping period;
$N$ is a quantity of slots in a radio frame;
$O_g$ is the first offset;
SFN is the system frame number of the time domain start location of the first mapping window; and
$n_{Slot}$ is the slot number of the time domain start location of the first mapping window.

In an optional manner, the time domain start location of the first mapping window includes a system frame number and a slot number of the time domain start location, and the system frame number and the slot number meet the following rule:

$$SFN \bmod K_g = \text{floor}(O_g/N); \text{ and}$$

$n_{Slot} = O_g \bmod N$, wherein
$K_g$ is the first mapping period;
$N$ is a quantity of subframes in a radio frame;
$O_g$ is the first offset;
SFN is the system frame number of the time domain start location of the first mapping window; and
$n_{Slot}$ is the slot number of the time domain start location of the first mapping window.

Based on this optional manner, the terminal device determines the time domain start location of the first mapping window according to the rule. The terminal device determines the duration of the first mapping window based on the mapping period of the first RNTI or the duration of the first mapping period.

In an optional manner, in the first mapping window, a plurality of listening occasions correspond to a plurality of beams. The plurality of beams in ascending order of index values correspond to the plurality of listening occasions arranged in time-domain order.

Based on this optional manner, each listening occasion in the first mapping window corresponds to one beam, and starting from the first listening occasion in time-domain order in the first mapping window, the network device sequentially and cyclically sends a plurality of beams in ascending order of beam index values. The terminal device also determines, based on a beam sending order, the first listening occasion on which the network device sends the first beam.

In an optional manner, the first beam and the first listening occasion meet a predefined rule, and the predefined rule meets the following formula:

$$M \bmod L = K, \text{ where}$$

L is a quantity of the plurality of beams;
M is a sequence number of the first listening occasion in the plurality of listening occasions; and
K represents a location or an order of the first beam in the plurality of beams.

In an optional manner, the first offset is an offset of the search space. In this case, the at least one piece of configuration information further indicates a period of the search space. The first offset indicates an offset between a time domain start location of each period of the search space and a time domain start location of the search space in each period.

In an optional implementation, a system frame number and a slot number of the time domain start location of the search space in each period of the search space meet the following formula:

$$(SFN1 N + n_{Slot1} - O_g) \bmod K_s = 0, \text{ where}$$

$K_s$ is the period of the search space;
N is a quantity of slots in a radio frame;
$O_g$ is the first offset;
SFN1 is the system frame number of the time domain start location of the search space; and
$n_{Slot1}$ is the slot number of the time domain start location of the search space.

Based on this optional manner, the first offset indicates an offset between a time domain start location of the first mapping period and a time domain start location of the first mapping window, and also indicates an offset between a time domain start location of each period of the search space and a time domain start location of the search space in each period, which has better compatibility with the conventional technology. Further optionally, the time domain start location of the first mapping window coincides with a time domain start location of at least one search space, the mapping period of the first RNTI is an integer multiple of the period of the search space, or the period of the search space is an integer multiple of the mapping period of the first RNTI.

In an optional manner, the first offset is a dedicated offset configured by the network device for the first mapping window, and the at least one piece of configuration information further indicates the period of the search space and a second offset of the search space. The second offset indicates an offset between a time domain start location of each period of the search space and a time domain start location of the search space in each period.

In an optional implementation, a system frame number and a slot number of the time domain start location of the search space in each period of the search space meet the following formula:

$$(SFN1 \cdot N + n_{Slot1} - O_s) \bmod K_s = 0, \text{ where}$$

$K_s$ is the period of the search space;
N is a quantity of slots in a radio frame;
$O_s$ is the second offset;
SFN1 is the system frame number of the time domain start location of the search space; and
$n_{Slot1}$ is the slot number of the time domain start location of the search space.

Based on this optional manner, the network device configures a dedicated offset for the first mapping window, and the first offset and the second offset are independent of each other. The terminal device determines the time domain start location of the first mapping window based on the first offset and the mapping period of the first RNTI, and determines the time domain start location of the search space in each period of the search space based on the second offset and the period of the search space. The time domain start location of the first mapping window and the time domain start location of the search space are more flexible.

In an optional manner, the search space is a common search space, or the search space is a dedicated search space configured by the network device for the first RNTI, or an MBS search space configured by the network device for RNTIs that scramble DCI of all MBS services.

In an optional manner, the first information includes control information, the control information is used to schedule a multicast service for a group of terminal devices, and the group of terminal devices include the terminal device; or the control information is used to schedule a dedicated system information block.

In an optional manner, the method further includes: The terminal device receives DRX configuration information sent by the network device, where the DRX configuration information is used to configure an active period in a DRX cycle.

In an optional manner, that the terminal device receives, on a first listening occasion corresponding to a first beam by using the first beam, first information sent by a network device includes: The terminal device receives, on a first listening sub-occasion of the first listening occasion by using the first beam, the first information sent by the network device, where the first listening sub-occasion is one or more listening occasions that are in an active period of at least one DRX cycle in the first listening occasion.

According to a third aspect, at least one embodiment provides a communication method. The method is performed by a network device or a chip in the network device. The following provides descriptions by using an example in which the method is performed by the network device. The network device sends DRX configuration information to a terminal device, and the network device sends first information to the terminal device on a first listening occasion corresponding to a first beam by using the first beam. The first information is scrambled by using a first RNTI. The first beam and the first listening occasion in at least one DRX cycle meet a first mapping relationship. The first listening occasion is a set of listening occasions that correspond to the first beam and that are in at least one DRX active period.

Based on this solution, the network device obtains, by configuring DRX, DRX cycles that consecutively occur in time domain. The first beam and the first listening occasion meet the first mapping relationship in at least one DRX cycle. The network device configures a transmission resource of the first beam on the first listening occasion based on the first mapping relationship. This avoids a case in which the network device configures the listening occasion but does not configure the transmission resource of the beam, thereby improving a success rate of information transmission and air interface resource utilization, and avoiding a waste of resources.

In an optional manner, there are a plurality of listening occasions corresponding to a plurality of beams in at least one DRX cycle. The plurality of listening occasions belong to listening occasions of the first RNTI, the plurality of listening occasions are in one or more periods of a search space, the plurality of beams are beams sent by the network device in a cell to which the terminal device belongs, and the listening occasions of the first RNTI are a set of listening occasions of downlink control information scrambled by using the first RNTI.

In an optional manner, the method further includes: The network device sends DRX configuration information to the terminal device, where the configuration information includes a DRX cycle, duration of an active period in the DRX cycle, and a third offset. The plurality of listening occasions are in an active period of at least one DRX cycle.

In an optional manner, a relationship among the third offset, the DRX cycle, and the active period in each DRX cycle meets the following formulas:

Subframe=$O_D$ mod 10;

SFN mod $T$=floor($O_D$/10); and $T=T_O/10$, where

SFN is a system frame number of a time domain start location of the active period; $O_D$ is the third offset; T is the DRX cycle; $T_O$ is duration of the active period; and Subframe is a subframe number of the time domain start location of the active period.

In an optional manner, in the active period of the at least one DRX cycle, a plurality of listening occasions correspond to a plurality of beams. The plurality of beams in ascending order of index values correspond to the plurality of listening occasions arranged in time-domain order.

Based on this optional manner, in the active period of the at least one DRX cycle, each listening occasion corresponds to one beam, and starting from the first listening occasion in time-domain order in the active period of the at least one DRX cycle, the network device sequentially and cyclically sends a plurality of beams in ascending order of beam index values. The terminal device also determines, based on a beam sending order, the first listening occasion on which the network device sends the first beam.

In an optional manner, the first beam and the first listening occasion meet a predefined rule, and the predefined rule meets the following formula:

$M$ mod $L=K$, where

L is a quantity of the plurality of beams;
M is a sequence number of the first listening occasion in the plurality of listening occasions; and
K represents a location or an order of the first beam in the plurality of beams.

In an optional manner, the method further includes: The network device sends at least one piece of configuration information to the terminal device, where the at least one piece of configuration information indicates a period of the search space and an offset of the search space, and the offset of the search space indicates an offset between a time domain start location of each period of the search space and a time domain start location of the search space in each period.

In an optional implementation, a system frame number and a slot number of the time domain start location of the search space in each period of the search space meet the following formula:

(SFN1·$N$+$n_{Slot1}$-$O_s$)mod $K_s$=0, where $K_s$ is the period of the search space;
N is a quantity of slots in a radio frame;
$O_s$ is the offset of the search space;
SFN1 is the system frame number of the time domain start location of the search space; and
$n_{Slot1}$ is the slot number of the time domain start location of the search space.

In an optional manner, the third offset is the same as the offset of the search space.

In an optional manner, a time domain start location of the active period in the DRX cycle is the same as a time domain start location of at least one search space.

In an optional manner, the search space is a common search space, or the search space is a dedicated search space configured by the network device for the first RNTI, or an MBS search space configured by the network device for RNTIs that scramble DCI of all MBS services.

In an optional manner, the first information includes control information, the control information is used to schedule a multicast service for a group of terminal devices, and the group of terminal devices include the terminal device; or the control information is used to schedule a dedicated system information block.

According to a fourth aspect, at least one embodiment provides a communication method. The method is performed by a terminal device or a chip in the terminal device. The following provides descriptions by using an example in which the method is performed by the terminal device. The terminal device receives DRX configuration information sent by a network device, and the terminal device receives first information from the network device on a first listening occasion corresponding to a first beam by using the first beam. The first information is scrambled by using a first RNTI. The first beam and the first listening occasion in at least one DRX cycle meet a first mapping relationship. The first listening occasion is a set of listening occasions that correspond to the first beam and that are in at least one DRX active period.

Based on this solution, the first beam and the first listening occasion meet the first mapping relationship in the first mapping period. The terminal device listens to the first information on the first listening occasion based on the first mapping relationship by using the first beam, thereby improving listening efficiency, and avoiding invalid listening caused in response to the terminal device listening and there is no transmission resource of a beam in this case, or a beam for sending information in this case is not a beam corresponding to the terminal device.

In an optional manner, there are a plurality of listening occasions corresponding to a plurality of beams in at least one DRX cycle. The plurality of listening occasions belong to listening occasions of the first RNTI, the plurality of listening occasions are in one or more periods of a search space, the plurality of beams are beams sent by the network device in a cell to which the terminal device belongs, and the listening occasions of the first RNTI are a set of listening occasions of downlink control information scrambled by using the first RNTI.

In an optional manner, the method further includes: The terminal device receives DRX configuration information, where the configuration information includes a DRX cycle, duration of an active period in the DRX cycle, and a third offset. The plurality of listening occasions are in an active period of at least one DRX cycle.

In an optional manner, a relationship among the third offset, the DRX cycle, and the active period in each DRX cycle meets the following formulas:

Subframe=$O_D$ mod 10;

SFN mod $T$=floor($O_D$/10); and $T=T_O/10$, where

SFN is a system frame number of a time domain start location of the active period; $O_D$ is the third offset; T is the DRX cycle; $T_O$ is duration of the active period; and Subframe is a subframe number of the time domain start location of the active period.

In an optional manner, in the active period of the at least one DRX cycle, a plurality of listening occasions correspond to a plurality of beams. The plurality of beams in ascending order of index values correspond to the plurality of listening occasions arranged in time-domain order.

Based on this optional manner, in the active period of the at least one DRX cycle, each listening occasion corresponds to one beam, and starting from the first listening occasion in time-domain order in the active period of the at least one DRX cycle, the network device sequentially and cyclically sends a plurality of beams in ascending order of beam index values. The terminal device also determines, based on a beam sending order, the first listening occasion on which the network device sends the first beam.

In an optional manner, the first beam and the first listening occasion meet a predefined rule, and the predefined rule meets the following formula:

$$M \bmod L = K, \text{ where}$$

L is a quantity of the plurality of beams;

M is a sequence number of the first listening occasion in the plurality of listening occasions; and K represents a location or an order of the first beam in the plurality of beams.

In an optional manner, the method further includes: The terminal device receives at least one piece of configuration information sent by the network device, where the at least one piece of configuration information indicates a period of the search space and an offset of the search space, and the offset of the search space indicates an offset between a time domain start location of each period of the search space and a time domain start location of the search space in each period.

In an optional implementation, a system frame number and a slot number of the time domain start location of the search space in each period of the search space meet the following formula:

$$(\text{SFN1} \cdot N + n_{Slot1} - O_s) \bmod K_s = 0, \text{ where}$$

$K_s$ is the period of the search space;

N is a quantity of slots in a radio frame;

$O_s$ is the offset of the search space;

SFN1 is the system frame number of the time domain start location of the search space; and $n_{Slot1}$ is the slot number of the time domain start location of the search space.

In an optional manner, the third offset is the same as the offset of the search space.

In an optional manner, a time domain start location of the active period in the DRX cycle is the same as a time domain start location of at least one search space.

In an optional manner, the search space is a common search space, or the search space is a dedicated search space configured by the network device for the first RNTI, or an MBS search space configured by the network device for RNTIs that scramble DCI of all MBS services.

In an optional manner, the first information includes control information, the control information is used to schedule a multicast service for a group of terminal devices, and the group of terminal devices include the terminal device; or the control information is used to schedule a dedicated system information block.

According to a fifth aspect, at least one embodiment provides a communication method. The method is performed by a network device or a chip in the network device. The following provides descriptions by using an example in which the method is performed by the network device.

The network device determines a mapping period of a first RNTI and a first search space, and the network device sends first information to a first terminal device on a first listening occasion corresponding to a first beam by using the first beam. The first information is scrambled by using the first RNTI. The first beam and the first listening occasion that is in a first mapping period of the first RNTI meet a first mapping relationship, and the first mapping period is any mapping period of the first RNTI. The first listening occasion is a set of listening occasions corresponding to the first beam, and the first search space is a search space corresponding to the first beam.

In an optional manner, there are a plurality of listening occasions corresponding to a plurality of beams in the first mapping period. The plurality of listening occasions belong to listening occasions of the first RNTI, the plurality of listening occasions are in one or more periods of a search space, the plurality of beams are beams sent by the network device in a cell to which the terminal device belongs, and the listening occasions of the first RNTI are a set of listening occasions of downlink control information scrambled by using the first RNTI.

In an optional manner, the network device determines a first mapping window. The first mapping window is determined based on the mapping period of the first RNTI and a first offset, and is duration within the first mapping period. The first mapping window includes a plurality of listening occasions, and the plurality of listening occasions include the first listening occasion.

In an optional manner, a time domain start location of the first mapping window is determined based on the mapping period of the first RNTI and the first offset.

In an optional manner, the time domain start location of the first mapping window includes a system frame number and a slot number of the time domain start location, and the system frame number and the slot number meet the following rule:

$$(\text{SFN} \cdot N + n_{Slot} - O_g) \bmod K_g = 0, \text{ where}$$

$K_g$ is the first mapping period;

N is a quantity of slots in a radio frame;

$O_g$ is the first offset;

SFN is the system frame number of the time domain start location of the first mapping window; and $n_{Slot}$ is the slot number of the time domain start location of the first mapping window.

In an optional manner, the time domain start location of the first mapping window includes a system frame number and a slot number of the time domain start location, and the system frame number and the slot number meet the following rule:

$$\text{SFN} \bmod K_g = \text{floor}(O_g/N); \text{ and}$$

$n_{Slot} = O_g \bmod N, \text{ where}$ $K_g$ is the first mapping period;

N is a quantity of slots in a radio frame;

$O_g$ is the first offset;

SFN is the system frame number of the time domain start location of the first mapping window; and $n_{Slot}$ is the slot number of the time domain start location of the first mapping window.

Based on this optional manner, the network device determines the time domain start location of the first mapping window according to the rule. Based on the mapping period of the first RNTI and the first offset, or duration of the first mapping period and duration of the first offset, the network device determines a location and duration of the first mapping window.

In an optional manner, in the first mapping window, a plurality of listening occasions correspond to a plurality of beams. The plurality of beams in ascending order of index values correspond to the plurality of listening occasions arranged in time-domain order.

In an optional manner, the first beam and the first listening occasion meet a predefined rule, and the predefined rule meets the following formula:

M mod L=K, where

L is a quantity of the plurality of beams;
M is a sequence number of the first listening occasion in the plurality of listening occasions; and
K represents a location or an order of the first beam in the plurality of beams.

In an optional manner, the first offset is an offset of the search space, and the first offset indicates an offset between a time domain start location of each period of the search space and a time domain start location of the search space in each period.

In an optional implementation, a system frame number and a slot number of the time domain start location of the search space in each period of the search space meet the following formula:

(SFN1·N+$n_{Slot1}$−$O_g$)mod $K_s$=0, where $K_s$ is the period of the search space;
N is a quantity of slots in a radio frame;
$O_g$ is the first offset;
SFN1 is the system frame number of the time domain start location of the search space; and
$n_{Slot1}$ is the slot number of the time domain start location of the search space.

In an optional manner, the first offset is different from the offset of the search space, the offset of the search space is a second offset, and the second offset indicates an offset between a time domain start location of each period of the search space and a time domain start location of the search space in each period.

In an optional implementation, a system frame number and a slot number of the time domain start location of the search space in each period of the search space meet the following formula:

(SFN1·N+$n_{Slot1}$−$O_s$)mod $K_s$=0, where $K_s$ is the period of the search space;
N is a quantity of slots in a radio frame;
$O_s$ is the second offset;
SFN1 is the system frame number of the time domain start location of the search space; and
$n_{Slot1}$ is the slot number of the time domain start location of the search space.

In an optional manner, the network device configures a first search space, where the first search space is a search space corresponding to the first beam, and the first search space corresponds to the first listening occasion.

In an optional manner, the network device sends at least one piece of configuration information to the first terminal device, where the at least one piece of configuration information includes configuration information of the first search space, and the configuration information includes a period of the first search space, an offset of the first search space, and location information of the first listening occasion. The location information of the first listening occasion is at least one symbol number occupied by the first listening occasion in one slot of the first search space. In an optional manner, the first search space is a subset of the search space.

In an optional manner, the search space is a common search space, or the search space is a dedicated search space configured by the network device for the first RNTI, or an MBS search space configured by the network device for RNTIs that scramble DCI of all MBS services.

In an optional manner, the first information includes control information, the control information is used to schedule a multicast service for a group of terminal devices, and the group of terminal devices include the terminal device; or the control information is used to schedule a dedicated system information block.

In an optional manner, the at least one piece of configuration information is carried in system information.

According to a sixth aspect, at least one embodiment provides a communication method. The method is performed by a terminal device or a chip in the terminal device. The following provides descriptions by using an example in which the method is performed by the terminal device. A first terminal device receives at least one piece of configuration information from a network device, and the first terminal device receives first information from the network device on a first listening occasion corresponding to a first beam by using the first beam. The first information is scrambled by using a first RNTI. The first listening occasion is a set of listening occasions corresponding to the first beam, the first listening occasion belongs to a listening occasion of the first RNTI, and the listening occasion of the first RNTI is a set of listening occasions of downlink control information scrambled by using the first RNTI.

In an optional manner, the at least one piece of configuration information includes configuration information of a first search space, and the at least one piece of configuration information includes a period of the first search space, an offset of the first search space, and location information of the first listening occasion. The location information of the first listening occasion is at least one symbol number occupied by the first listening occasion in one slot of the first search space.

In an optional manner, the at least one piece of configuration information is carried in system information.

According to a seventh aspect, at least one embodiment provides a communication method. The method is performed by a network device or a chip in the network device. The following provides descriptions by using an example in which the method is performed by the network device. The network device configures a multicast/multicast control logical channel MCCH and a mapping period of the MCCH. The network device sends, at a first MCCH transmission location corresponding to a first beam, the MCCH to a terminal device by using the first beam, where the MCCH is used to transmit multicast/multicast control information, and the first MCCH transmission location is a set of MCCH transmission locations corresponding to the first beam.

In an optional manner, the network device sends at least one piece of configuration information to the terminal device, where the at least one piece of configuration information includes configuration information of the MCCH, the mapping period of the MCCH, and a fifth offset.

In an optional manner, the configuration information of the MCCH includes a repetition period of the MCCH, a fourth offset, and an MCCH modification period, and further includes a start boundary of the MCCH period, a first subframe for scheduling the MCCH, and duration for scheduling the MCCH starting from the first subframe.

In an optional manner, the fourth offset indicates an offset between a time domain start location of each repetition period of the MCCH and a time domain location of MCCH transmission.

In a repetition period, a system frame number for scheduling the MCCH meets the following formula:

$$SFN3 \bmod(T_R) = O_R, \text{ where}$$

SFN3 is the system frame number for scheduling the MCCH, $T_R$ is the repetition period of the MCCH, $O_R$ is the fourth offset, and the fourth offset indicates the offset between the time domain start location of each repetition period of the MCCH and the time domain location of MCCH transmission.

In an optional manner, a start system frame number of the MCCH modification period meets:

$$SFN4 \bmod(T_M) = 0, \text{ where}$$

$T_M$ is the MCCH modification period, and SFN4 is the start system frame number of the MCCH modification period.

In an optional manner, the mapping period of the MCCH and the fifth offset indicate a second mapping window, and the second mapping window is duration that is determined based on the mapping period of the MCCH and the fifth offset and that is within a first MCCH mapping period. The first MCCH mapping period is any mapping period of the MCCH.

In an optional manner, a time domain start location of the second mapping window includes a system frame number of the time domain start location and a slot number of the time domain start location. The system frame number and the slot number meet the following rule:

$$(SFN5 \cdot N + n_{Slot5} - O_M) \bmod K_M = 0, \text{ where}$$

$K_M$ is the mapping period of the MCCH, N is a quantity of slots in a radio frame, $O_M$ is the fifth offset, SFN5 is the system frame number of the time domain start location of the second mapping window, and $n_{Slot5}$ is the slot number of the time domain start location of the second mapping window.

In an optional manner, a time domain start location of the second mapping window includes a system frame number of the time domain start location and a slot number of the time domain start location. The system frame number and the slot number meet the following rule:

$$SFN5 \bmod K_M = \text{floor}(O_g/N); \text{ and}$$

$$n_{Slot5} = O_M \bmod N, \text{ where}$$

$K_M$ is the mapping period of the MCCH, N is a quantity of slots in a radio frame, $O_M$ is the fifth offset, SFN5 is the system frame number of the time domain start location of the second mapping window, $n_{Slot5}$ is the slot number of the time domain start location of the second mapping window, and floor represents rounding down.

In an optional manner, in the second mapping window, a plurality of MCCH transmission locations correspond to a plurality of beams. The plurality of beams in ascending order of index values correspond to the plurality of MCCH transmission locations arranged in time-domain order.

Based on this optional manner, each MCCH transmission location in the second mapping window corresponds to one beam, and starting from the first MCCH transmission location in time-domain order in the second mapping window, the network device sequentially and cyclically sends a plurality of beams in ascending order of beam index values. The terminal device also determines, based on a beam sending order, the first MCCH transmission location on which the network device sends the first beam.

In an optional manner, the first beam and the first MCCH transmission location meet a predefined rule, and the predefined rule meets the following formula:

$$M \bmod L = K, \text{ where}$$

L is a quantity of the plurality of beams;
M is a sequence number of the first MCCH transmission location in the plurality of MCCH transmission locations; and
K represents a location or an order of the first beam in the plurality of beams.

In an optional implementation, the mapping period of the MCCH is the same as the MCCH modification period, the fifth offset is 0, and the second mapping period is the same as the MCCH modification period.

According to an eighth aspect, at least one embodiment provides a communication method. The method is performed by a terminal device or a chip in the terminal device. The following provides descriptions by using an example in which the method is performed by the terminal device. A network device configures a multicast/multicast control logical channel MCCH. The network device sends, at a first MCCH transmission location corresponding to a first beam, the MCCH to a terminal device by using the first beam, where the MCCH is used to transmit multicast/multicast control information, and the first MCCH transmission location is a set of MCCH transmission locations corresponding to the first beam.

In an optional manner, the terminal device receives at least one piece of configuration information sent by the network device, where the at least one piece of configuration information includes configuration information of the MCCH, a mapping period of the MCCH, and a fifth offset.

In an optional manner, the configuration information of the MCCH includes a repetition period of the MCCH, a fourth offset, and an MCCH modification period, and further includes a start boundary of the MCCH period, a first subframe for scheduling the MCCH, and duration for scheduling the MCCH starting from the first subframe.

In an optional manner, the fourth offset indicates an offset between a time domain start location of each repetition period of the MCCH and a time domain location of MCCH transmission. In a repetition period, a system frame number for scheduling the MCCH meets the following formula:

$$SFN3 \bmod(T_R) = O_R, \text{ where}$$

SFN3 is the system frame number for scheduling the MCCH, $T_R$ is the repetition period of the MCCH, $O_R$ is the fourth offset, and the fourth offset indicates the offset between the time domain start location of each repetition period of the MCCH and the time domain location of MCCH transmission.

In an optional manner, a start system frame number of the MCCH modification period meets:

$$SFN4 \bmod(T_M) = 0, \text{ where}$$

$T_M$ is the MCCH modification period, and SFN4 is the start system frame number of the MCCH modification period.

In an optional manner, the mapping period of the MCCH and the fifth offset indicate a second mapping window, and the second mapping window is duration that is determined based on the mapping period of the MCCH and the fifth offset and that is within the first MCCH mapping period. The first MCCH mapping period is any mapping period of the MCCH.

In an optional manner, a time domain start location of the second mapping window includes a system frame number of the time domain start location and a slot number of the time domain start location. The system frame number and the slot number meet the following rule:

$$(SFN5 \cdot N + n_{Slot5} - O_M) \bmod K_M = 0, \text{ where}$$

$K_M$ is the mapping period of the MCCH, N is a quantity of slots in a radio frame, $O_M$ is the fifth offset, SFN5 is the system frame number of the time domain start location of the second mapping window, and $n_{Slots}$ is the slot number of the time domain start location of the second mapping window.

In an optional manner, a time domain start location of the second mapping window includes a system frame number of the time domain start location and a slot number of the time domain start location. The system frame number and the slot number meet the following rule:

$$SFN5 \bmod K_M = \text{floor}(O_g/N); \text{ and}$$

$n_{Slot5} = O_M \bmod N$, where $K_M$ is the mapping period of the MCCH, N is a quantity of slots in a radio frame, $O_M$ is the fifth offset, SFN5 is the system frame number of the time domain start location of the second mapping window, $n_{Slots}$ is the slot number of the time domain start location of the second mapping window, and floor represents rounding down.

In an optional manner, in the second mapping window, a plurality of MCCH transmission locations correspond to a plurality of beams. The plurality of beams in ascending order of index values correspond to the plurality of MCCH transmission locations arranged in time-domain order.

Based on this optional manner, each MCCH transmission location in the second mapping window corresponds to one beam, and starting from the first MCCH transmission location in time-domain order in the second mapping window, the network device sequentially and cyclically sends a plurality of beams in ascending order of beam index values. The terminal device also determines, based on a beam sending order, the first MCCH transmission location on which the network device sends the first beam.

In an optional manner, the first beam and the first MCCH transmission location meet a predefined rule, and the predefined rule meets the following formula:

$$M \bmod L = K, \text{ where}$$

L is a quantity of the plurality of beams;
M is a sequence number of the first MCCH transmission location in the plurality of MCCH transmission locations; and
K represents a location or an order of the first beam in the plurality of beams.

In an optional implementation, the mapping period of the MCCH is the same as the MCCH modification period, the fifth offset is 0, and the second mapping period is the same as the MCCH modification period.

According to a ninth aspect, at least one embodiment provides a communication apparatus. For beneficial effects, refer to the descriptions in the first aspect. Details are not described herein again. The communication apparatus includes at least one processor and an interface circuit. The interface circuit is configured to provide instruction and/or data input or output for the at least one processor. Optionally, the communication apparatus further includes a memory. The memory is configured to store a computer program or instructions. The at least one processor is coupled to the memory and the interface circuit. In response to the at least one processor executing the computer program or the instructions, the communication apparatus is enabled to perform the method performed by the network device in the foregoing method.

According to a tenth aspect, at least one embodiment provides a communication apparatus. For beneficial effects, refer to the descriptions in the second aspect. Details are not described herein again. The communication apparatus includes at least one processor and an interface circuit. The interface circuit is configured to provide instruction and/or data input or output for the at least one processor. Optionally, the communication apparatus further includes a memory. The memory is configured to store a computer program or instructions. The at least one processor is coupled to the memory and the interface circuit. In response to the at least one processor executing the computer program or the instructions, the communication apparatus is enabled to perform the method performed by the terminal device in the foregoing method.

According to an eleventh aspect, at least one embodiment provides a communication apparatus. For beneficial effects, refer to the descriptions in the third aspect. Details are not described herein again. The communication apparatus includes at least one processor and an interface circuit. The interface circuit is configured to provide instruction and/or data input or output for the at least one processor. Optionally, the communication apparatus further includes a memory. The memory is configured to store a computer program or instructions. The at least one processor is coupled to the memory and the interface circuit. In response to the at least one processor executing the computer program or the instructions, the communication apparatus is enabled to perform the method performed by the network device in the foregoing method.

According to a twelfth aspect, at least one embodiment provides a communication apparatus. For beneficial effects, refer to the descriptions in the fourth aspect. Details are not described herein again. The communication apparatus includes at least one processor and an interface circuit. The interface circuit is configured to provide instruction and/or data input or output for the at least one processor. Optionally, the communication apparatus further includes a memory. The memory is configured to store a computer program or instructions. The at least one processor is coupled to the memory and the interface circuit. In response to the at least one processor executing the computer program or the instructions, the communication apparatus is enabled to perform the method performed by the terminal device in the foregoing method.

According to a thirteenth aspect, at least one embodiment provides a communication apparatus. For beneficial effects, refer to the descriptions in the fifth aspect. Details are not described herein again. The communication apparatus includes at least one processor and an interface circuit. The interface circuit is configured to provide instruction and/or data input or output for the at least one processor. Optionally, the communication apparatus further includes a memory. The memory is configured to store a computer program or instructions. The at least one processor is coupled to the memory and the interface circuit. In response to the at least one processor executing the computer program or the instructions, the communication apparatus is enabled to perform the method performed by the network device in the foregoing method.

According to a fourteenth aspect, at least one embodiment provides a communication apparatus. For beneficial effects, refer to the descriptions in the sixth aspect. Details are not described herein again. The communication apparatus includes at least one processor and an interface circuit. The interface circuit is configured to provide instruction and/or data input or output for the at least one processor. Optionally, the communication apparatus further includes a memory. The memory is configured to store a computer program or instructions. The at least one processor is coupled to the memory and the interface circuit. In response to the at least one processor executing the computer program or the instructions, the communication apparatus is enabled to perform the method performed by the terminal device in the foregoing method.

According to a fifteenth aspect, at least one embodiment provides a communication apparatus. For beneficial effects, refer to the descriptions in the seventh aspect. Details are not described herein again. The communication apparatus includes at least one processor and an interface circuit. The interface circuit is configured to provide instruction and/or data input or output for the at least one processor. Optionally, the communication apparatus further includes a memory. The memory is configured to store a computer program or instructions. The at least one processor is coupled to the memory and the interface circuit. In response to the at least one processor executing the computer program or the instructions, the communication apparatus is enabled to perform the method performed by the network device in the foregoing method.

According to a sixteenth aspect, at least one embodiment provides a communication apparatus. For beneficial effects, refer to the descriptions in the eighth aspect. Details are not described herein again. The communication apparatus includes at least one processor and an interface circuit. The interface circuit is configured to provide instruction and/or data input or output for the at least one processor. Optionally, the communication apparatus further includes a memory. The memory is configured to store a computer program or instructions. The at least one processor is coupled to the memory and the interface circuit. In response to the at least one processor executing the computer program or the instructions, the communication apparatus is enabled to perform the method performed by the terminal device in the foregoing method.

According to a seventeenth aspect, a computer program product is provided. The computer program product includes computer program code. In response to the computer program code being run, the methods performed by the network device in the foregoing aspects are performed.

According to an eighteenth aspect, a computer program product is provided. The computer program product includes computer program code. In response to the computer program code being run, the methods performed by the terminal device in the foregoing aspects are performed.

According to a nineteenth aspect, at least one embodiment provides a chip system. The chip system includes a processor, configured to implement the functions of the network device in the methods in the foregoing aspects. In at least one embodiment, the chip system further includes a memory, configured to store program instructions and/or data. The chip system includes a chip, or includes a chip and another discrete device.

According to a twentieth aspect, at least one embodiment provides a chip system. The chip system includes a processor, configured to implement the functions of the terminal device in the methods in the foregoing aspects. In at least one embodiment, the chip system further includes a memory, configured to store program instructions and/or data. The chip system includes a chip, or includes a chip and another discrete device.

According to a twenty-first aspect, at least one embodiment provides a computer-readable storage medium, storing a computer program. In response to the computer program being run, the methods performed by the terminal device in the foregoing aspects are implemented.

According to a twenty-second aspect, at least one embodiment provides a computer-readable storage medium. The computer-readable storage medium stores a computer program. In response to the computer program being run, the methods performed by the network device in the foregoing aspects are implemented.

Compared with the conventional technology, in the solutions provided in the present invention, a mapping relationship is formed between a beam for transmitting information and a listening occasion of a first RNTI within a mapping period of the first RNTI. Based on the mapping relationship, the network device configures a transmission resource of a target beam on a target listening occasion, thereby improving a success rate of transmitting information by the network device by using the beam. The terminal device listens to information transmitted by the network device on the target listening occasion by using the target beam, thereby avoiding invalid listening.

DESCRIPTION OF EMBODIMENTS

Figure 1:
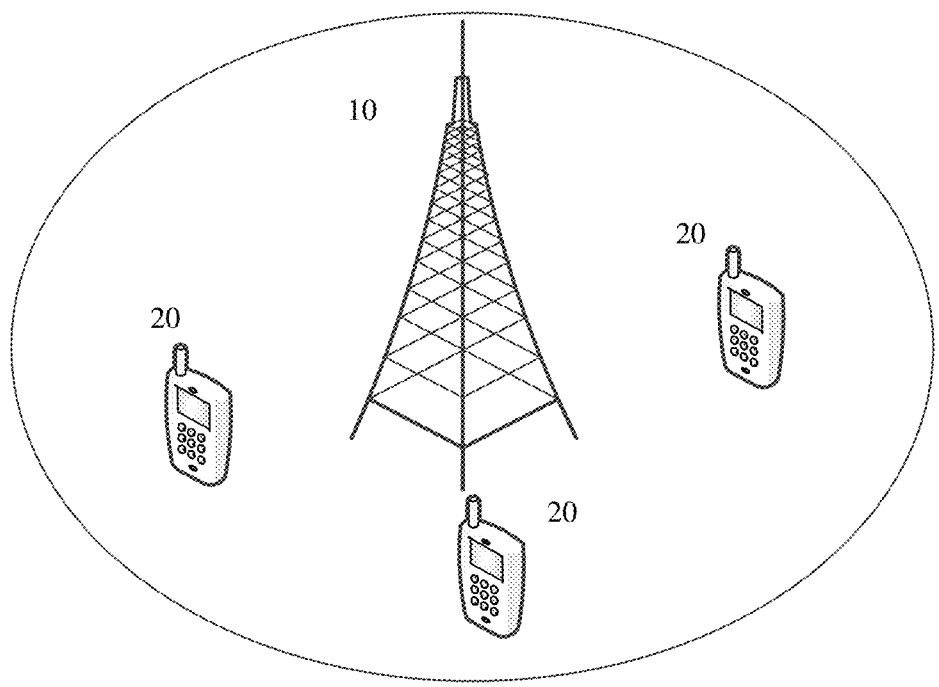
FIG. 1 is a schematic diagram of an application scenario according to an embodiment of the present invention.

FIG. 1 is a schematic diagram of an application scenario according to an embodiment of the present invention. A communication system in the application scenario includes a network device 10 and at least one terminal device 20. The network device 10 and the terminal device 20 communicate through one or more air interface technologies. Air interface transmission includes uplink transmission and downlink transmission.

For example, uplink transmission means that the terminal device 20 sends uplink information to the network device 10. A channel used to transmit the uplink information is referred to as an uplink channel, and the uplink channel is a physical uplink shared channel (physical uplink shared channel, PUSCH) or a physical uplink control channel (physical uplink control channel, PUCCH). The PUSCH is used to carry uplink data, and the uplink data is also referred to as uplink data information.

For example, downlink transmission means that the network device 10 sends downlink information to the terminal device 20. A channel for transmitting the downlink information is referred to as a downlink channel. The downlink channel is a physical downlink shared channel (physical downlink shared channel, PDSCH) or a physical downlink control channel (physical downlink control channel, PDCCH). The PDCCH is used to carry downlink control information (downlink control information, DCI). The PDSCH is used to carry downlink data, which is also referred to as downlink data information.

Optionally, the network architecture shown in FIG. 1 further includes a core network device 30. The terminal device 20 is connected to the network device 10 in a wireless manner, and the network device 10 is connected to the core network device 30 in a wired or wireless manner. The core network device 30 and the network device 10 is independent and different physical devices, or the core network device 30 and the network device 10 is the same physical device, and all/part of the logical functions of the core network device 30 and the network device 10 are integrated on the physical device.

In the application scenario shown in FIG. 1, the terminal device 20 is at a fixed location, or is movable. This is not limited. The application scenario shown in FIG. 1 further includes other network devices, such as wireless relay devices and wireless backhaul devices. This is not limited. In the application scenario shown in FIG. 1, quantities of terminal devices, network devices, and core network devices are not limited.

Technical solutions in at least one embodiment is applied to various communication systems, for example, a long term evolution (long term evolution, LTE) system, a 5$^{th}$ generation (5$^{th}$ generation, 5G) mobile communication system, or a future mobile communication system.

Figure 2:
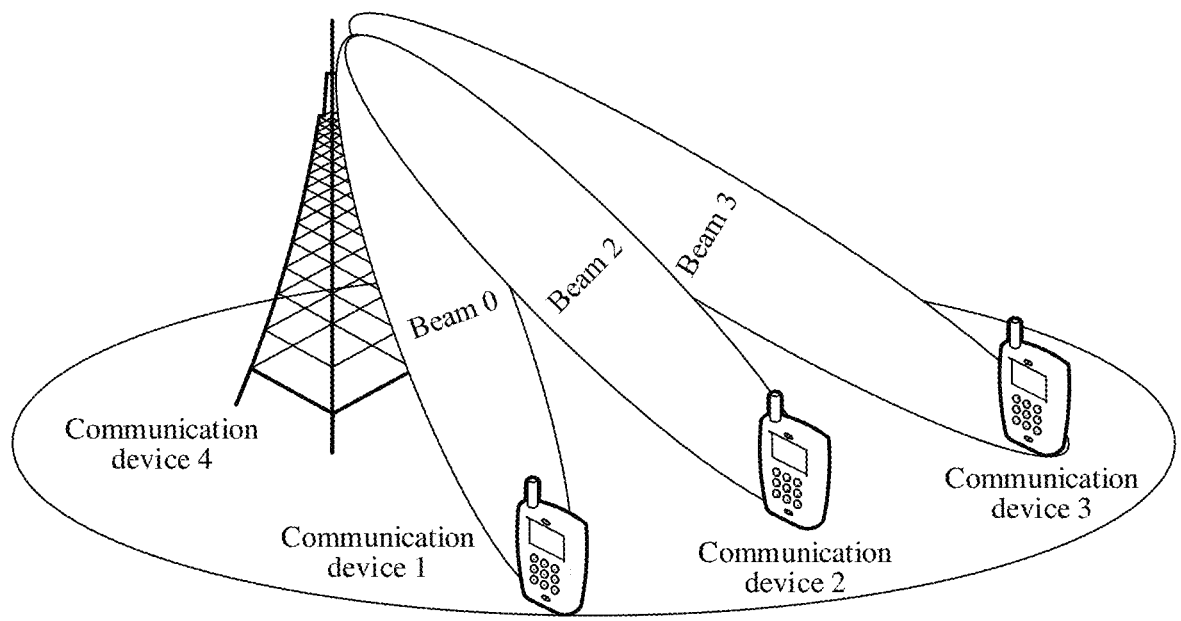
FIG. 2 is a schematic diagram of beam sweeping.

FIG. 2 is a schematic diagram of beam sweeping. A communication device 1 in FIG. 2 is the network device in the application scenario in FIG. 1, and communication devices 2 to 4 in FIG. 2 is the terminal devices in the application scenario in FIG. 1. A quantity of communication devices and a quantity of beams in FIG. 2 are merely examples. This is not limited in embodiments described herein.

Beam sweeping is a technology for transmitting beams along all predefined directions at regular intervals. For a broadcast beam (SSB beam), the network device transmits the beam in different directions at different moments through time-division sweeping. The terminal device selects, through beam training, an SSB with best signal quality to complete synchronization and system information demodulation, and accesses a corresponding cell. In the conventional technology, the terminal device works on a specific beam selected by the terminal device through beam training. In response to the specific beam corresponding to the terminal device being swept, the terminal device most efficiently receives downlink information sent by the network device and/or sends uplink information to the network device. In response to another beam being swept, the terminal device cannot efficiently receive the downlink information sent by the network device.

For example, a communication device 4 is a network device, and the communication devices 1 to 3 are terminal devices. The following describes beam sweeping.

S200: A network device determines information about a beam used for beam sweeping, and sends the information about the beam to a terminal device.

Specifically, in response to performing beam sweeping, the network device notifies, by using a synchronization signal block PositionsInBurst (Synchronization Signal block PositionsInBurst, ssb-PositionsInBurst) in a system information block (system information block, SIB) 1 (SIB1 for short), the terminal device of the information about the beam used for beam sweeping. The ssb-PositionsInBurst indicates a time domain location of each synchronization signal block (Synchronization Signal block, SS-block) in a synchronization signal burst (Synchronization Signal burst, SS-burst), which is understood as a time domain location of each beam in a beam sweeping process. According to 3GPP specifications, in response to synchronization signal/physical broadcast channel blocks (Synchronization Signal/Physical Broadcast Channel blocks, SS/PBCH blocks) in each half-frame being different, the usage of information elements (Information Element, IE) contained in ssb-PositionsInBurst is also different. For example, in a frequency range (Frequency Range, FR) 1, ssb-PositionsInBurst includes only an IE inonegroup (inOneGroup), and the inOneGroup is an 8-bit bit map (bit map). In response to the maximum quantity of SS/PBCH blocks in each half-frame being 4, only the leftmost four bits are valid, and the remaining four bits are invalid. In response to the maximum quantity of SS/PBCH blocks in each half-frame being 8, all the 8 bits are valid. Specifically, in the eight bits, a first or leftmost bit corresponds to an SS/PBCH block or a beam index 0, a second bit corresponds to an SS/PBCH block or a beam block index 1, and so on. For example, in response to the 8-bit bit map being [1 0 1 1 0 0 0 0], the network device actually sends three beams in a cell to which the terminal device belongs, and index values are respectively 0, 2, and 3.

S201: The network device configures a control resource set CORESET and a search space (search space) that are of a PDCCH listening occasion, and sends configuration information of the control resource set CORESET and the search space to the terminal device.

Specifically, the listening occasion is a listening occasion corresponding to L beams. L is a quantity of beams actually used by the network device to perform beam sweeping in the cell to which the terminal device belongs, and is indicated by ssb-PositionsInBurst. The terminal device determines the listening occasion, or referred to as a time-frequency location of the listening occasion, based on the configuration information of the control resource set CORESET and the search space. The terminal device performs listening based on a PDCCH listening occasion indicated by the CORESET and the search space, to obtain DCI carried by the PDCCH. The DCI is scrambled by using an RNTI, and the RNTI herein is a first RNTI. The listening occasion is also referred to as a PDCCH listening occasion. In at least one embodiment, the listening occasion is used as an example for description.

S202: The network device sends downlink information to the terminal device by using the beam.

Specifically, the network device transmits beams along all predefined directions at regular intervals in a beam sweeping manner. During beam sweeping, a transmission sequence of a plurality of beams is in ascending order of beam index values, and the beams carry the downlink control information DCI carried by the PDCCH. Correspondingly, the terminal device receives the information by using a specific beam, and listens to, at the time-frequency location of the PDCCH listening occasion, the downlink control information DCI carried by the PDCCH. For example, in S201, the network device actually sends three beams in the cell to which the terminal device belongs, and index values are 0, 2, and 3 respectively. In the cell to which the terminal device belongs, the network device sweeps the beams starting from the beam whose index is 0, followed by the beam whose index is 2 and the beam whose index is 3, and cycles based on the beam.

The specific beam of the terminal device is determined in a beam training manner. In response to the network device sending a plurality of beams in a beam sweeping manner, for a terminal device at a specific location, only one or several beams in a specific direction cover the terminal device. The terminal device measures the beams that cover the terminal device, selects a beam with best signal quality as a specific beam corresponding to the terminal device, and reports information about the beam to the network device in a random access process. In this way, the network device and the terminal device transmit uplink and/or downlink information by using the specific beam. The terminal device and the network device determine a specific beam as a beam for information transmission between the network device and the terminal device. The terminal device efficiently receives the downlink information sent by the network device and/or send the uplink information to the network device in response to the terminal device sweeping a specific beam selected by the terminal device through beam training. In response to sweeping a beam that is not specific to the terminal device, the terminal device cannot efficiently receive the downlink information sent by the network device, and cannot efficiently send the uplink information to the network device. A beam training result is shown in FIG. 2. An example in which a beam 1 corresponds to a communication device 1 is used. In other words, the communication device 1 efficiently receives the downlink information sent by the communication device 4 and/or send the uplink information to the communication device 4 in response to the beam 1 being swept. However, in response to the beam 2 and the beam 3 being swept, the communication device 1 cannot efficiently receive the downlink information from the communication device 4, and cannot efficiently send the uplink information to the communication device 4.

Figure 3:
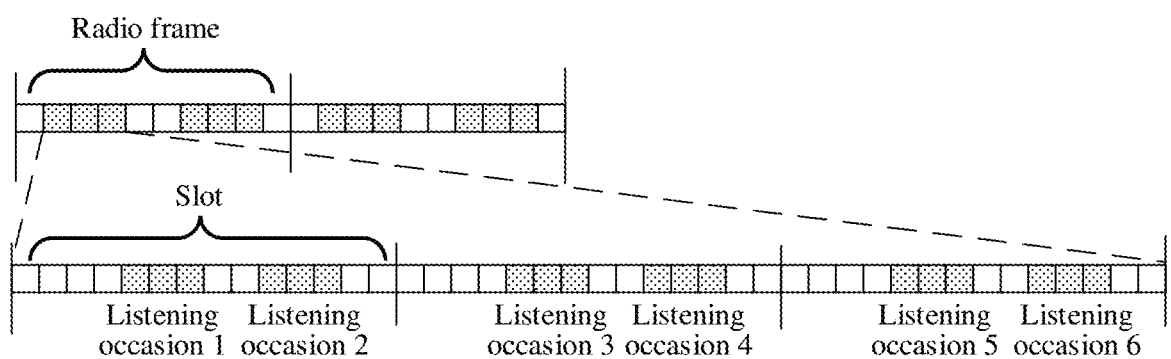
FIG. 3 is a schematic diagram of a listening occasion in a search space.

For one or more terminal devices that listen to downlink control information DCI carried by a PDCCH, the one or more terminal devices listen at a time-frequency location of a listening occasion in a search space. Both the beam and the listening occasion have time domain locations. Therefore, for a terminal device, in response to a time-frequency location of a PDCCH listened by the terminal device corresponding to a time domain location of a specific beam of the terminal device, that is, in response to the specific beam of the terminal device transmitting information on a listening occasion listened by the terminal device, the terminal device successfully listens to DCI carried by the PDCCH. Listening occasions in a search space are shown in FIG. 3. Each radio frame includes a plurality of slots, each slot includes a plurality of symbols, and each listening occasion occupies one or more symbols. FIG. 3 shows an example in which each listening occasion occupies three symbols. With reference to FIG. 2 and FIG. 3, how the terminal device receives downlink information in response to the network device performing beam sweeping is described. In FIG. 2, the communication device 4 is a network device, the communication device 1 to the communication device 3 are terminal devices 1 to 3, and the network device actually sends three beams in cells to which the three terminal devices belong. In a beam training manner, a specific beam of the terminal device 1 is a beam 1, a specific beam of the terminal device 2 is a beam 2, and a specific beam of the terminal device 3 is a beam 3. All PDCCH listening occasions in FIG. 3 is understood as including PDCCH listening occasions of the terminal device 1, the terminal device 2, and the terminal device 3 in FIG. 2. All the foregoing listening occasions is also listening occasions corresponding to one or more radio network temporary identifiers (Radio Network Temporary Identifier, RNTI) or a PDCCH. All the foregoing listening occasions are configured by the network device, configuration information of all the listening occasions is sent by the network device to three terminal devices, and the three terminal devices perform listening on the PDCCH listening occasions in FIG. 3 based on the configuration information of all the listening occasions, to obtain downlink control information DCI carried by the PDCCH. For the terminal device 1, in response to a time domain location of the beam 1 corresponding to a time domain location of the listening occasion on which the terminal device 1 performs listening, the terminal device successfully listens to information transmitted on the listening occasion, and receive DCI carried by the PDCCH.

A mapping relationship, is to be formed between a time domain location of a beam on which beam sweeping is performed and a time domain location of a PDCCH listening occasion, so that the network device successfully sends downlink control information DCI carried by the PDCCH. The terminal device performs listening on a listening occasion corresponding to a specific beam of the terminal device, so that the terminal device successfully receives DCI that is sent by the network device and carried by the PDCCH. For a multicast/multicast MBS service, scheduling information of the service is DCI that is carried by a PDCCH and that is scrambled by using an RNTI corresponding to multicast/multicast. For a terminal device that is to receive the MBS service, a PDCCH listening occasion is configured by the network device, but the PDCCH listening occasion does not correspond to a beam on which beam sweeping is performed in time domain. In addition, for the terminal device, in response to a beam that not being specific to the terminal device is swept, listening in this case cannot successfully or efficiently receive downlink information, and overheads of the terminal device are increased, causing power consumption.

Based on the foregoing description, at least one embodiment provides an information transmission method. In at least one embodiment, a listening occasion is used to represent a PDCCH listening occasion, and an MBS is used to represent a multimedia broadcast multicast/multicast broadcast service for detailed description. A principle of the method is as follows: A first RNTI mapping period is configured, and a mapping relationship between a listening occasion of the first RNTI and a beam is established in the mapping period. A network device sends a target beam on a target listening occasion in the first RNTI mapping period, and a terminal device listens to, on the target listening occasion by using the target beam, first information scrambled by using the first RNTI, thereby improving listening efficiency of the terminal device, reducing resource overheads, and ensuring accuracy and efficiency of multicast/multicast MBS service transmission.

In the mapping period of the first RNTI, a listening occasion of MBS service scheduling information forms a mapping relationship with a beam for transmitting the MBS service scheduling information. The first information includes control information, the control information is used to schedule a group of terminal devices to receive the MBS service, and the first RNTI is a group RNTI (Group RNTI, G-RNTI). Alternatively, in the mapping period of the first RNTI, a listening occasion of system information scheduling information and a beam for transmitting the system information scheduling information form a mapping relationship. The first information includes control information, the control information is used to schedule a dedicated system information block, and the first RNTI is a system information radio network temporary identifier SI-RNTI. In addition, the first RNTI is a radio identifier (Change Notification) used to schedule a change of the control information of the MBS service. This is not limited in at least one embodiment.

The following explains and describes some terms used herein, and the terms are also used as a part of the present invention.

1. Terminal Device

A terminal device is briefly referred to as a terminal, or referred to as user equipment (user equipment, UE), which is a device having a wireless transceiver function. The terminal device is deployed on land, where the deployment includes indoor or outdoor, or handheld or vehicle-mounted deployment, is deployed on water (for example, on a ship), or is deployed in air (for example, on aircraft, an uncrewed aerial vehicle, a balloon, or a satellite). The terminal device is a mobile phone, a tablet computer, a computer having a wireless transceiver function, a virtual-reality terminal device, an augmented-reality terminal device, a wireless terminal device in industrial control, a wireless terminal device in self-driving, a wireless terminal device in telemedicine, a wireless terminal device in a smart grid, a wireless terminal device in transportation safety, a wireless terminal device in a smart city, or a wireless terminal device in a smart home. The terminal device is fixed or mobile. This is not limited in embodiments described herein.

In at least one embodiment, an apparatus configured to implement a function of the terminal is a terminal device, or is an apparatus, for example, a chip system, that supports the terminal device in implementing the function. The apparatus is installed in the terminal device. In at least one embodiment, the chip system includes a chip, or includes a chip and another discrete component. In the technical solutions provided in at least one embodiment, the technical solutions provided in at least one embodiment are described by using an example in which the apparatus configured to implement the function of the terminal device is the terminal device.

2. Network Device

A network device is an access network device. The access network device is also referred to as a radio access network (radio access network, RAN) device, and is a device that provides a wireless communication function for the terminal device. The access network device includes, for example, but is not limited to, a next generation NodeB (generation NodeB, gNB), an evolved NodeB (evolved NodeB, eNB), a baseband unit (baseband unit, BBU), a transmitting and receiving point (transmitting and receiving point, TRP), or a transmitting point (transmitting point, TP) in 5G, a base station in a future mobile communication system, or an access point in a Wi-Fi system. Alternatively, the access network device is a radio controller, a centralized unit (centralized unit, CU), and/or a distributed unit (distributed unit, DU) in a cloud radio access network (cloud radio access network, CRAN) scenario, or the network device is a relay station, a vehicle-mounted device, a network device in a future evolved PLMN network, or the like.

The terminal device communicates with a plurality of access network devices by using different technologies. For example, the terminal device communicates with an access network device supporting long term evolution (long term evolution, LTE), communicates with an access network device supporting 5G, or communicates with both an access network device supporting LTE and an access network device supporting 5G. This is not limited in embodiments described herein.

In at least one embodiment, an apparatus configured to implement functions of the network device is a network device, or is an apparatus, for example, a chip system, that supports the network device in implementing the functions. The apparatus is installed in the network device.

In the technical solutions provided in at least one embodiment, the technical solutions provided in at least one embodiment are described by using an example in which the apparatus configured to implement the function of the network device is the network device.

3. Time Unit

Time units are time domain units used for data transmission, and includes time domain units such as a radio frame (radio frame), a subframe (subframe), a slot (slot), a mini-slot (mini-slot), and a time domain symbol (symbol). In 5G new radio (new radio, NR), a time domain symbol is referred to as a symbol for short. The time domain symbol is an orthogonal frequency division multiplexing (orthogonal frequency division multiplexing, OFDM) symbol, or is a discrete Fourier transform spread orthogonal frequency division multiplexing (discrete Fourier transform spread orthogonal frequency division multiplexing, DFT-s-OFDM) symbol. In at least one embodiment, an example in which the time domain symbol is an OFDM symbol is used for description. One radio frame includes 10 radio subframes, and one radio subframe includes one or more slots. A specific quantity of slots included in one subframe is related to a subcarrier space. In response to the subcarrier space (Subcarrier Space, SCS) being 15 kHz, a time domain length of one slot is 1 ms. One slot includes 14 orthogonal frequency division multiplexing (Orthogonal Frequency Division Multiplexing, OFDM) symbols. The duration configuration related to the period or the offset mentioned in at least one embodiment is in a unit of any granularity in the time unit. For example, the period of the search space is in a unit of a time domain symbol and/or a slot. For another example, the offset is in a unit of a time domain symbol.

4. Beam

A beam is a communication resource. The beam is understood as signal strength distribution formed in different directions in space after a signal is sent by using an antenna. The beams is used to transmit data channel information, control channel information, sounding signals, and the like. The network device sends same information or different information by using different beams.

After a beamforming technology is used, the network device uses a plurality of beams with different directions to completely cover a cell. Therefore, the network device generally sends downlink information in a beam sweeping manner. To be specific, the network device sends the downlink information to the terminal device by using beams with different directions.

A broadcast beam SSB is used to control cell access. Each broadcast beam has a beam index. The broadcast beam index is a time sequence number, that is, each index corresponds to a broadcast beam sent in time division. In response to performing time division sweeping by using the broadcast beam, the network device sends a plurality of synchronization signal blocks (SS/PBCH block) in a beam sweeping manner. During initial access, the terminal device measures the SS/PBCH block, selects a beam with best quality as a beam corresponding to the terminal device, and notifies the network device of information about the selected beam. In this way, the network device and the terminal device perform data transmission by using the specific beam.

5. Discontinuous Reception (Discontinuous Reception, DRX)

The DRX mechanism means that the terminal device stops listening to a PDCCH channel within a period of time. There are two types of DRX: IDLE DRX and ACTIVE DRX. IDLE DRX means discontinuous reception in response to the terminal device being in a sleep state. In this case, a fixed period is defined in a network, and the terminal device achieves discontinuous reception. ACTIVE DRX means discontinuous reception in response to the terminal device being in a radio resource control (Radio Resource Control) connected mode (RRC-connected). In this case, the terminal device does not enter the RRC sleep mode to implement discontinuous reception, so that resource configuration is optimized, and power consumption of the terminal device is reduced.

6. Control Resource Set CORESET and Search Space Search Space

The network device encapsulates, in a control resource set (Control Resource Set, CORESET), information such as a frequency band occupied by the PDCCH and a quantity of orthogonal frequency division multiplexing (Orthogonal Frequency Division Multiplexing, OFDM) symbols occupied in time domain, and encapsulates, in a search space (Search Space), information such as a number of a start OFDM symbol of the PDCCH and a listening period. The network device sends the configuration of the CORESET and the configuration of the search space to the terminal device. The terminal device obtains an effective location range of the PDCCH by learning the configuration information of the CORESET, and obtains the time-frequency location of the PDCCH in the CORESET by using the configuration information of the search space. After determining a specific CORESET resource, the terminal device determines, by blindly detecting a search space in the CORESET, whether there is a PDCCH sent by the network device to the terminal device.

In the current standard, the listening occasion of the search space is configured by using the following parameters:

(1) a period $k_{p,s}$ or duration, duration, in a unit of a slot;
(2) a quantity $n_s$ of consecutive to-be-measured slots in a period, where the to-be-measured slot is a slot including a listening occasion;
(3) offset $o_{p,s}$, in a unit of slot;
(4) probing symbol bit information in a slot, represented by a 14-bit bitmap (bit map), and used to indicate a location of a first symbol of a listening occasion included in the slot;
(5) sounding duration, that is, a quantity of consecutive symbols included in the listening occasion; and
(6) a first to-be-measured slot in a radio frame.

The first to-be-measured slot in the radio frame is determined by using a formula $(n_f * N_{slot}^{frame,\mu} n_{s,f}^{\mu} - o_{p,s}) \bmod k_{p,s} = 0$. $N_{slot}^{frame,\mu}$ is a quantity of slots in a radio frame, $n_f$ represents a quantity of radio frames, and $n_{s,f}^{\mu}$ represents a number of the first to-be-measured slot in the radio frame.

For example, as shown in FIG. 3, a quantity of slots in a radio frame is 10, a quantity of radio frames is 2, a period of a search space is five slots, an offset is one slot, and a quantity of consecutive to-be-measured slots in one period is 3, which represents bit map=[00001000010000] of probing symbol bit information in a slot, that is, in this case, $k_{p,s}=5$, $o_{p,s}=1$, $N_{slot}^{frame,\mu}=10$, $n_f=2$, and $n_s=3$.

7. Multimedia Broadcast Multicast Service (Multimedia Broadcast Multicast Service, MBMS) or Multicast Broadcast Service (Multicast Broadcast Service, MBS)

A multimedia broadcast multicast service (Multimedia Broadcast Multicast Service, MBMS) or a multicast broadcast service (multicast broadcast service, MBS) is a service oriented to a plurality of terminal devices, for example, live streaming or scheduled program playing. A multicast transmission technology is a technology in which an MBS service simultaneously sends information to a plurality of terminal devices by using a base station. The MBS is between the network and the terminal device. The MBS is sent to a terminal device in a unicast manner by establishing a dedicated bearer for the terminal device, or is sent to a group of terminal devices in a broadcast manner by establishing a dedicated bearer for the MBS. In response to a large quantity of terminal devices receiving an MBS service, in response to the MBS service being sent in a unicast manner, a dedicated bearer is set up for each terminal device in the large quantity of terminal devices, consuming a large quantity of resources. In response to the MBS service being sent to the terminal devices in a broadcast manner, only a dedicated MBS bearer is set up. The base station receives the service from a core network, and then sends the service to the plurality of terminal devices in the broadcast manner.

8. Radio Network Temporary Identifier (Radio Network Temporary Identifier, RNTI)

An RNTI is configured by the network device, and is used to identify a terminal device in a connected mode in a cell, a group of terminal devices in a paging scenario, a special radio channel, and/or the like. Different types of RNTIs work by scrambling a cyclic redundancy check (Cyclic Redundancy Check, CRC) part of radio channel downlink control information (Downlink Control Information, DCI). The DCI is carried on a physical downlink control channel (Physical Downlink Control Channel, PDCCH). The network device configures a listening occasion for a PDCCH of the DCI scrambled by using the RNTI, and sends the configuration information to the terminal device. The terminal device obtains, by using the configuration information, a time-frequency range corresponding to the listening occasion of the PDCCH of the DCI scrambled by using the RNTI, and performs listening in the time-frequency range, to decode the DCI scrambled by using the RNTI.

9. Multicast/Multicast Control Channel (Multicast Control Channel, MCCH)

An MCCH is used to transmit MBS-related control information. MBMS-related logical channels include a broadcast control channel (Broadcast Control Channel, BCCH), an MCCH, and an MBMS point-to-multipoint control channel (MBMS point-to-multipoint Control Channel, MTCH). The BCCH is used by the network device to broadcast system information to the terminal device. The MCCH is used by the network to transmit MBMS-related control information to the terminal device. One MCCH corresponds to one or more MTCHs. Only a terminal device that reads an MBMS service uses the MCCH. The network device notifies the terminal device of a modulation and coding scheme (Modulation and Coding Scheme, MCS) of the MCCH and related information through system broadcast. The MTCH is a point-to-multipoint downlink channel, and is used by the network device to transmit MBS service information to the terminal device. Only a terminal device that reads the MBS service uses the MTCH, and information about the MTCH is indicated by an MCCH corresponding to the MTCH. The network device indicates the MCCH to the terminal device by using the BCCH, and then indicates the MTCH to the terminal device by using the MCCH, so that the terminal device reads the MBMS service carried on the MTCH. The MCCH described in this specification is, but is not limited to, a multicast/multicast control logical channel for short.

In at least one embodiment, terms such as "first" and "second" are only used for the purpose of distinguishing and describing, and cannot be understood as indicating or implying relative importance, nor are to be understood as indicating or implying order. "At least one" means one or more, and "a plurality" or means two or more. "And/or" describes an association relationship between associated objects, and represents that three relationships exist. For example, A and/or B represent the following cases: Only A exists, both A and B exist, and only B exists, where A and B is singular or plural. The character "/" usually indicates an "or" relationship between associated objects. At least one of the following items (pieces) or a similar expression thereof refers to any combination of these items, including any combination of singular items (pieces) or plural items (pieces). For example, at least one item (piece) of a, b, or c represent a, b, c, a and b, a and c, b and c, or a and b and c, where a, b, and c is singular items (pieces) or plural items (pieces).

Figure 4:
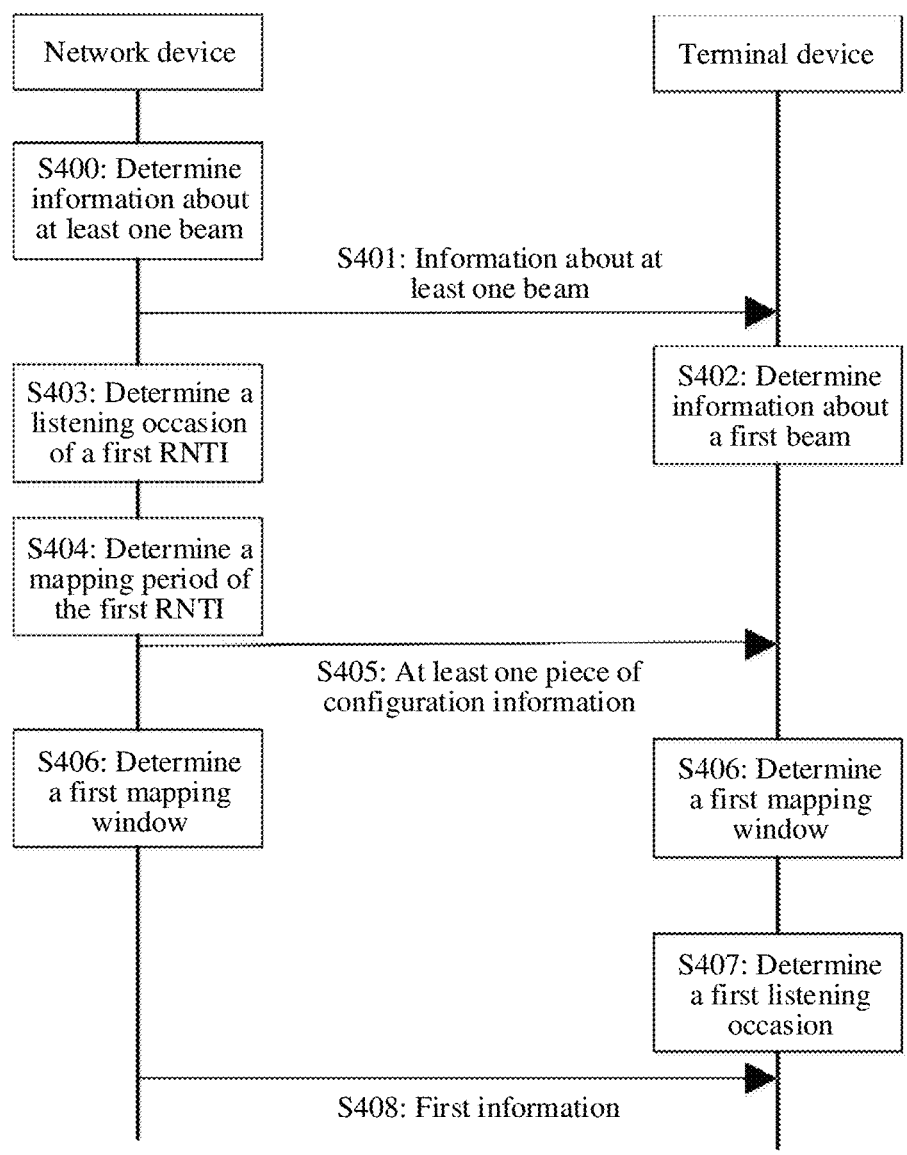
FIG. 4 is a schematic flowchart of an information transmission method according to at least one embodiment.

As shown in FIG. 4, at least one embodiment provides an information transmission method. A network device in FIG. 4 is the access network device 10 in FIG. 1, and a terminal device is the terminal device 20 in FIG. 1. The method shown in FIG. 4 includes the following operations.

S400: A network device determines information about at least one beam.

Specifically, the at least one beam is at least one beam sent by the network device in a cell to which a terminal device belongs, the information about the at least one beam includes a beam quantity L of the at least one beam and an index of each beam, and L is a positive integer.

S401: The network device sends the information about the at least one beam to a terminal device. Correspondingly, the terminal device receives the information about the at least one beam.

In an optional design, the information about the at least one beam is carried in a SIB 1. Specifically, the information about the at least one beam is notified to the terminal device by using ssb-PositionsInBurst in the SIB1. For detailed descriptions, refer to related descriptions of step S200 in the example in FIG. 2. Details are not described herein again.

S402: The terminal device determines information about a first beam. The first beam is used by the terminal device to receive information from the network device.

Optionally, the first beam is a specific beam that is selected by the terminal device through beam training and that is used to efficiently receive downlink information sent by the network device and/or send uplink information to the network device.

The information about the first beam is an index value of the first beam, and the index value of the first beam is understood as a location of the first beam in the L beams. Specifically, the terminal device determines, in a beam training manner based on the received information about the at least one beam, that the first beam is a specific beam corresponding to the information among the L beams, and the terminal device determines the location of the first beam in the L beams based on the index value of the first beam. Optionally, the location corresponds to a sequence of the first beam in a process of sweeping the L beams. The location of the first beam in the L beams is represented by a sequence number of the first beam in a process of performing beam sweeping on the L beams.

S403: The network device determines a listening occasion of a first RNTI.

Specifically, the listening occasion of the first RNTI is a time-frequency resource that is configured by the network device and that is used by the terminal device to listen to DCI scrambled by using the first RNTI. Specifically, first information in this embodiment is the DCI or the first information is carried in the DCI. The network device configures a control resource set CORESET of the listening occasion of the first RNTI and a search space corresponding to the CORESET, and the terminal device listens to, on the listening occasion of the first RNTI, information scrambled by using the first RNTI.

The search space is a search space configured by the network device for the listening occasion of the first RNTI, or is a search space configured by the network device for all different RNTIs that schedule different MBS services, or is a common search space (common search space).

In response to the search space being the search space configured by the network device for the listening occasion of the first RNTI, the listening occasion of the search space is a listening occasion that is used to listen to the first RNTI. There are a plurality of possibilities for configuring the search space.

In response to the search space being the search space configured by the network device for all different RNTIs that schedule different MBS services, the listening occasion of the search space is a listening occasion of RNTIs that scramble DCI of all MBS services of a cell to which the terminal device belongs.

In response to the search space being the common search space configured by the network device, the listening occasion of the common search space includes the listening occasion of the first RNTI, or includes a listening occasion of another RNTI. This is not limited herein.

Optionally, the first RNTI is an identifier used to perform MBS service scheduling, or an RNTI used to scramble DCI for scheduling a group of terminal devices, for example, a G-RNTI; or is an RNTI for scheduling a dedicated system information block, for example, an SI-RNTI; or the first RNTI is a radio identifier used to schedule a change of MBS service control information.

It should be noted that there is no execution sequence between the foregoing steps 5403 and 400 to 402.

S404: The network device determines a mapping period of the first RNTI.

The mapping period of the first RNTI is a parameter configured by the network device, and is used to form a mapping relationship between a beam for transmitting DCI scrambled by using the first RNTI and a listening occasion of the beam within duration indicated by the mapping period of the first RNTI. Specifically, the network device determines the mapping period of the first RNTI based on a quantity of beams sent for the cell to which the terminal device belongs and/or a quantity of listening occasions of the first RNTI; or the network device determines the mapping period of the first RNTI based on a configuration of the search space or another parameter. This is not limited herein.

S405: The network device sends at least one piece of configuration information to the terminal device, and correspondingly, the terminal device receives the at least one piece of configuration information sent by the network device.

Specifically, the at least one piece of configuration information indicates the mapping period of the first RNTI and a first offset. The mapping period of the first RNTI and the first offset indicate a first mapping window. The first mapping window is duration within a first mapping period of the first RNTI. Optionally, the first mapping period is any mapping period of the first RNTI, and the first mapping window is any mapping window of the first RNTI.

S406: The network device and the terminal device determine a first mapping window. Further, the determining a first mapping window includes determining a time domain start location of the first mapping window.

Specifically, the mapping period of the first RNTI and the first offset indicates the first mapping window, and the mapping period of the first RNTI, the first offset, and the first mapping window meet a predefined rule. The predefined rule indicates at least one time domain location, and the at least one time domain location is used as a time domain start location at which a mapping relationship is formed from a listening occasion of the L beams and the first RNTI, which is alternatively referred to as a time domain start location of at least one mapping window. Using the first mapping period as an example, a time domain location in the first mapping period in at least one time domain location indicated by the mapping period of the first RNTI and the first offset is the time domain start location of the first mapping window. Specifically, the first offset indicates an offset between the time domain start location of the first mapping period and the time domain start location of the first mapping window.

The time domain start location of the first mapping window meets a predefined rule. Optionally, the time domain start location of the first mapping window includes a system frame number of the time domain start location and a slot number of the time domain start location. The system frame number and the slot number meet a predefined rule.

Example 1: The system frame number and the slot number of the time domain start location of the first mapping window meets the following formula:

$(SFN \cdot N + n_{Slot} - O_g) \bmod K_g = 0$, where $K_g$ is the mapping period of the first RNTI, N is a quantity of slots in a radio frame, $O_g$ is the first offset, SFN is the system frame number of the time domain start location of the first mapping window, and $n_{Slot}$ is the slot number of the time domain start location of the first mapping window.

Example 2: The system frame number and the slot number of the time domain start location of the first mapping window meets the following formula:

$SFN \bmod K_g = \text{floor}(O_g/N)$; and $n_{Slot} = O_g \bmod N$, where $K_g$ is the mapping period of the first RNTI, N is a quantity of slots in a radio frame, $O_g$ is the first offset, SFN is the system frame number of the time domain start location of the first mapping window, $n_{Slot}$ is the slot number of the time domain start location of the first mapping window, and floor represents rounding down.

In Example 1 and Example 2, the formulas that the system frame number and the slot number of the time domain start location of the first mapping window meet are merely examples, and there is variations of a plurality of formulas. This is not limited in embodiments described herein.

Further optionally, the first offset is an offset of a search space, where the search space is a search space of the listening occasion of the first RNTI; or the first offset is a dedicated offset configured by the network device for the first mapping window.

In response to the first offset being the offset configured by the network device for the search space, the at least one piece of configuration information further indicates a period of the search space. The first offset not only indicates the offset between the time domain start location of the first mapping period and the time domain start location of the first mapping window in the first mapping period, in other words, indicates an offset between a time domain start location of each mapping period of the first RNTI and a time domain start location of a mapping window in each mapping period, but also indicates an offset between a time domain start location of each period of the search space and a start location of the search space in each period. Specifically, a relationship among the first offset, the period of the search space, and the search space in each period of the search space meets the following formula:

$(SFN1 \cdot N + n_{Slot1} - O_g) \bmod K_s = 0$, where $K_s$ is the period of the search space;
N is a quantity of slots in a radio frame;
$O_g$ is the first offset;
SFN1 is a system frame number of the time domain start location of the search space; and
$n_{Slot1}$ is a slot number of the time domain start location of the search space.

Figure 8:
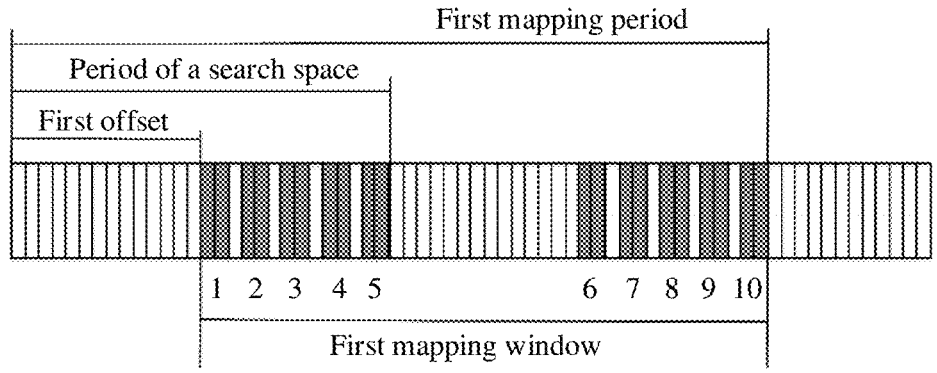
FIG. 8 is a schematic diagram of a relationship between a first mapping period and a period of a search space according to at least one embodiment.

In this case, optionally, to configure the search space of the listening occasion of the first RNTI more effectively and simply, the network device configures the time domain start location of the first mapping window to overlap the time domain start location of the search space in at least one period of the search space. In other words, for the time domain start location of the first mapping window, SFN and $n_{Slot}$ in the foregoing formula are a subset of SFN1 and $n_{Slot1}$. In at least one embodiment, the network device configures the duration of the first mapping period to be an integer multiple of the duration of the period of the search space. Alternatively, the network device configures the duration of the period of the search space to be an integer multiple of the duration of the first mapping period. In other words, the network device configures the mapping period of the first RNTI to be an integer multiple of the period of the search space, or the network device configures the period of the search space to be an integer multiple of the mapping period of the first RNTI. FIG. 8 shows a case in which the duration of the first mapping period is an integer multiple of the duration of the period of the search space. FIG. 8 is merely an example. This is not limited in embodiments described herein.

In response to the first offset being a dedicated offset configured by the network device for the first mapping window, the at least one piece of configuration information further indicates the period of the search space and a second offset of the search space, where the second offset indicates an offset between a time domain start location of each period of the search space and a start location of the search space in each period. In this case, the first offset is irrelevant to the second offset of the search space, a start moment of the first mapping window is not the same as a start moment of the search space, and the network device configures the first mapping period and the offset more flexibly. Specifically, a relationship among the second offset, the period of the search space, and the search space in the period of each search space meets the following formula:

$$(SFN1 \cdot N + n_{Slot1} - O_s) \text{Mod } K_s = 0, \text{ where}$$

$K_s$ is the period of the search space;
N is a quantity of slots in a radio frame;
$O_s$ is the second offset;
SFN1 is a system frame number of the time domain start location of the search space; and
$n_{Slot1}$ is a slot number of the time domain start location of the search space.

Figure 9:
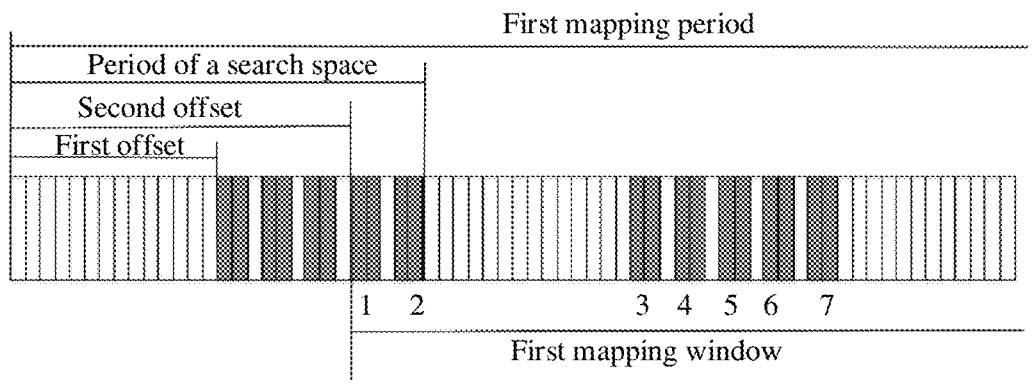
FIG. 9 is another schematic diagram of a relationship between a first mapping period and a period of a search space according to at least one embodiment.

FIG. 9 shows a case in which a network device configures a dedicated offset for a first mapping window. An example is used in which duration of a first mapping period is greater than one system frame number. FIG. 9 is merely an example. This is not limited in embodiments described herein.

There are a plurality of listening occasions corresponding to a plurality of beams in the first mapping window, each of the plurality of beams and a listening occasion corresponding to the plurality of beams meet a first mapping relationship, and the plurality of beams are beams sent by the network device in a cell to which the terminal device belongs, that is, the N beams described in S400. The plurality of listening occasions are listening occasions that are in the first mapping window and that are in the listening occasions of the first RNTI.

Specifically, there are a plurality of listening occasions corresponding to a plurality of beams in the first mapping window. The plurality of beams are in a one-to-one correspondence, in ascending order of index values, with the plurality of listening occasions that are in the first mapping window and that start from the first listening occasion in time domain in time-domain order. In response to the quantity of the plurality of listening occasions of the first RNTI in the first mapping window being greater than the quantity of beams sent by the network device in the cell to which the terminal device belongs, in other words, in response to the quantity of the plurality of listening occasions in the first mapping window being greater than the quantity of the plurality of beams, starting from a listening occasion corresponding to a next first RNTI after one round of mapping is completed, a one-to-one correspondence starts from a beam with a smallest index value, and cycles sequentially. The first beam and the first listening occasion are used as an example for detailed description. The one round of mapping means that the network device completes one round of beam sweeping on a premise that a plurality of beams are mapped to a plurality of listening occasions.

S407: Determine a first listening occasion corresponding to the first beam.

The first beam and the first listening occasion meet a first mapping relationship. The first listening occasion includes one or more listening occasions that are in the listening occasion of the first RNTI and that are in the first mapping window within the first mapping period and that meet the first mapping relationship with the first beam. In other words, the first listening occasion is a set of listening occasions that correspond to the first beam and that are in the first mapping window. Optionally, the first mapping period is any mapping period of the first RNTI, and the first mapping window is duration that is located in the first mapping period and that is determined based on the mapping period of the first RNTI and the first offset.

For example, in ascending order of indexes, a sequence number of the first beam in the plurality of beams is K, and the sequence number K represents a location of the first beam in the L beams. The following uses a sequence number as an example for description, and sequence numbers of a plurality of beams start from 1. For example, in an FR1 frequency band, in response to the configuration of the inOneGroup IE included in the ssb-PositionsInBurst being [1 0 1 1 0 0 0 0], the network device actually sends three beams, and index values are respectively 0, 2, and 3. In this case, sequence numbers of the three beams are respectively 1, 2, and 3 in ascending order of beam index values. In this example, in response to the index of the first beam being 0, in this case, the sequence number of the first beam is 1.

According to time-domain order, a sequence of the first listening occasion in the plurality of listening occasions is M. M is also represented by a sequence number of the first listening occasion in the plurality of listening occasions. The following uses the sequence number as an example for description. Starting from the first listening occasion in time-domain order in the first mapping window, sequence numbers increase in ascending order. The start value of the sequence numbers is any natural number. Optionally, the start value of the sequence numbers is 0. Alternatively, the start value of the sequence numbers is 1. The start value of the sequence numbers is not limited herein.

For example, a sequence number of a listening occasion in the first mapping window starts from 1. In response to a difference between a sequence number M of a listening occasion in the first mapping window and a sequence number of a beam being a natural multiple of a quantity L of beams, the listening occasion is a listening occasion that meets the first mapping relationship with the beam. Specifically, for example, the beam is a first beam, and the listening occasion that meets the first mapping relationship with the beam is a first listening occasion. In response to a difference between the sequence number M of the listening occasion in the first mapping window and the sequence number K of the first beam being a natural multiple of L (including 0 and a positive integer), the listening occasion belongs to the first listening occasion.

Optionally, the foregoing described first mapping relationship between the first beam and the first listening occasion in the first mapping window is represented as:

$M \bmod L = K$, where

L is the quantity of the plurality of beams sent by the network device in the cell to which the terminal device belongs, K is the sequence number of the first beam in the plurality of beams, K is a natural number from 1 to L, and K=1, 2, . . . , or L; and M is the sequence number of the first listening occasion in the plurality of listening occasions. The first beam is a specific beam corresponding to the terminal device in the plurality of beams. In other words, the terminal device efficiently receives downlink information and/or efficiently sends uplink information to the network device by using the first beam.

Optionally, the foregoing described first mapping relationship between the first beam and the first listening occasion in the first mapping window is further represented as:

The terminal device determines a quantity m of listening occasions in the first mapping window. The terminal device determines, based on a configuration of the search space of the first RNTI, a length of the first mapping window, and a time domain location, the quantity m of listening occasions in the first mapping window, that is, a total quantity of a plurality of listening occasions. For example, in FIG. 8, the quantity m of listening occasions in the first mapping window is 10. K is the sequence number of the first beam in the plurality of beams, and in the first mapping window, a listening occasion corresponding to the $K^{th}$ beam is the $[x \times L + K]^{th}$ listening occasion, that is, the listening occasion corresponding to the first beam is the $[x \times L + K]^{th}$ listening occasion in the first mapping window. x=0, 1, . . . , or X−1, X=CEIL (m/L), where CEIL indicates rounding up. K=1, 2, . . . , or L, where L is a quantity of a plurality of beams, that is, a quantity of beams sent by the network device in the cell to which the terminal device belongs. K is a natural number from 1 to L, and K=1, 2, . . . , or L.

The foregoing is also expressed as follows: The first mapping relationship between the first beam and the first listening occasion in the first mapping window meets $M = x \times L + K$, where M is a sequence number of the first listening occasion in the plurality of listening occasions. The first beam is a specific beam corresponding to the terminal device in the plurality of beams. In other words, the terminal device efficiently receives downlink information and/or efficiently sends uplink information to the network device by using the first beam.

The formula that the first mapping relationship between the first beam and the first listening occasion meets and the sequence numbers of the first beam and the first listening occasion are merely examples. The formula corresponding to the first mapping relationship has a plurality of variations, and a form of the sequence number has a plurality of variations. This is not limited in embodiments described herein.

The network device configures corresponding beam transmission resources on the plurality of listening occasions based on the mapping relationship between the plurality of beams and the plurality of listening occasions in the first mapping window of the first RNTI. The terminal device performs listening on the first listening occasion based on the first mapping relationship between the first beam and the first listening occasion in the first mapping window of the first RNTI. Specifically, the terminal device performs listening on any one of the first listening occasions corresponding to the first beam, and does not perform listening on a listening occasion corresponding to another beam; or the terminal device performs listening on a plurality of or all of the first listening occasions corresponding to the first beam.

S408: The network device sends, on the first listening occasion corresponding to the first beam by using the first beam, first information scrambled by using the first RNTI to the terminal device. Correspondingly, the terminal device listens, on the first listening occasion corresponding to the first beam, to the first information scrambled by using the first RNTI.

After determining the time domain start location of the first mapping window, the network device determines the time domain locations of the plurality of listening occasions in the first mapping window based on the configuration information of the search space. The network device performs beam sweeping starting from the first listening occasion in time-domain order in the first mapping window. Specifically, starting from the first listening occasion in time-domain order in the first mapping window, the network device sequentially and cyclically sends the plurality of beams on each listening occasion in the first mapping window in time-domain order in ascending order of beam index values. The method includes: The network device sends, based on the first mapping relationship, the first information by using the first beam on the first listening occasion corresponding to the first beam, where the first information is scrambled by using the first RNTI.

After determining the time domain start location of the first mapping window, the terminal device determines the time domain locations of the plurality of listening occasions in the first mapping window based on the configuration information of the search space. The terminal device listens, on the first listening occasion based on the first mapping relationship between the first beam and the first listening occasion, to the first information transmitted by using the first beam, where the first information is scrambled by using the first RNTI.

The first information is scrambled by using the first RNTI. Optionally, the first information includes downlink control information scrambled by using the first RNTI. Further optionally, the downlink control information scrambled by using the first RNTI is used to schedule a group of terminal devices. In other words, the first RNTI is used to schedule MBS service data. In this case, the first RNTI is a G-RNTI. Alternatively, the downlink control information is used to schedule a dedicated system information block. In this case, the first RNTI is an SI-RNTI. Alternatively, the first RNTI is a radio identifier used to schedule a change of MBS service control information.

Specifically, a specific beam selected by the terminal device through beam training is the first beam, and the terminal device determines a location of the first beam in the L beams by using index values of the L beams. The location is represented by a sequence number K of the first beam in the L beams in a beam sweeping process. The terminal device listens to the $K^{th}$, the $(K+L)^{th}$, the $(K+2L)^{th}$, the $(K+3L)^{th}$, the $(K+4L)^{th}$ . . . listening occasions in the first mapping window in time-domain order. To save energy and improve listening efficiency of the terminal device, the terminal device selects, in the first mapping window, a listening occasion corresponding to any first beam for listening, and obtains, without listening to a listening occasion corresponding to another beam, the first information that is transmitted by the first beam and that is scrambled by using the first RNTI. Alternatively, the terminal device listens to a plurality of or all of first listening occasions corresponding to the first beam, to obtain the first information that is transmitted by the first beam and that is scrambled by using the first RNTI.

For example, in steps S400 and S402, a quantity of beams is 3, and index values are 0, 2, and 3 respectively. In response to the index value of the first beam being 0, the sequence number of the first beam in the three beams is 1. The search space located in the first mapping window includes 10 listening occasions, and starting from the start location of the first mapping window, sequence numbers of the 10 listening occasions in time-domain order are first to tenth. In this example, the network device sequentially and cyclically sends three beams starting from a listening occasion whose sequence number is 1. The first listening occasion corresponding to the first beam is the first listening occasion, the fourth listening occasion, the seventh listening occasion, and the tenth listening occasion in the foregoing 10 listening occasions, or listening occasions whose sequence numbers are 1, 4, 7, and 10. The network device sends the first information to the terminal device on the first listening occasion, the fourth listening occasion, the seventh listening occasion, and the tenth listening occasion by using the first beam. Correspondingly, the terminal device listens to the first information on the first listening occasion, the fourth listening occasion, the seventh listening occasion, and the tenth listening occasion, or the listening occasions whose sequence numbers are 1, 4, 7, and 10, without listening to another listening occasion in the foregoing 10 listening occasions. Further, the terminal device selects one, more, or all of the first listening occasion, the fourth listening occasion, the seventh listening occasion, and the tenth listening occasion to perform listening.

In at least one embodiment, the first beam and the first listening occasion form the first mapping relationship in the first mapping window. In response to the network device and the terminal device transmitting information, the network device sends the first information to the terminal device on the first listening occasion by using the first beam. This avoids a problem that the network device does not send the first beam on the first listening occasion in response to configuring the first listening occasion by using the CORESET and the search space. Further, the terminal device listens to the first information on the first listening occasion by using the first beam, thereby avoiding invalid listening of the terminal device and improving listening efficiency.

Optionally, the method further includes: S408: The network device configures discontinuous reception (Discontinuous Reception, DRX).

Specifically, the network device configures DRX, to allow the terminal device to stop listening to the PDCCH/DCI on the listening occasion in a period of time. In other words, the terminal device does not listen to the PDCCH in a DRX inactive period. The DRX is DRX configured by the network device for the first RNTI. In this case, the terminal device stops listening to DCI scrambled by using the first RNTI in a period of time. Alternatively, the DRX is DRX configured by the network device for different RNTIs for scheduling all MBS services. In this case, the terminal device stops listening to DCI scrambled by using the different RNTIs in a period of time. The DCI includes DCI scrambled by using the first RNTI, or includes DCI scrambled by using another RNTI. Alternatively, the DRX is DRX configured by the network device for the terminal device based on a type or a level of the terminal device. Alternatively, the DRX is DRX configured by the network device for the terminal device. In this case, for the terminal device, the terminal device stops listening to the downlink control information DCI in a period of time indicated by the corresponding DRX. Alternatively, the DRX is DRX configured by the network device based on a predefined definition. This is not limited in embodiments described herein.

Optionally, the method further includes: S409: The network device sends DRX configuration information to the terminal device, and correspondingly, the terminal device receives the DRX configuration information.

Specifically, the DRX configuration information includes, but is not limited to, a DRX cycle, duration of an active period in the DRX cycle, and a third offset.

A time domain start location of the active period in each DRX cycle is determined based on the DRX cycle and the third offset. Optionally, the network device configures duration of the active period to meet that the network device completes at least one round of beam sweeping.

Optionally, the method further includes: S410: The network device and the terminal device determine a start location of an active period in a DRX cycle.

Specifically, the network device and the terminal device determines the time domain start location of the active period in each DRX cycle based on the DRX configuration information. Optionally, the third offset indicates an offset between a time domain start location of each DRX cycle and a time domain start location of an active period in each cycle. A relationship among the third offset, the DRX cycle, and the active period in each DRX cycle meets the following formula:

Subframe=$O_D$ mod 10;

SFN2 mod $T$=floor($O_D$/10); and $T=T_O/10$, where

SFN is a system frame number of a time domain start location of the active period; $O_D$ is the third offset; T is the DRX cycle; $T_O$ is duration of the active period; and Subframe is a subframe number of the time domain start location of the active period.

Optionally, to configure DRX more simply and effectively, the network device configures the time domain start location of the active period in the DRX cycle to be the same as the time domain start location of the mapping window in the at least one first RNTI cycle. Specifically, a subframe and a slot is converted, and locations indicated by SFN2 and Subframe in the foregoing formula is subsets of the SFN and the locations indicated by $n_{Slot}$. In this case, the time domain start location of the active period coincides with at least one start location at which a plurality of beams and a plurality of listening occasions starts to form a mapping relationship. This helps improve listening efficiency and air interface resource utilization, and avoid a waste of resources.

Figure 10:
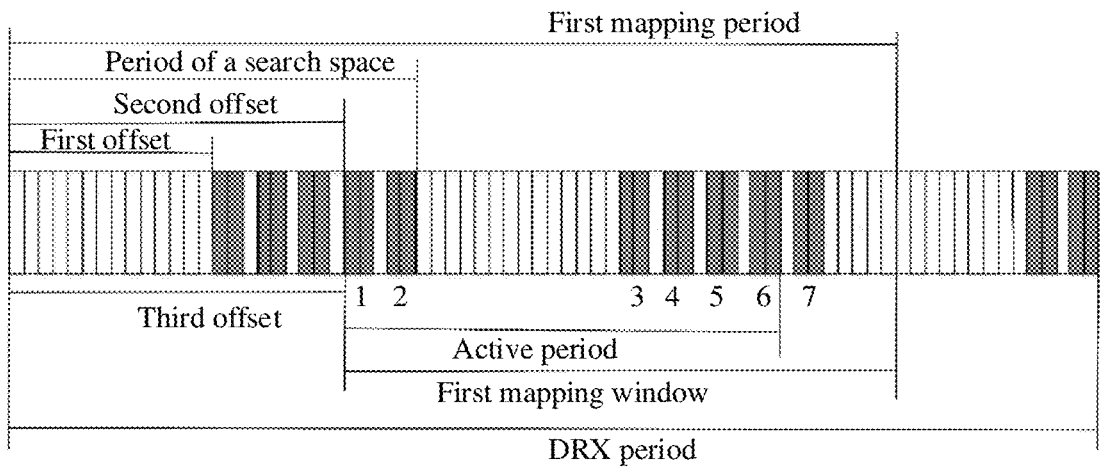
FIG. 10 is a schematic diagram of a relationship between a DRX cycle and a first mapping period according to at least one embodiment.

For example, in FIG. 10, the time domain start location of the active period configured by the network device is the same as the time domain start location of the first mapping window. In this case, in the plurality of listening occasions in the first mapping window, listening occasions that are simultaneously in the active period are listening occasions on which the terminal device performs listening. However, in response to there being a listening occasion that is not in the active period, the terminal device does not perform listening.

Optionally, the method further includes: S411: The network device and the terminal device determine a first listening sub-occasion.

Specifically, the network device and the terminal device determines a time domain location of the first listening sub-occasion based on the determined time domain start location of the active period and the time domain location of the first listening occasion. The first listening sub-occasion is a set of one or more listening occasions that are in the active period of the DRX cycle and that are in the first listening occasion.

For example, in FIG. 10, there are seven listening occasions in the first mapping window, and the network device actually sends three beams in the cell to which the terminal device belongs. Beam indexes are respectively 0, 2, and 3. The beam whose index is 0 is a beam selected by the terminal device through beam training, that is, the first beam. In this case, listening occasions that meet the first mapping relationship with the first beam in the first mapping window are the first listening occasion, the fourth listening occasion, and the seventh listening occasions. In this case, the first listening occasion is the first listening occasion, the fourth listening occasion, and the seventh listening occasion in the first mapping window. Further, in the first listening occasion, the listening occasions in the active period are the first listening occasion and the fourth listening occasion. In this case, the first listening sub-occasions of the first listening occasion are the first listening occasion and the fourth listening occasion in the first mapping window.

Optionally, the method further includes: S412: The network device sends the first information to the terminal device on the first listening sub-occasion by using the first beam. Correspondingly, the terminal device receives, on the first listening sub-occasion by using the first beam, the first information sent by the network device, where the first information is scrambled by using the RNTI.

The first information is scrambled by using the first RNTI. Optionally, the first information includes downlink control information scrambled by using the first RNTI. Further optionally, the downlink control information scrambled by using the first RNTI is used to schedule a group of terminal devices. In other words, the first RNTI is used to schedule MBS service data. In this case, the first RNTI is a G-RNTI. Alternatively, the downlink control information is used to schedule a dedicated system information block. In this case, the first RNTI is an SI-RNTI. Alternatively, the first RNTI is a radio identifier used to schedule a change of MBS service control information.

Example 1: Starting from the first listening occasion in the first mapping window of the first RNTI, the network device sequentially and cyclically sends a plurality of beams on the listening occasion in the first mapping window in time-domain order. The first listening occasions include the first listening sub-occasion and a second listening sub-occasion, where the second listening sub-occasion is a set of one or more listening occasions that are in the inactive period and that are in the first listening occasion. In this case, the network device sends the first beam on all listening occasions of the first listening occasion. For the terminal device, the terminal device determines the first listening occasion corresponding to the first beam, and the terminal device listens to the first information on the first listening sub-occasion of the first listening occasion by using the first beam based on the DRX configuration information. However, for the second listening sub-occasion in the inactive period, the terminal device chooses not to perform listening, so that power consumption of listening to the PDCCH/DCI by the terminal device is further reduced.

Example 2: The network device determines a first listening sub-occasion corresponding to the first beam, and the network device sends the first information only on the first listening sub-occasion that is in the DRX active period and that is in the first listening occasion by using the first beam, but does not send the first information on the second listening sub-occasion in the inactive period by using the first beam. For the terminal device, the terminal device listens to the first information on the first listening sub-occasion of the first listening occasion based on the DRX configuration information by using the first beam. However, the terminal device does not perform listening on the second listening sub-occasion in the inactive period, so that power consumption of listening to the DCI by the terminal device is further reduced.

It should be noted that an execution sequence of S400 to S412 in FIG. 4 is merely an example for description, and is not intended to limit embodiments described herein.

Figure 5:
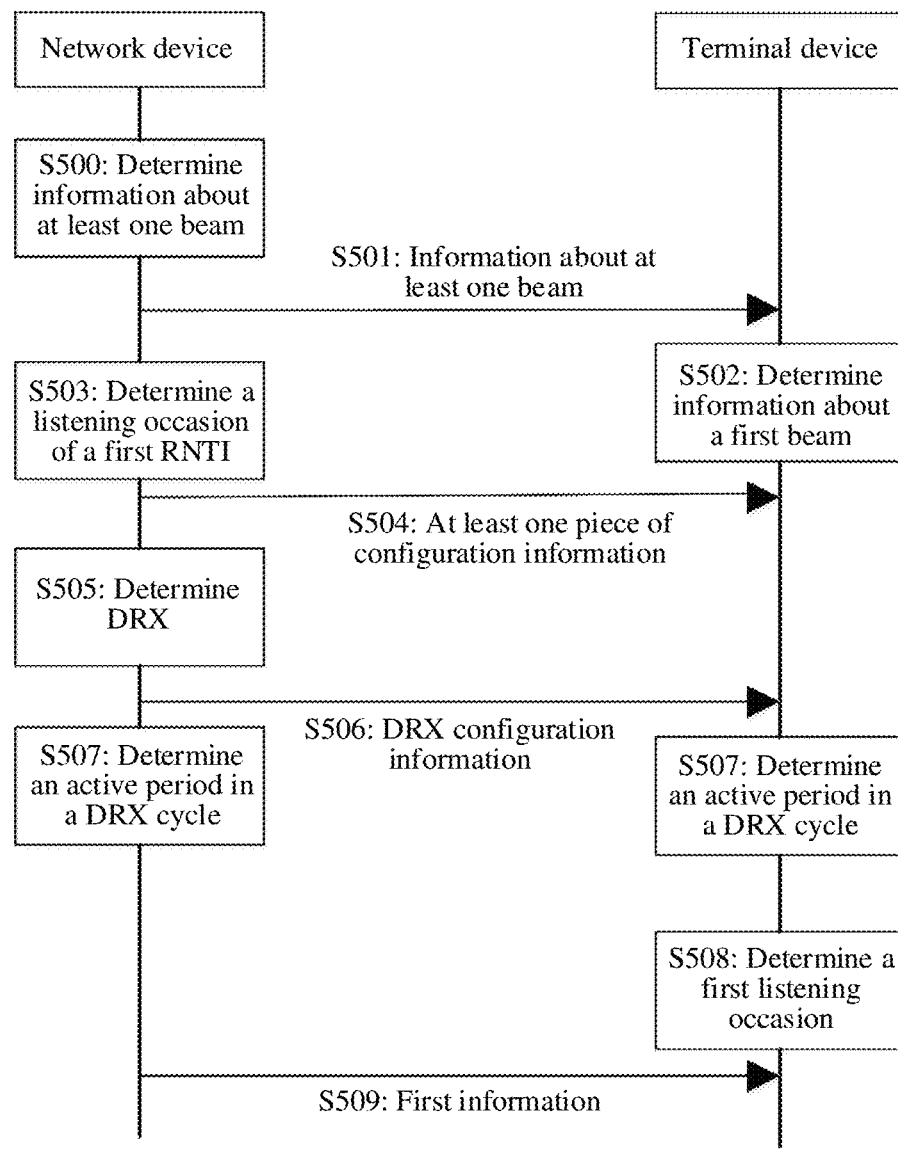
FIG. 5 is a schematic flowchart of another information transmission method according to at least one embodiment.

FIG. 5 shows another information transmission method according to at least one embodiment. The method is performed by a terminal device and a network device, or is performed by a chip in the terminal device and a chip in the network device. The network device in FIG. 5 is the access network device 10 in FIG. 1, and the terminal device is the terminal device 20 in FIG. 1. The method shown in FIG. 5 includes the following operations.

S500: A network device determines information about at least one beam.

The at least one beam is a beam sent by the network device in a cell to which a terminal device belongs, the information about the at least one beam includes a quantity L of the at least one beam and an index of each beam, and L is a positive integer.

S501: The network device sends the information about the at least one beam to a terminal device. Correspondingly, a first terminal device receives and determines the information about the at least one beam.

In an optional design, the information about the at least one beam is carried in a SIB1. Specifically, the information about the at least one beam is notified to the terminal device by using ssb-PositionsInBurst in the SIB1. For detailed descriptions, refer to related descriptions of step S200 in the example in FIG. 2. Details are not described herein again.

S502: The terminal device determines information about a first beam. The first beam is used by the first terminal device to receive information from the network device.

Specifically, the first beam is a specific beam that is selected by the terminal device through beam training and that is used to efficiently receive downlink information and/or send uplink information.

The information about the first beam is an index value of the first beam, and the index value of the first beam is understood as a location of the first beam in the L beams. For details, refer to related descriptions in step S402 in FIG. 4. Details are not described herein again.

S503: The network device determines a listening occasion of a first RNTI.

Specifically, the listening occasion of the first RNTI is a time-frequency resource that is configured by the network device and that is used by the terminal device to listen to DCI scrambled by using the first RNTI, and the DCI is carried by a PDCCH. The network device configures a control resource set CORESET of the listening occasion of the first RNTI and a search space corresponding to the CORESET, and the terminal device listens to, on the listening occasion of the first RNTI, information scrambled by using the first RNTI. The listening occasion of the first RNTI is a set of listening occasions of the downlink control information scrambled by using the first RNTI.

The search space is a dedicated search space configured by the network device for the listening occasion of the first RNTI, or is an MBS search space configured by the network device for the listening occasion of the RNTI of the DCI for scrambling all MBS services, or is a common search space (common search spaces). For details, refer to related descriptions in step S403 in FIG. 4. Details are not described herein again.

S504: The network device sends at least one piece of configuration information to the terminal device, and correspondingly, the terminal device receives the at least one piece of configuration information sent by the network device.

Specifically, the configuration information indicates a period of a search space and an offset of the search space, and the search space is a search space of the listening occasion of the first RNTI. For a relationship between the period of the search space and the offset of the search space, refer to related descriptions in step S406 in FIG. 4. Details are not described herein again.

S505: The network device configures discontinuous reception (Discontinuous Reception, DRX).

Specifically, the network device configures DRX, to allow the terminal device to stop listening to the DCI on the listening occasion in a period of time. Specifically, through the DRX configuration, the terminal device stops listening in a period of time.

In a design, the DRX is DRX corresponding to the first RNTI. Therefore, the terminal device stops listening, in a period of time (which is understood as an inactive period) configured by using the DRX, the DCI scrambled by using the first RNTI. In other words, the listening occasion of the first RNTI is in an active period configured by using the DRX.

In another design, the DRX is DRX corresponding to all MBS services transmitted in the cell to which the terminal device belongs. In other words, the DRX is DRX corresponding to a G-RNTI, and a configuration of the DRX is applied to listening to DCI scrambled by using any G-RNTI. For example, through the configuration, the terminal device stops, in a period of time, listening to DCI that is used to schedule all MBS services and that is in the cell to which the terminal device belongs.

In still another design, the DRX is DRX corresponding to an RNTI, and a configuration of the DRX is applied to listening to DCI scrambled by using any RNTI. In this case, the terminal device stops listening, in a period of time, DCI scrambled by using any RNTI, where the DCI includes DCI scrambled by using the first RNTI, and further includes DCI scrambled by using another RNTI.

In yet another design, the DRX alternatively is DRX corresponding to a type or a level of the terminal device. In other words, there is a correspondence between a type or a level of the terminal device and a DRX configuration. The terminal device stops listening to the downlink control information DCI in a period of time indicated by the corresponding DRX configuration.

In another design, DRX is predefined or pre-configured, for example, agreed in a protocol, or configured by using higher layer signaling or physical layer signaling. This is not limited in embodiments described herein.

S506: The network device sends DRX configuration information to the terminal device, and correspondingly, the terminal device receives the DRX configuration information.

Specifically, the DRX configuration information includes, but is not limited to, at least one of a DRX cycle, duration of an active period in the DRX cycle, and a third offset, where the third offset is an offset of the active period in the DRX cycle.

A time domain start location of the active period in each DRX cycle is determined based on the DRX cycle and the third offset.

S507: The network device and the terminal device determine a start location of an active period in a DRX cycle.

Specifically, the network device and the terminal device determines the time domain start location of the active period in each DRX cycle based on the DRX configuration information. Optionally, the third offset indicates an offset between a time domain start location of each DRX cycle and a time domain start location of an active period in each cycle. A relationship among the third offset, the DRX cycle, and the active period in each DRX cycle meets the following formula:

$$\text{Subframe} = O_D \bmod 10;$$

$$\text{SFN} \bmod T = \text{floor}(O_D/10); \text{ and}$$

$$T = T_O/10, \text{ where}$$

SFN is a system frame number of a time domain start location of the active period; $O_D$ is the third offset; T is the DRX cycle; $T_O$ is duration of the active period; and Subframe is a subframe number of the time domain start location of the active period.

Figure 11:
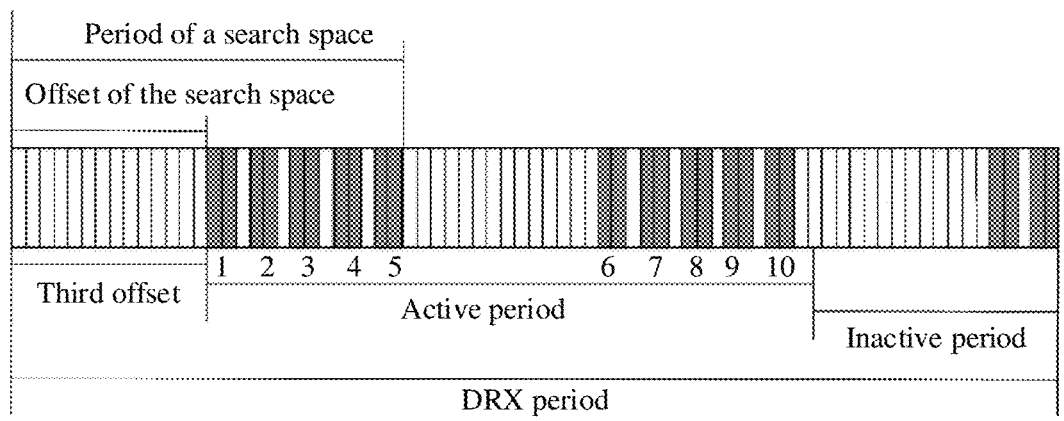
FIG. 11 is a schematic diagram of a relationship between a DRX cycle and a period of a search space according to at least one embodiment.

Optionally, to configure DRX more simply and effectively, the network device configures the time domain start location of the active period in the DRX cycle to be the same as the time domain start location of at least one search space. This helps improve listening efficiency. FIG. 11 is a schematic diagram of a relationship between a DRX cycle and a period of a search space. In this case, an active period in the DRX cycle overlaps a time domain start location of at least one search space.

S508: Determine a first listening occasion corresponding to the first beam.

The network device and the terminal device determine the time domain start location of the active period. In the active period in the at least one DRX cycle, the first beam and the first listening occasion meet the first mapping relationship, and the first listening occasion is a set of one or more listening occasions that are in the listening occasion of the first RNTI and that are in the active period in the at least one DRX cycle.

There are a plurality of listening occasions corresponding to a plurality of beams in the active period of the at least one DRX cycle, each of the plurality of beams and a listening occasion corresponding to the plurality of beams meet a first mapping relationship, and the plurality of beams are beams sent by the network device in the cell to which the terminal device belongs, that is, the L beams described in S500. The plurality of listening occasions are listening occasions in the active period of the at least one DRX cycle in listening occasions of the first RNTI.

Specifically, for a mapping relationship between a plurality of beams and a plurality of listening occasions in the active period of the at least one DRX cycle, refer to the mapping relationship between the plurality of beams and the listening occasions in the first mapping window in step S407 in FIG. 4. Details are not described herein again. Optionally, the network device configures duration of the active period to meet that the network device completes at least one round of beam sweeping.

S509: The network device sends first information to the terminal device on the first listening occasion by using the first beam. Correspondingly, the terminal device receives, on the first listening occasion by using the first beam, the first information sent by the network device, where the first information is scrambled by using the RNTI.

After determining the time domain start location of the active period in the DRX cycle, the network device determines the time domain locations of the plurality of listening occasions in the active period based on the configuration information of the search space. The network device performs beam sweeping starting from the first listening occasion in time-domain order in the active period. Specifically, starting from the first listening occasion in time-domain order in the first mapping window, the network device sequentially and cyclically sends the plurality of beams on each listening occasion in the active period in time-domain order in ascending order of beam index values. The method includes: The network device sends, based on the first mapping relationship, the first information by using the first beam on the first listening occasion corresponding to the first beam, where the first information is scrambled by using the first RNTI.

After determining the time domain start location of the active period in the DRX cycle, the terminal device determines the time domain locations of the plurality of listening occasions in the active period based on the configuration information of the search space. The terminal device listens, on the first listening occasion based on the first mapping relationship between the first beam and the first listening occasion, to the first information transmitted by using the first beam, where the first information is scrambled by using the first RNTI.

The first information is scrambled by using the first RNTI. Optionally, the first information includes downlink control information scrambled by using the first RNTI. Further optionally, the downlink control information scrambled by using the first RNTI is used to schedule a group of terminal devices. In other words, the first RNTI is used to schedule MBS service data. In this case, the first RNTI is a G-RNTI. Alternatively, the downlink control information is used to schedule a dedicated system information block. In this case, the first RNTI is an SI-RNTI. Alternatively, the first RNTI is a radio identifier used to schedule a change of MBS service control information.

Specifically, a specific beam selected by the terminal device through beam training is the first beam, and the terminal device determines a location of the first beam in the L beams by using index values of the L beams. The location is represented by a sequence number K of the first beam in the L beams in a beam sweeping process. The terminal device listens to the $K^{th}$, the $(K+L)^{th}$, the $(K+2L)^{th}$, the $(K+3L)^{th}$, the $(K+4L)^{th}$ . . . listening occasions in the active period in time-domain order. The terminal device chooses not to listen to a listening occasion corresponding to another beam in the active period. Further, the terminal device listens to one, a plurality of or all of first listening occasions corresponding to the first beam, to obtain the first information that is transmitted by the first beam and that is scrambled by using the first RNTI.

For example, in steps S500 and S502, a quantity of beams is 3, and index values are 0, 2, and 3 respectively. In response to the index value of the first beam being 0, the sequence number of the first beam in the three beams is 1. The search space located in the active period includes 10 listening occasions, and starting from the time domain start location of the active period, sequence numbers of the 10 listening occasions in time-domain order are first to tenth. In this example, the network device sequentially and cyclically sends three beams starting from a listening occasion whose sequence number is 1. The first listening occasion corresponding to the first beam is the first listening occasion, the fourth listening occasion, the seventh listening occasion, and the tenth listening occasion in the foregoing 10 listening occasions, or listening occasions whose sequence numbers are 1, 4, 7, and 10. The network device sends the first information to the terminal device on the first listening occasion, the fourth listening occasion, the seventh listening occasion, and the tenth listening occasion by using the first beam. Correspondingly, the terminal device listens to the first information on the first listening occasion, the fourth listening occasion, the seventh listening occasion, and the tenth listening occasion, or the listening occasions whose sequence numbers are 1, 4, 7, and 10, without listening to another listening occasion in the foregoing 10 listening occasions. Further, the terminal device selects one, more, or all of the first listening occasion, the fourth listening occasion, the seventh listening occasion, and the tenth listening occasion to perform listening.

In at least one embodiment, the first beam and the first listening occasion form the first mapping relationship in the active period. In response to the network device and the terminal device transmitting information, the network device sends the first information to the terminal device on the first listening occasion by using the first beam. This avoids a problem that the network device does not send the first beam on the first listening occasion in response to configuring time-frequency information of the first listening occasion by using the CORESET and the search space. The terminal device listens to the first information on the first listening occasion by using the first beam, thereby avoiding invalid listening and improving listening efficiency.

It should be noted that an execution sequence of S500 to S509 in FIG. 5 is merely an example for description, and is not intended to limit embodiments described herein.

Figure 6:
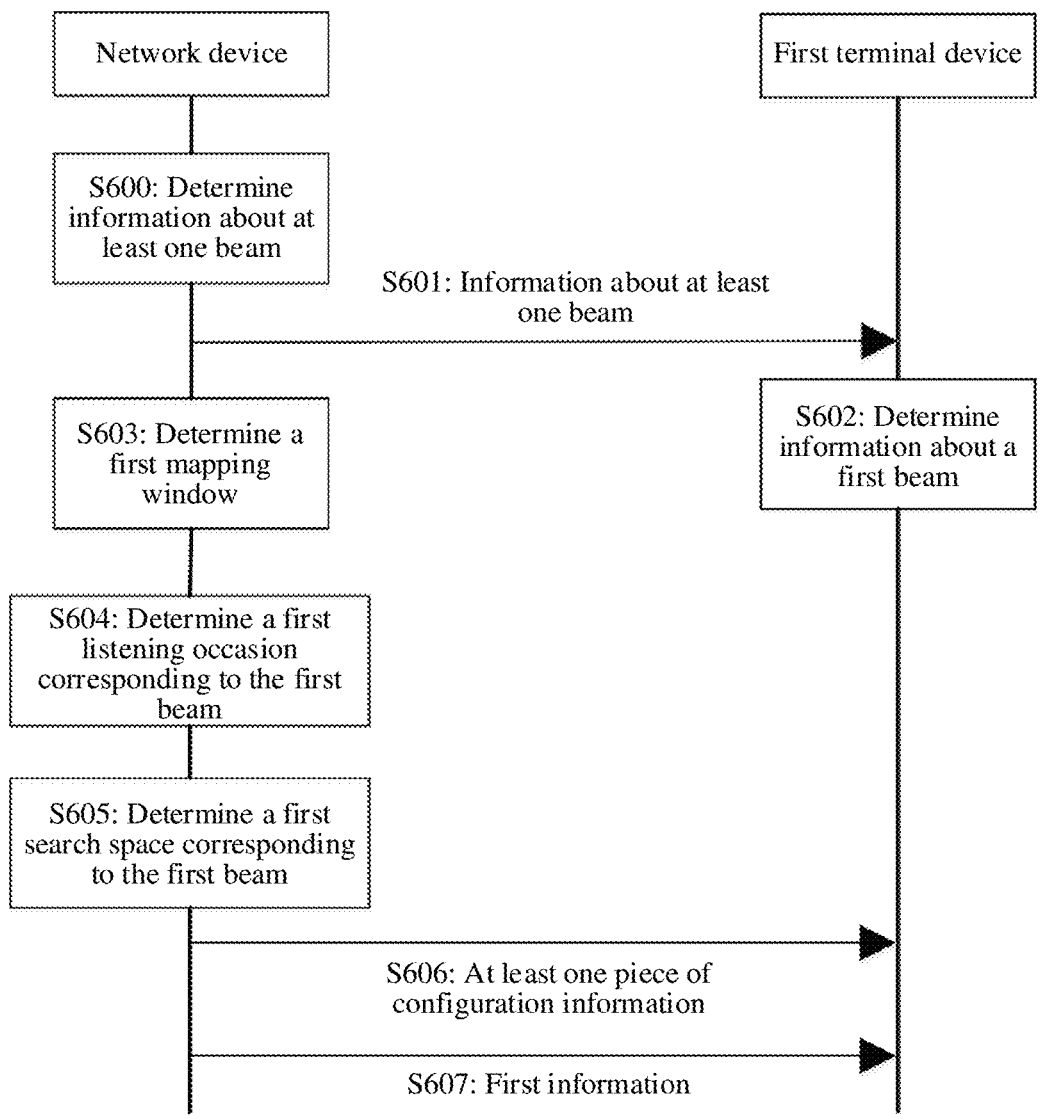
FIG. 6 is a schematic flowchart of another information transmission method according to at least one embodiment.

As shown in FIG. 6, at least one embodiment provides another information transmission method. The method is performed by a first terminal device and a network device, or is performed by a chip in the first terminal device and a chip in the network device. The network device in FIG. 6 is the access network device 10 in FIG. 1, and the first terminal device is the terminal device 20 in FIG. 1. The method shown in FIG. 6 includes the following operations.

S600: A network device determines information about at least one beam.

The at least one beam is a beam sent by the network device in a cell to which a first terminal device belongs, the information about the at least one beam includes a quantity L of the at least one beam and an index of each beam, and L is a positive integer.

S601: The network device sends the information about the at least one beam to a first terminal device. Correspondingly, the first terminal device receives and determines the information about the at least one beam.

In an optional design, the information about the at least one beam is carried in a SIB1. Specifically, the information about the at least one beam is notified to the first terminal device by using ssb-PositionsInBurst in the SIB1. For detailed descriptions, refer to related descriptions of step S200 in the example in FIG. 2. Details are not described herein again.

S602: The first terminal device determines information about a first beam. The first beam is used by the first terminal device to receive information from the network device.

Optionally, the first beam is a specific beam that is selected by the first terminal device through beam training and that is used to efficiently receive downlink information sent by the network device and/or send uplink information to the network device.

The information about the first beam is an index value of the first beam, and the index value of the first beam is understood as a location of the first beam in a plurality of beams. Specifically, the first terminal device determines, in a beam training manner based on the received information about the at least one beam, that the first beam is a specific beam corresponding to the information among the L beams, and the first terminal device determines the location of the first beam in the L beams based on the index value of the first beam. Optionally, the location corresponds to a sequence of the first beam in a process of sweeping the L beams. The location of the first beam in the L beams is represented by a sequence number of the first beam in a process of performing beam sweeping on the L beams.

S603: The network device determines a first mapping window. Further, the network device determines a time domain start location of the first mapping window.

Specifically, the network device determines a mapping period of a first RNTI and a first offset. The mapping period of the first RNTI and the first offset indicates the first mapping window, and the mapping period of the first RNTI, the first offset, and the first mapping window meet a predefined rule. The predefined rule indicates at least one time domain location, and the network device and the first terminal device use the at least one time domain location as a time domain start location at which a mapping relationship is formed from a listening occasion of the L beams and the first RNTI, which is alternatively referred to as a time domain start location of at least one mapping window. Using the first mapping period as an example, a time domain location in the first mapping period in at least one time domain location indicated by the mapping period of the first RNTI and the first offset is the time domain start location of the first mapping window. Specifically, the first offset indicates an offset between the time domain start location of the first mapping period and the time domain start location of the first mapping window.

The time domain start location of the first mapping window meets a predefined rule. Optionally, the time domain start location of the first mapping window includes a system frame number of the time domain start location and a slot number of the time domain start location. The system frame number and the slot number meet a predefined rule. For the predefined rule, refer to related descriptions in step S406 in FIG. 4. Details are not described herein again.

Further optionally, the first offset is an offset of a search space, where the search space is a search space of the listening occasion of the first RNTI; or the first offset is a dedicated offset configured by the network device for the first mapping window. For the specific configuration, refer to related descriptions in step S406 in FIG. 4. Details are not described herein again.

S604: The network device determines a first listening occasion corresponding to the first beam.

Specifically, the first beam and the first listening occasion meet a first mapping relationship, the first listening occasion is a set of one or more listening occasions that are in the listening occasions of the first RNTI and that are in the first mapping window within the first mapping period and that meet the first mapping relationship with the first beam, and the listening occasion of the first RNTI is a set of listening occasions of downlink control information scrambled by using the first RNTI. Optionally, the first mapping period is any mapping period of the first RNTI, and the first mapping window is duration that is located in the first mapping period and that is determined based on the mapping period of the first RNTI and the first offset.

Specifically, there are a plurality of listening occasions corresponding to a plurality of beams in the first mapping window. The plurality of beams are in a one-to-one correspondence, in ascending order of index values, with the plurality of listening occasions that are in the first mapping window and that start from the first listening occasion in time domain in time-domain order. In response to the quantity of the plurality of listening occasions of the first RNTI in the first mapping window being greater than the quantity of beams sent by the network device in the cell to which the first terminal device belongs, in other words, in response to the quantity of the plurality of listening occasions in the first mapping window being greater than the quantity of the plurality of beams, starting from a listening occasion corresponding to a next first RNTI after one round of mapping is completed, a one-to-one correspondence starts from a beam with a smallest index value, and cycles sequentially. The first beam and the first listening occasion are used as an example for detailed description. The one round of mapping means that one round of beam sweeping is completed on a premise that a plurality of beams are mapped to a plurality of listening occasions. For detailed descriptions of a plurality of listening occasions corresponding to a plurality of beams in the first mapping window, refer to related descriptions in step 5406 in FIG. 4. Details are not described herein again.

For example, in ascending order of indexes, a sequence number of the first beam in the plurality of beams is K, and the sequence number K represents a location of the first beam in the L beams. The following uses a sequence number as an example for description, and sequence numbers of a plurality of beams starts from 1. For example, in an FR1 frequency band, in response to the configuration of the inOneGroup IE included in the ssb-PositionsInBurst being [1 0 1 1 0 0 0 0], the network device actually sends three beams, and index values are respectively 0, 2, and 3. In this case, sequence numbers of the three beams are respectively 1, 2, and 3 in ascending order of beam index values. In this example, in response to the index of the first beam being 0, in this case, the sequence number of the first beam is 1.

According to time-domain order, a sequence of the first listening occasion in the plurality of listening occasions is M. M is also represented by a sequence number of the first listening occasion in the plurality of listening occasions. The following uses the sequence number as an example for description. Starting from the first listening occasion in time-domain order in the first mapping window, sequence numbers increase in ascending order. The start value of the sequence numbers is any natural number. Optionally, the start value of the sequence numbers is 0. Alternatively, the start value of the sequence numbers is 1. The start value of the sequence numbers is not limited herein.

For example, a sequence number of a listening occasion in the first mapping window starts from 1. In response to a difference between a sequence number M of a listening occasion in the first mapping window and a sequence number of a beam being a natural multiple of a quantity L of beams, the listening occasion is a listening occasion that meets the first mapping relationship with the beam. Specifically, for example, the beam is a first beam, and the listening occasion that meets the first mapping relationship with the beam is a first listening occasion. In response to a difference between the sequence number M of the listening occasion in the first mapping window and the sequence number K of the first beam being a natural multiple of L (including 0 and a positive integer), the listening occasion belongs to the first listening occasion.

Optionally, the foregoing described first mapping relationship between the first beam and the first listening occasion in the first mapping window is represented as:

$M \bmod L = K$, where

L is the quantity of the plurality of beams sent by the network device in the cell to which the first terminal device belongs, K is the sequence number of the first beam in the plurality of beams, K is a natural number from 1 to L, and K=1, 2, . . . , or L; and M is the sequence number of the first listening occasion in the plurality of listening occasions. The first beam is a specific beam corresponding to the first terminal device in the plurality of beams. In other words, the first terminal device efficiently receives downlink information and/or efficiently sends uplink information to the network device by using the first beam.

Optionally, the foregoing described first mapping relationship between the first beam and the first listening occasion in the first mapping window is further represented as:

The first terminal device determines a quantity m of listening occasions in the first mapping window. The first terminal device determines, based on a configuration of the search space of the first RNTI, a length of the first mapping window, and a time domain location, the quantity m of listening occasions in the first mapping window, that is, a total quantity of a plurality of listening occasions. For example, in FIG. 8, the quantity m of listening occasions in the first mapping window is 10. K is the sequence number of the first beam in the plurality of beams, and in the first mapping window, a listening occasion corresponding to the $K^{th}$ beam is the $[x \times L + K]^{th}$ listening occasion, that is, the listening occasion corresponding to the first beam is the $[x \times L + K]^{th}$ listening occasion in the first mapping window. x=0, 1, . . . , or X−1, X=CEIL (m/L), where CEIL indicates rounding up. K=1, 2, . . . , or L, where L is a quantity of a plurality of beams, that is, a quantity of beams sent by the network device in the cell to which the first terminal device belongs. K is a natural number from 1 to L, and K=1, 2, . . . , or L.

The foregoing is also expressed as follows: The first mapping relationship between the first beam and the first listening occasion in the first mapping window meets $M = x \times L + K$, where M is a sequence number of the first listening occasion in the plurality of listening occasions. The first beam is a specific beam corresponding to the first terminal device in the plurality of beams. In other words, the first terminal device efficiently receives downlink information and/or efficiently sends uplink information to the network device by using the first beam.

The formula that the first mapping relationship between the first beam and the first listening occasion meets and the sequence numbers of the first beam and the first listening occasion are merely examples. The formula corresponding to the first mapping relationship has a plurality of variations, and a form of the sequence number has a plurality of variations. This is not limited in embodiments described herein.

S605. The network device determines a first search space corresponding to the first beam.

For the L beams, the network device determines, based on a mapping relationship between a plurality of beams and a plurality of listening occasions in the first mapping window, a listening occasion corresponding to each of the L beams. The network device configures a search space for each of the L beams, and the L beams correspond to L search spaces. Optionally, the L search spaces are configured in a unit of a slot. For example, duration of the search space in each period of the L search spaces is one slot, and listening occasions corresponding to each beam are at different locations in one slot, or listening occasions corresponding to different beams occupy different symbols in one slot. The L beams are beams actually sent by the network device in the cell to which the first terminal device belongs in step S600. Each beam corresponds to one terminal device, and each beam corresponds to one search space. An example in which the first beam corresponds to the first terminal device and the first beam corresponds to the first search space is used for detailed description.

The network device determines, based on a first mapping relationship that the first beam and the first listening occasion meet, the search space corresponding to the first listening occasion as the first search space. Because the first beam corresponds to the first listening occasion, the first listening occasion also corresponds to the first terminal device that uses the first beam as a specific beam in this case, and the first terminal device listens to the first RNTI by using the first search space. The listening occasion determined by the first search space corresponds to only the first beam.

The network device configures the first search space for the first beam, and the network device determines the first listening occasion. The listening occasion of the first RNTI is a time-frequency resource that is configured by the network device and that is used by the terminal device to listen to downlink control information DCI scrambled by using the first RNTI, and the downlink control information DCI is carried by a PDCCH.

The first search space is configured in a plurality of possibilities. For example, the first search space is a search space that corresponds to the first beam and that is in the search space configured by the network device for the listening occasion of the first RNTI. In this case, all listening occasions in the first search space are the listening occasions of the first RNTI.

Alternatively, the first search space is a search space that is in the common search space and that corresponds to the first beam. In this case, the listening occasion in the first search space includes a listening occasion of the first RNTI, and further includes a listening occasion of another RNTI.

Alternatively, the first search space is a search space that corresponds to the first beam and that is in search spaces configured by the network device for different RNTIs scheduling different MBS services. In this case, the listening occasions in the first search space are listening occasions of RNTIs scrambling DCI of all MBS services of the cell of the first terminal device.

Optionally, the first RNTI is an identifier used to perform MBS service scheduling, for example, a G-RNTI; or is an RNTI for scheduling a dedicated system information block, for example, an SI-RNTI; or the first RNTI is a radio identifier used to schedule a change of MBS service control information.

The network device determines the search space corresponding to the first listening occasion as the first search space. In other words, the listening occasion of the first search space corresponds only to the first beam. For the first terminal device that uses the first beam as a specific beam, the first terminal device listens, in the first search space, to the downlink control information scrambled by using the first RNTI.

Figure 12:
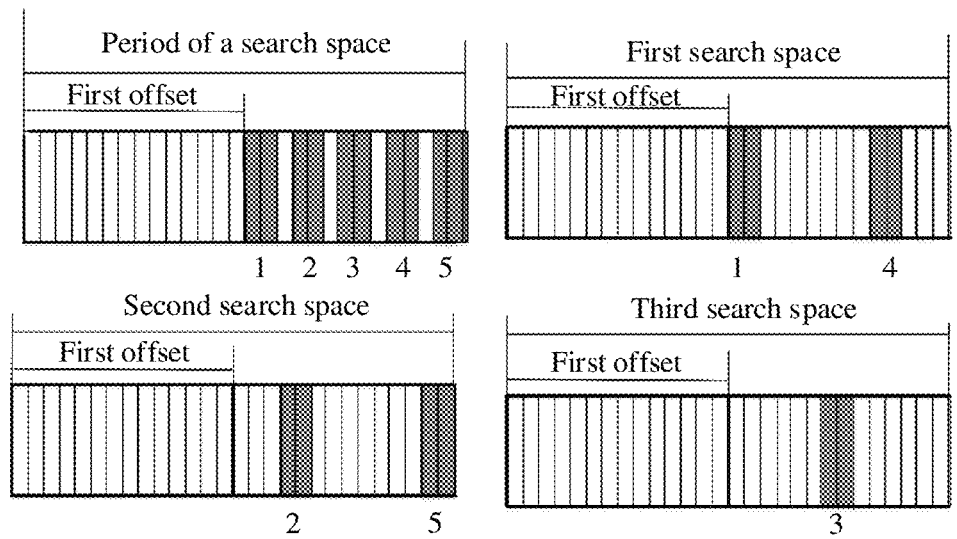
FIG. 12 is a schematic diagram of a relationship between information about a first listening occasion and a first search space according to at least one embodiment.

For example, as shown in FIG. 12, the network device sends three beams in the cell to which the first terminal device belongs, where beam index values are 0, 2, and 3 respectively. The first beam corresponds to the beam whose index is 0, the second beam corresponds to the beam whose index is 2, and the third beam corresponds to the beam whose index is 3. One slot includes 14 symbols and corresponds to five listening occasions, and each listening occasion occupies two symbols. In this case, the first listening occasion in time-domain order corresponds to the first beam, the second listening occasion corresponds to the second beam, the third listening occasion corresponds to the third beam, the fourth listening occasion corresponds to the first beam, and the fifth listening occasion corresponds to the second beam. Each beam corresponds to one search space. In this case, the network device determines, by using a correspondence between a beam and a listening occasion in one slot, a search space corresponding to each of the three beams. The first beam corresponds to a first search space, and a listening occasion of the first search space is a listening occasion corresponding to the first beam, that is, the first listening occasion and the fourth listening occasion. Similarly, the second beam corresponds to a second search space, and a listening occasion of the second search space is a listening occasion corresponding to the second beam, that is, the second listening occasion and the fifth listening occasion. The third beam corresponds to a third search space, and a listening occasion of the third search space is a listening occasion corresponding to the third beam, that is, the third listening occasion.

S606: The network device sends at least one piece of configuration information to the first terminal device, and correspondingly, the first terminal device receives the at least one piece of configuration information sent by the network device.

Specifically, the at least one piece of configuration information includes configuration information of the first search space, for example, at least one of a period of the first search space, an offset of the first search space, duration of the first search space, or location information of the first listening occasion. The location information of the first listening occasion is a symbol that is listened in each slot of the first search space, or the location information of the first listening occasion is at least one symbol number occupied by the first listening occasion in one slot of the first search space. Specifically, for a relationship between the period of the first search space and the offset of the first search space, refer to related descriptions in step S406 in FIG. 4. Details are not described herein again.

Optionally, the at least one piece of configuration information is carried in a system message. For example, the information about the first listening occasion is carried in a system information block 1 (SIB1), or the information about the first listening occasion is carried in another system information block (another SIB).

Optionally, the information about the first listening occasion is notified by the network device to the first terminal device in a broadcast manner, and the first terminal device receives the information about the first listening occasion through broadcast. The first search space is configured by using the SIB1 or the another system information blocks (other SIBs); or is configured by using a multicast logical channel, for example, an MCCH; or is configured by using dedicated radio resource control (Radio Resource Control, RRC) information, for example, RRC release. This is not limited herein.

S607: The network device sends first information to the terminal device on the first listening occasion by using the first beam. Correspondingly, the terminal device listens to the first information on the first listening occasion.

Specifically, the network device sends the first beam on the first listening occasion of the first search space. The terminal device receives the first information on the first listening occasion of the first search space based on the at least one piece of configuration information by using the first beam.

Specifically, the first information is scrambled by using the first RNTI. Optionally, the first information is downlink control information scrambled by using the RNTI. Further optionally, the downlink control information is used to schedule a group of terminal devices. In other words, the first RNTI is used to schedule MBS service data. In this case, the first RNTI is a group RNTI G-RNTI. Alternatively, the downlink control information is used to schedule a dedicated system information block. In this case, the first RNTI is an SI-RNTI. Alternatively, the first RNTI is a radio identifier used to schedule a change of MBS service control information.

For example, in FIG. 12, the first terminal device corresponds to the first beam, the second terminal device corresponds to the second beam, and the third terminal device corresponds to the third beam. For the first search space, the location information of the first listening occasion is [1 1 0 0 0 0 0 0 1 1 0 0 0]. In this case, the location information of the first listening occasion indicates that the first listening occasion occupies the first, second, tenth, and eleventh symbol number in one slot of the first search space. The first terminal device listens to the first information at locations of the first, second, tenth, and eleventh symbol numbers in one slot of the first search space based on the location information of the first listening occasion. For the second search space, location information of a listening occasion corresponding to the second beam is [0 0 0 1 1 0 0 0 0 0 0 1 1] in this case, and the second terminal device listens to the first information at locations of the third, fourth, thirteenth, and fourteenth symbol numbers in one slot of the second search space. For the third search space, location information of a listening occasion corresponding to the third beam is [0 0 0 0 0 0 1 1 0 0 0 0 0 0] in this case, and the third terminal device listens to the first information at locations of the seventh and the eighth symbol numbers in one slot of the third search space.

Based on the foregoing solution, because the first beam corresponds to the first terminal device, the network device configures the first search space for the first beam, and the network device configures the transmission resource of the first beam on the first listening occasion of the first search space, thereby improving a resource transmission success rate. The first terminal device listens to the first information on the first listening occasion of the first search space, thereby avoiding invalid listening. Further, the first terminal device selects any one or more, or all of the first listening occasions to perform listening, instead of listening to a listening occasion of a search space corresponding to another beam.

It should be noted that an execution sequence of S600 to S607 in FIG. 6 is merely an example for description, and is not intended to limit embodiments described herein.

Figure 7:
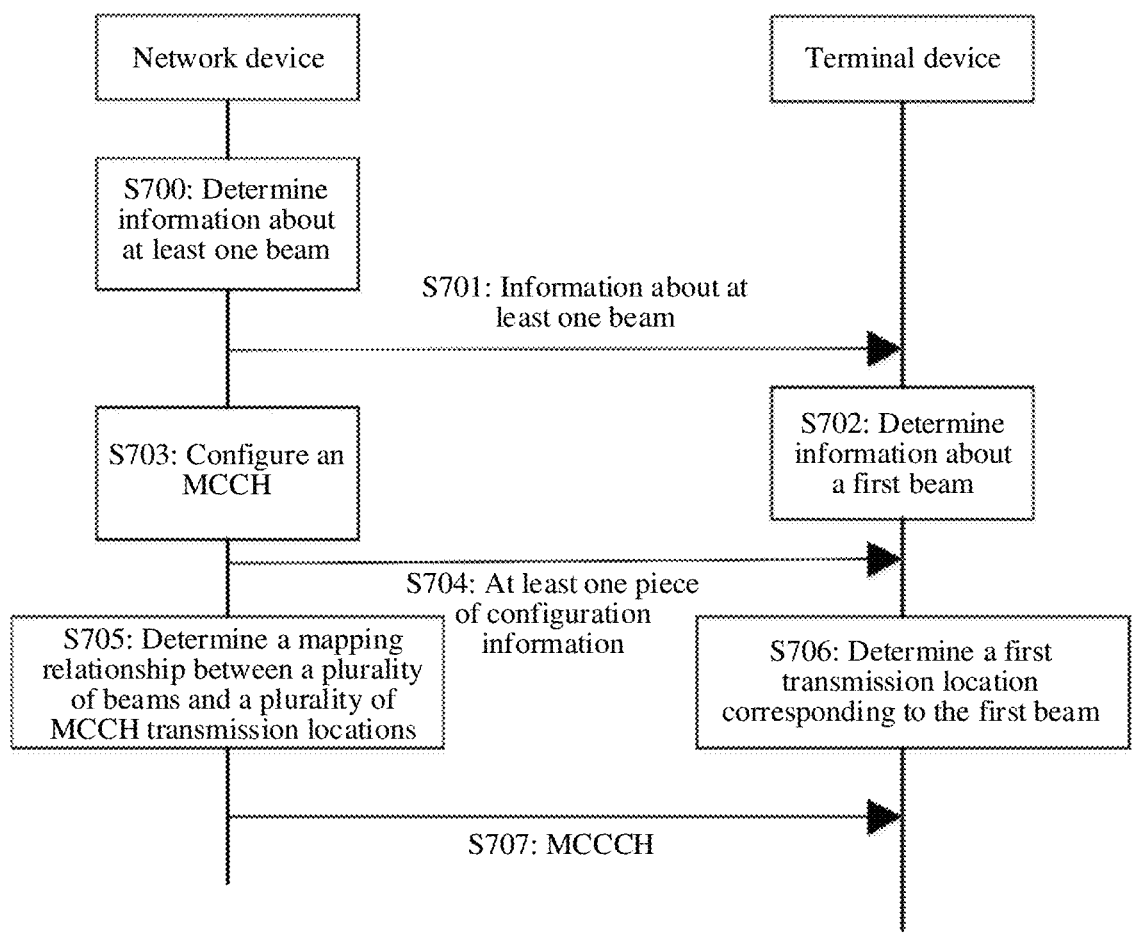
FIG. 7 is a schematic flowchart of another information transmission method according to at least one embodiment.

FIG. 7 shows another information transmission method according to at least one embodiment. The method is performed by a terminal device and a network device, or is performed by a chip in the terminal device and a chip in the network device. A network device in FIG. 7 is the access network device 10 in FIG. 1, and a terminal device is the terminal device 20 in FIG. 1. The method shown in FIG. 7 includes the following operations.

S700: A network device determines information about at least one beam.

The at least one beam is a beam sent by the network device in a cell to which a terminal device belongs, the information about the at least one beam includes a quantity L of the at least one beam and an index of each beam, and L is a positive integer.

S701: The network device sends the information about the at least one beam to a terminal device. Correspondingly, the terminal device receives and determines the information about the at least one beam.

In an optional design, the information about the at least one beam is carried in a SIB1. Specifically, the information about the at least one beam is notified to the terminal device by using ssb-PositionsInBurst in the SIB1. For detailed descriptions, refer to related descriptions of step S200 in the example in FIG. 2. Details are not described herein again.

S702: The terminal device determines information about a first beam. The first beam is used by the terminal device to receive information from the network device.

Specifically, the first beam is a specific beam that is selected by the terminal device through beam training and that is used to efficiently receive downlink information and/or send uplink information.

The information about the first beam is an index value of the first beam, and the index value of the first beam is understood as a location of the first beam in the L beams. Specifically, the terminal device determines, in a beam training manner based on the received information about the at least one beam, that the first beam is a specific beam corresponding to the information among the L beams, and the terminal device determines the location of the first beam in the L beams based on the index value of the first beam. Optionally, the location corresponds to a sequence of the first beam in a process of sweeping the L beams. The location of the first beam in the L beams is represented by a sequence number of the first beam in a process of performing beam sweeping on the L beams.

S703: The network device configures a multicast/multicast control logical channel (Multicast Control Channel, MCCH).

Specifically, the MCCH is a multicast/multicast control logical channel, and is used to transmit multicast/multicast control information.

Specifically, the MCCH configuration includes, but is not limited to, a repetition period (repetition period) of the MCCH, a fourth offset (Offset), and an MCCH modification period (Modification Period), and further includes at least one of a start boundary of the MCCH period, a first subframe (First Subframe) for scheduling the MCCH, and duration (duration) for scheduling the MCCH starting from the first subframe.

The fourth offset indicates an offset between a time domain start location of each repetition period of the MCCH and a time domain location of MCCH transmission. In a repetition period, a system frame number for scheduling the MCCH meets the following formula:

SFN3 mod($T_R$)=$O_R$, where

SFN3 is the system frame number for scheduling the MCCH, $T_R$ is the repetition period of the MCCH, $O_R$ is the fourth offset, and the fourth offset indicates the offset between the time domain start location of each repetition period of the MCCH and the time domain location of MCCH transmission.

Figure 13:
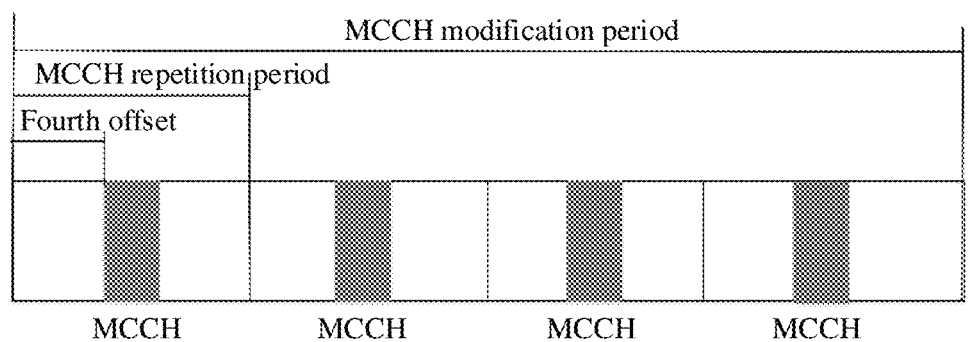
FIG. 13 is a schematic diagram of an MCCH configuration parameter relationship according to at least one embodiment.

A start system frame number of the MCCH modification period meets:

SFN4 mod($T_M$)=0, where $T_M$ is the MCCH modification period, and SFN4 is a start system frame number of the MCCH modification period. FIG. 13 is a schematic diagram of a relationship between configuration parameters of the MCCH.

Figure 15:
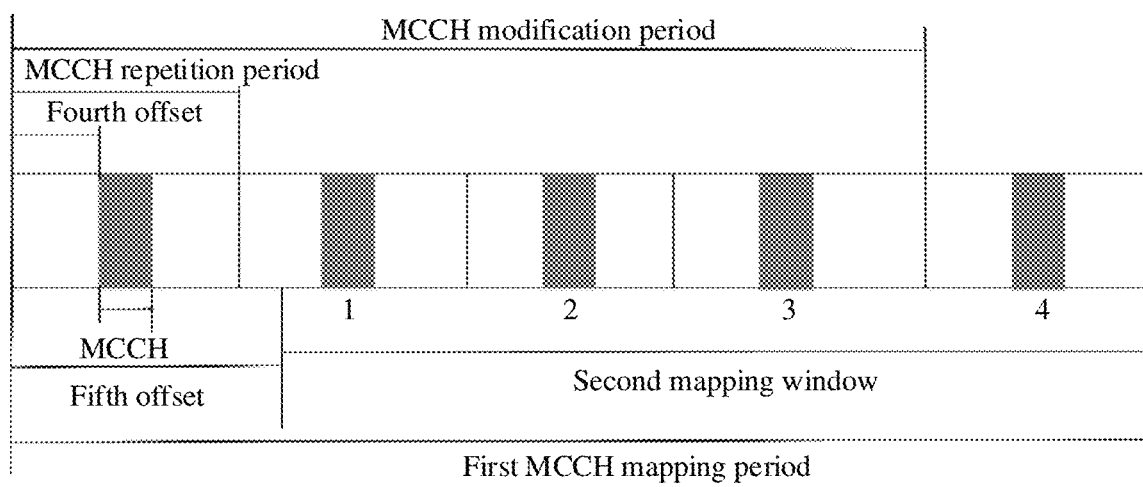
FIG. 15 is a schematic diagram of configuring an MCCH mapping period by a network device according to at least one embodiment.

Optionally, the network device configures an MCCH mapping period and a fifth offset. The MCCH mapping period is used to form a mapping relationship between a beam and a time domain transmission location of the MCCH. In other words, at the time domain transmission location of the MCCH configured in the network, a corresponding beam is used to transmit the MCCH to the terminal device. The first MCCH mapping period and the fifth offset indicate a second mapping window. Specifically, as shown in FIG. 15, the fifth offset indicates an offset between a time domain start location of the first MCCH mapping period and a time domain start location of the second mapping window, and the first MCCH mapping period is any mapping period of the MCCH. For ease of description, the following uses an MCCH transmission location to represent a time domain transmission location of the MCCH for detailed description.

S704: The network device sends at least one piece of configuration information to the terminal device, and correspondingly, the terminal device receives the at least one piece of configuration information.

Specifically, the at least one piece of configuration information indicates configuration information of an MCCH, where the configuration information of the MCCH includes a repetition period (repetition period) of the MCCH, a fourth offset (Offset), and an MCCH modification period (Modification Period), and further includes a start boundary of the MCCH period, a first subframe (First Subframe) for scheduling the MCCH, and duration (duration) for scheduling the MCCH starting from the first subframe. Optionally, the at least one piece of configuration information further indicates the MCCH mapping period and the fifth offset.

S705: Determine a mapping relationship between a plurality of beams and a plurality of MCCH transmission locations.

Figure 14:
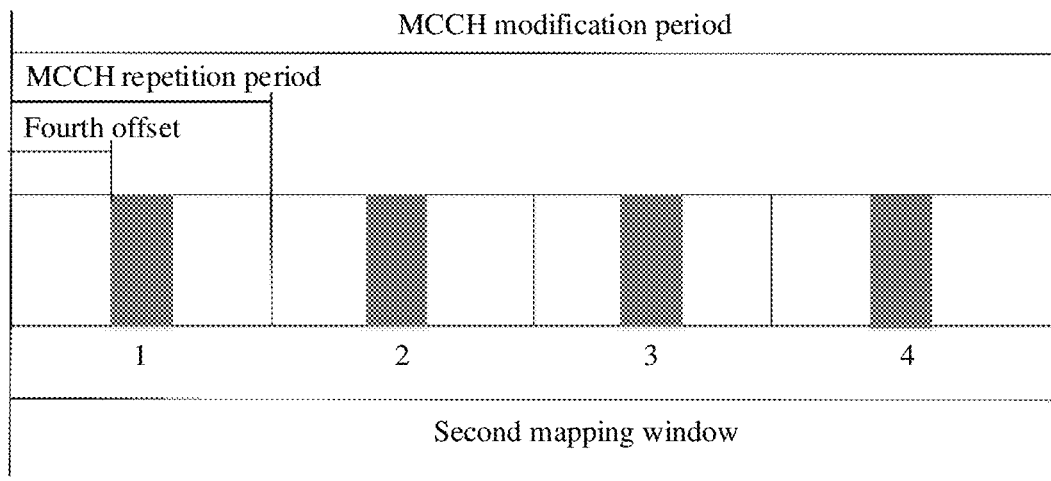
FIG. 14 is a schematic diagram in which a second mapping window is the same as an MCCH modification period according to at least one embodiment.

The mapping relationship is formed between the MCCH transmission locations and the beams in the second mapping window, and the second mapping window is duration. In an optional manner, a mapping relationship is formed between an MCCH transmission location and a beam in the MCCH modification period. In this case, the MCCH modification period is the second mapping window. In other words, the second mapping window is indicated by the MCCH modification period, and a length of the second mapping window is the MCCH modification period. FIG. 14 shows an example in which the length of the second mapping window is the MCCH modification period. In another optional implementation, a mapping relationship is formed between the MCCH transmission location and the beam in the second mapping window indicated by the first MCCH mapping period and the fifth offset.

In response to the second mapping window being indicated by the MCCH modification period, a mapping relationship is formed between a beam and an MCCH transmission location in each modification period of the MCCH. In this case, a start system frame number of the MCCH modification period meets:

$$\text{SFN4} \bmod(T_M)=0.$$

The network device and the terminal device determines a start location of the second mapping window based on the time domain start location of the MCCH modification period. The start location meets the system frame number SFN4 in the foregoing formula.

Further, based on the repetition period of the MCCH and the fourth offset that are configured by the network, the fourth offset indicates an offset between a time domain start location of each repetition period of the MCCH and a time domain location of MCCH transmission in each repetition period. A system frame number for scheduling the MCCH meets the following formula:

$$\text{SFN3} \bmod(T_R)=O_R.$$

In this case, a time domain start location of each MCCH in each repetition period is determined, that is, the system frame number SFN3 in the foregoing formula is met. In this case, for the network device, both the start location of the second mapping window and a time domain start location of each MCCH are known, and in the second mapping window, the network device forms a mapping relationship between a plurality of beams and a plurality of MCCH transmission locations in a beam sweeping manner.

In another optional manner, the network device configures an MCCH mapping period and a fifth offset. The MCCH mapping period and the fifth offset indicate the second mapping window. Specifically, the fifth offset indicates an offset between the time domain start location of the first MCCH mapping period and the time domain start location of the second mapping window in the first MCCH mapping period, and the first MCCH mapping period is any mapping period of the MCCH.

The time domain start location of the second mapping window meets a predefined rule. Optionally, the time domain start location of the second mapping window includes a system frame number of the time domain start location and a slot number of the time domain start location. The system frame number and the slot number meet a predefined rule.

Example 1: The system frame number and the slot number of the time domain start location of the second mapping window meets the following formula:

$$(\text{SFN5} \cdot N + n_{Slot5} - O_M) \bmod K_M = 0, \text{ where}$$

$K_M$ is the mapping period of the MCCH, N is a quantity of slots in a radio frame, $O_M$ is the fifth offset, SFN5 is the system frame number of the time domain start location of the second mapping window, and $n_{Slot5}$ is the slot number of the time domain start location of the second mapping window.

Example 2: The system frame number and the slot number of the time domain start of the second mapping window meets the following formula:

$$\text{SFN5} \bmod K_M = \text{floor}(O_g/N); \text{ and}$$

$$n_{Slot5} = O_m \bmod N, \text{ where}$$

$K_M$ is the mapping period of the MCCH, N is a quantity of slots in a radio frame, $O_m$ is the fifth offset, SFN5 is the system frame number of the time domain start location of the second mapping window, $n_{Slot5}$ is the slot number of the time domain start location of the second mapping window, and floor represents rounding down.

There are a plurality of MCCHs in the second mapping window, that is, a plurality of MCCH transmission locations. For the plurality of MCCH transmission locations that the plurality of beams correspond to, each of the plurality of beams and an MCCH transmission location corresponding to the plurality of beams meet a first mapping relationship, and the plurality of beams are beams sent by the network device in the cell to which the terminal device belongs, that is, the L beams described in S700. The plurality of MCCH transmission locations are MCCH transmission locations that are in the second mapping window and that are in the MCCH transmission locations.

Specifically, in configuration in any one of the foregoing manners, in the second mapping window, the plurality of beams in ascending order of index values are in a one-to-one correspondence with the plurality of MCCH transmission locations in the second mapping window in time-domain order. In response to a quantity of the plurality of MCCH transmission locations in the second mapping window being greater than a quantity of beams sent by the network device in the cell to which the terminal device belongs, in other words, in response to the quantity of the plurality of MCCH transmission locations in the second mapping window being greater than the quantity of the plurality of beams, starting from a next transmission location corresponding to completion of a round, a one-to-one correspondence starts from a beam with a smallest index value, and cycles sequentially. The one round of mapping means that the network device completes one round of beam sweeping on a premise that a plurality of beams are mapped to a plurality of MCCH transmission locations.

The foregoing steps is performed in any sequence.

S706: Determine a first MCCH transmission location corresponding to the first beam.

Specifically, the first beam and the first MCCH transmission location meet the first mapping relationship. The first MCCH transmission location is a set of MCCH transmission locations corresponding to the first beam. The first MCCH transmission location is a set of MCCH transmission locations that are located in the second mapping window and that meet the first mapping relationship with the first beam. The first MCCH is an MCCH transmission location in the first MCCH transmission location. An MCCH transmission location is referred to as a first MCCH below. For a mapping relationship that the first beam and the first MCCH transmission location in the second mapping window meet, refer to related descriptions of the first beam and the first listening occasion in the first mapping window in step S407 in FIG. 4.

The terminal device determines the first MCCH transmission location corresponding to the first beam, and receives the MCCH at the first MCCH transmission location by using the first beam. For example, in ascending order of indexes, a sequence number of the first beam in the plurality of beams is K, and the sequence number K represents a location of the first beam in the L beams. The following uses a sequence number as an example for description, and sequence numbers of a plurality of beams starts from 1. For example, in step 5701, an information indication of the at least one beam indicates that the network device actually sends three beams, and index values are 0, 2, and 3 respectively. Optionally, in the FR1 frequency band, information about the at least one beam is notified to the terminal device by using ssb-PositionsInBurst in the SIB1, and a configuration of the inOneGroup IE included in the ssb-PositionsInBurst is [1 0 1 1 0 0 0 0]. In this case, sequence numbers of the three beams are respectively 1, 2, and 3 in ascending order of beam index values. In this example, in response to the index of the first beam being 0, in this case, the sequence number of the first beam is 1.

According to time-domain order, a sequence of the first MCCH in the plurality of MCCH transmission locations is M, and M is also represented by a sequence number of the first MCCH in the plurality of MCCH transmission locations. The following uses the sequence number as an example for description. Starting from the first MCCH transmission location in time-domain order in the second mapping window, sequence numbers increase in ascending order. The start value of the sequence numbers is any natural number. Optionally, the start value of the sequence numbers is 0. Alternatively, the start value of the sequence numbers is 1. The start value of the sequence numbers is not limited herein.

For example, a sequence number of an MCCH transmission location in the second mapping window starts from 1. In response to a difference between a sequence number M of an MCCH transmission location in the second mapping window and a sequence number of a beam being a natural multiple of a quantity L of beams, the MCCH transmission location is an MCCH transmission location that meets the first mapping relationship with the beam. Specifically, for example, the beam is a first beam, and the MCCH transmission location that meets the first mapping relationship with the beam is a first MCCH transmission location. In response to a difference between the sequence number M of the MCCH transmission location in the second mapping window and the sequence number K of the first beam being a natural multiple of L (including 0 and a positive integer), the MCCH transmission location belongs to the first MCCH transmission location.

Optionally, the foregoing described first mapping relationship between the first beam and the first MCCH transmission location that are in the second mapping window is represented as:

$$M \bmod L = K, \text{ where}$$

L is the quantity of the plurality of beams sent by the network device in the cell to which the terminal device belongs, K is the sequence number of the first beam in the plurality of beams, K is a natural number from 1 to L, and K=1, 2, . . . , or L; and M is the sequence number of the first MCCH transmission location in the plurality of MCCH transmission locations. The first beam is a specific beam corresponding to the terminal device in the plurality of beams. In other words, the terminal device efficiently receives downlink information and/or efficiently sends uplink information to the network device by using the first beam.

Optionally, the foregoing described first mapping relationship between the first beam and the first MCCH transmission location that are in the second mapping window is also represented as:

The terminal device determines a quantity m of MCCH transmission locations in the second mapping window. The terminal device determines the quantity m of MCCH transmission locations in the second mapping window, that is, a total quantity of a plurality of MCCH transmission locations, based on the configuration of the repetition period of the MCCH and the length and the time domain location of the second mapping window. K is the sequence number of the first beam in the plurality of beams. In the second mapping window, an MCCH transmission location corresponding to the $K^{th}$ beam is an $(x \times L+K)^{th}$ MCCH transmission location, that is, the sequence number of the first beam in the L beams is K. In this case, the transmission location corresponding to the first beam is an $(x \times L+K)^{th}$ MCCH transmission location in the second mapping window. x=0, 1, . . . , or X−1, X=CEIL (m/L), where CEIL indicates rounding up. K=1, 2, . . . , or L, where L is a quantity of a plurality of beams, that is, a quantity of beams sent by the network device in the cell to which the terminal device belongs. K is a natural number from 1 to L, and K=1, 2, . . . , or L.

The foregoing is also expressed as follows: The first mapping relationship between the first beam and the first MCCH transmission location in the second mapping window meets $$M = x \times L + K, \text{ where}$$

M is a sequence number of the first MCCH transmission location in the plurality of MCCH transmission locations. The first beam is a specific beam corresponding to the terminal device in the plurality of beams. In other words, the terminal device efficiently receives downlink information and/or efficiently sends uplink information to the network device by using the first beam.

The formula that the first mapping relationship between the first beam and the first MCCH transmission location meets and the sequence numbers of the first beam and the first MCCH transmission location are merely examples. The formula corresponding to the first mapping relationship has a plurality of variations, and a form of the sequence number has a plurality of variations. This is not limited in embodiments described herein.

S707: The network device sends, at the first MCCH transmission location corresponding to the first beam, the MCCH to the terminal device by using the first beam. Correspondingly, the terminal device receives the MCCH at the first MCCH transmission location corresponding to the first beam.

The network device determines the time domain start location and the duration of the second mapping window based on the at least one piece of configuration information and the foregoing description. Further, the network device determines, based on the MCCH transmission location, the MCCH transmission location in the second mapping window, and the network device performs beam sweeping starting from the first MCCH transmission location in time-domain order in the second mapping window. Specifically, starting from the first MCCH transmission location in time-domain order in the second mapping window, the network device sequentially and cyclically sends, in ascending order of beam index values, the plurality of beams at each MCCH transmission location in the second mapping window in time-domain order. The method includes: The network device sends, based on the first mapping relationship, the MCCH by using the first beam on the first MCCH transmission location corresponding to the first beam.

The terminal device determines the time domain start location and the duration of the second mapping window based on the at least one piece of configuration information. Further, the terminal device determines, based on the MCCH transmission location, the plurality of MCCH transmission locations in the second mapping window. The terminal device receives, at the first MCCH transmission location based on the first mapping relationship between the first beam and the first MCCH transmission location, the MCCH transmitted by using the first beam.

Specifically, a specific beam selected by the terminal device through beam training is the first beam, and the terminal device determines, by using information about the beam indicated by ssb-PositionsInBurst, a location of the first beam in the L beams by using the index value of the first beam. The location is represented by a sequence number K of the first beam in the L beams in a beam sweeping process. The terminal device receives the MCCH at the $K^{th}$, the $(K+L)^{th}$, the $(K+2L)^{th}$, the $(K+3L)^{th}$, the $(K+4L)^{th}$ . . . MCCH transmission locations in the second mapping window in time-domain order. To save energy and improve listening efficiency of the terminal device, the terminal device chooses not to receive information at an MCCH transmission location corresponding to another beam. Further, the terminal device receives, at any one or more, or all of the first MCCH transmission locations corresponding to the first beam, the MCCH transmitted by using the first beam.

The network device configures a corresponding beam transmission resource at the MCCH transmission location based on the mapping relationship between a beam and an MCCH transmission location that is in the second mapping window. This avoids a problem that the network device configures the MCCH transmission location but does not configure, at the corresponding MCCH transmission location, a beam for transmitting the MCCH. The terminal device receives the MCCH at the target MCCH transmission location by using the target beam, thereby improving receiving efficiency.

It should be noted that an execution sequence of S700 to S707 in FIG. 7 is merely an example for description, and is not intended to limit embodiments described herein.

In the embodiments shown in FIG. 4 to FIG. 7, the network device does not configure the first offset, the third offset, the fourth offset, or the fifth offset, or the network device and the terminal device understand that all the foregoing offsets are zero. In this case, the network device does not indicate a value of the first offset, the third offset, the fourth offset, or the fifth offset to the terminal device.

Specifically, the embodiment shown in FIG. 4 is used as an example. In response to the network not configuring the first offset, that is, in step 5405, the network device sends the at least one piece of configuration information to the terminal device to indicate the mapping period of the first RNTI, the first offset does not exist, or a value of the first offset is 0. The mapping period of the first RNTI is equal to a length of a time unit defined in a communication protocol, or is a positive integer multiple of a time unit defined in the communication protocol. The time unit includes a system frame, a system subframe, a slot (slot), a mini-slot, a symbol (symbol), and the like. Optionally, a length of the mapping period of the first RNTI is a length of m system frame numbers, or a length of k slots (slot) or K symbols (symbol), where m or k is a positive integer. The value of m or k is not limited in embodiments described herein.

In response to the first offset not being configured in the network, or the value of the first offset is 0, the mapping period of the first RNTI and the start location of the first mapping window meet a predefined rule.

Optionally, the formula shown in Example 1 in step S405 is simplified as:

$(SFN \cdot N + n_{Slot}) \bmod K_g = 0.$

Optionally, the formula shown in Example 2 in step S405 is simplified as:

$SFN \bmod = 0.$

In the foregoing two formulas, $K_g$ is the mapping period of the first RNTI, N is a quantity of slots in a radio frame, SFN is the system frame number of the time domain start location of the first mapping window, and $n_{Slot}$ is the slot number of the time domain start location of the first mapping window. Based on the formula, the terminal device determines the start location of the first mapping window, determine that the mapping period of the first RNTI is the length of the first mapping window, and determine the location of the first mapping window based on the start location and the length. According to the formula, start locations of a series of first mapping windows is determined, and correspondingly, locations of a series of first mapping windows are also determined. The formula in Example 2 is used as an example. In response to Kg=16 system frames, SFN=0 to SFN=15 are one first mapping window, SFN=16 to SFN=31 are another first mapping window, and by analogy, SFN=1008 to SFN=1023 are the last first mapping window in an SFN period. The terminal device determines, in any first mapping window, a mapping between a first beam and a listening occasion that is used to listen to a first RNTI and that is in the mapping window, where the first beam is a beam of a synchronization channel SSB actually sent in a cell. The terminal device determines a first beam set used to receive the first RNTI, determines, based on the first beam set and the mapping relationship, a listening occasion of the first RNTI that is to be listened to, and listens to the first RNTI on the listening occasion of the first RNTI. For example, in response to the terminal device determining that the first RNTI corresponding to a third sent SSB beam is to be listened to, the terminal device first determines, based on the mapping relationship, a listening occasion of the first RNTI corresponding to the third SSB beam, and then listen to the first RNTI at the listening occasion location.

It should be noted that, in the foregoing one or more embodiments, in another possibility, the mapping period of the first RNTI is also predefined, and the first mapping period is predefined. The mapping period of the first RNTI is determined between the network device and the terminal device without signaling interaction. The predefined mapping period of the first RNTI is equal to a length of a time unit defined in a communication protocol, or is a positive integer multiple of a time unit defined in the communication protocol. The time unit includes a system frame, a system subframe, a slot, a mini-slot, an OFDM symbol, and the like. For example, a period of the first mapping window is the same as a length of one frame or one system subframe. For another example, the period of the first mapping window is the same as a length of one SFN period, that is, the length of the first mapping window is a length of 1024 system frames. In response to the length of the first mapping window being a length of 1024 system frames, further optionally, a start point of the first mapping window is a first system frame in ascending order of time-domain order, and the first system frame is also understood as a system frame numbered 0. Specifically, for example, the first mapping period is one system frame, and each system frame is one first mapping window. In response to being predefined that the first mapping period is 1024 system frames, each of 1024 system frames from SFN=0 to SFN=1023 is one first mapping window.

In the foregoing embodiments, the methods provided in at least one embodiment are separately described from the perspective of the network device, the terminal device, and interaction between the network device and the terminal device. To implement the functions in the method provided in at least one embodiment, the network device and the terminal device each includes a hardware structure and/or a software module, to implement the foregoing functions in a form of the hardware structure, the software module, or a combination of the hardware structure and the software module. Whether a specific function in the foregoing functions is performed by using the hardware structure, the software module, or the combination of the hardware structure and the software module depends on a specific application and a design constraint of the technical solutions.

Figure 16:
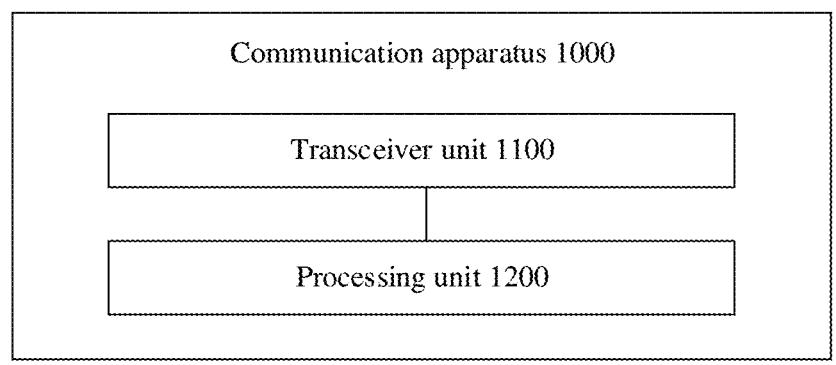
FIG. 16 is a schematic diagram of a structure of a communication apparatus according to at least one embodiment.

FIG. 16 is a schematic diagram of a structure of a communication apparatus according to at least one embodiment. The communication apparatus shown in FIG. 16 implements functions of the terminal device or the network device in the foregoing method, and therefore also implements beneficial effects of the foregoing method embodiments. In at least one embodiment, the apparatus is the network device 10 shown in FIG. 1, or is the terminal device 20, or is a module or a unit of the terminal device or the network device.

As shown in FIG. 16, a communication apparatus 1000 includes a transceiver unit 1100 and a processing unit 1200. The communication apparatus 1000 is used to implement the functions of the terminal device or the network device in the method embodiments shown in FIG. 4 to FIG. 7 above.

In an implementation, the communication apparatus 1000 corresponds to the terminal device in any one of the methods in FIG. 4 to FIG. 7. The communication apparatus 1000 is a terminal device or a chip disposed in the terminal device, and includes units configured to perform operations performed by the terminal device. In addition, the units in the communication apparatus 1000 are separately configured to implement operations performed by the terminal device in a corresponding method.

In an implementation, the communication apparatus 1000 corresponds to the network device in any one of the methods in FIG. 4 to FIG. 7. The communication apparatus 1000 is a network device or a chip disposed in the network device, and includes units configured to perform operations performed by the network device. In addition, the units in the communication apparatus 1000 are separately configured to implement operations performed by the network device in a corresponding method.

In response to the communication apparatus 1000 being used to implement the functions of the terminal device in the embodiment shown in FIG. 4, the transceiver unit 1100 is used to receive information about at least one beam, first information, and at least one piece of configuration information, for example, steps S401, S405, and S408, and/or another process of the technology described in this specification. The processing unit 1200 is used to determine a first mapping window, a first listening occasion, and information about a first beam, for example, steps S402, S406, and S407, and/or another process of the technology described in this specification.

In response to the communication apparatus 1000 being used to implement the functions of the network device in the embodiment shown in FIG. 4, the transceiver unit 1100 is used to send information about at least one beam, first information, and at least one piece of configuration information, for example, steps S401, S405, and S408, and/or another process of the technology described in this specification. The processing unit 1200 is used to determine information about at least one beam, a listening occasion of a first RNTI, a first mapping window, a mapping period of the first RNTI, and a first listening occasion, for example, S400, S403, S404, S406, and S407, and/or another process of the technology described in this specification.

In response to the communication apparatus 1000 being used to implement the functions of the terminal device in the embodiment shown in FIG. 5, the transceiver unit 1100 is used to receive information about at least one beam, first information, at least one piece of configuration information, and DRX configuration information, for example, steps S501, S504, S506, and S509, and/or another process of the technology described in this specification. The processing unit 1200 is used to determine information about a first beam, an active period of DRX, and a first listening occasion, for example, S502, S507, and S508, and/or another process of the technology described in this specification.

In response to the communication apparatus 1000 being used to implement the functions of the network device in the embodiment shown in FIG. 5, the transceiver unit 1100 is used to send information about at least one beam, first information, at least one piece of configuration information, and DRX configuration information, for example, steps S501, S504, S506, and S509, and/or another process of the technology described in this specification. The processing unit 1200 is used to determine information about at least one beam, a listening occasion of a first RNTI, a first listening occasion, and DRX, for example, S500, S503, S505, and S508, and/or another process of the technology described in this specification.

In response to the communication apparatus 1000 being used to implement the functions of the terminal device in the embodiment shown in FIG. 6, the transceiver unit 1100 is used to receive information about at least one beam, at least one piece of configuration information, and first information, for example, steps S601, S606, and S607, and/or another process of the technology described in this specification. The processing unit 1200 is used to determine information about a first beam, for example, S602 and/or another process of the technology described in this specification.

In response to the communication apparatus 1000 being used to implement the functions of the network device in the embodiment shown in FIG. 6, the transceiver unit 1100 is used to send information about at least one beam, at least one piece of configuration information, and first information, for example, steps S601, S606, and S607, and/or another process of the technology described in this specification. The processing unit 120 is used to determine information about at least one beam, a listening occasion of a first RNTI, information about a first listening occasion, and a first search space, for example, steps S600, S603, S604, and S605, and/or another process of the technology described in this specification.

In response to the communication apparatus 1000 being used to implement the functions of the terminal device in the embodiment shown in FIG. 7, the transceiver unit 1100 is used to receive information about at least one beam, at least one piece of configuration information, and an MCCH, for example, steps S701, S704, and S707, and/or another process of the technology described in this specification. The processing unit 1200 is used to determine information about a first beam and determine a first transmission location, for example, steps S702 and S706, and/or another process of the technology described in this specification.

In response to the communication apparatus 1000 being used to implement the functions of the network device in the embodiment shown in FIG. 7, the transceiver unit 1100 is used to send information about at least one beam, at least one piece of configuration information, and an MCCH, for example, steps S701, S704, and S707, and/or another process of the technology described in this specification. The processing unit 1200 is used to determine information about at least one beam, configure an MCCH, and determine a mapping relationship between a plurality of beams and a plurality of MCCH transmission locations, for example, steps S700, S703, and S705, and/or another process of the technology described in this specification.

Figure 17:
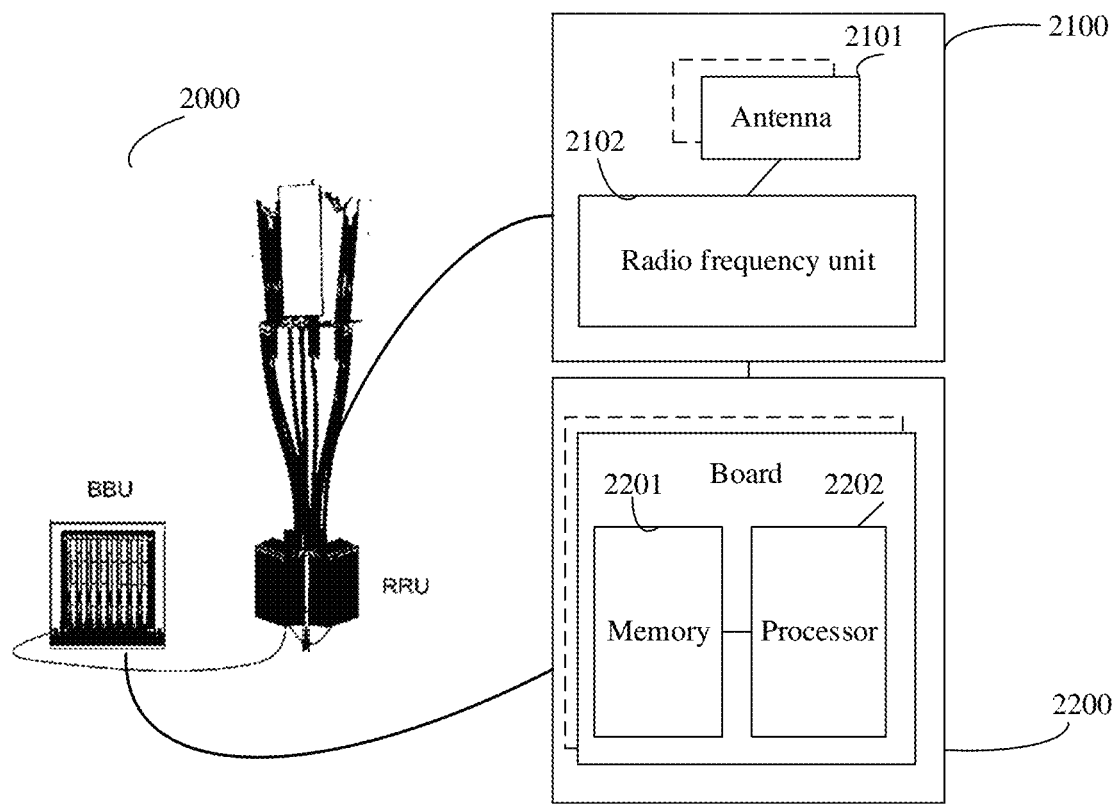
FIG. 17 is a schematic diagram of a structure of a network device according to at least one embodiment.

FIG. 17 is a schematic diagram of a structure of a network device according to at least one embodiment, for example, is a schematic diagram of a structure of a base station. The base station 2000 is used in the system shown in FIG. 1, to perform a function of the network device in the foregoing method embodiment. As shown in the figure, the base station 2000 includes one or more radio frequency units such as remote radio units (remote radio unit, RRU) 2100 and one or more baseband units (BBU) (which is also referred to as distributed units (DU)) 2200. The RRU 2100 is referred to as a transceiver unit or a communication unit, and corresponds to the transceiver unit 1100 in FIG. 16. Optionally, the transceiver unit 2100 is also referred to as a transceiver, a transceiver circuit, a transceiver, or the like, and includes at least one antenna 2101 and a radio frequency unit 2102. Optionally, the transceiver unit 2100 includes a receiving unit and a sending unit. The receiving unit corresponds to a receiver (or referred to as a receiver or a receiver circuit), and the sending unit corresponds to a transmitter (or referred to as a transmitter or a transmitter circuit). The RRU 2100 is mainly configured to send and receive radio frequency signals and perform conversion between a radio frequency signal and a baseband signal. The BBU 2200 is mainly configured to perform baseband processing, control the base station, and so on. The RRU 2100 and the BBU 2200 is physically disposed together, or is physically separated, that is, the base station is a distributed base station.

The BBU 2200 is a control center of the base station, is also referred to as a processing unit, corresponds to the processing unit 1200 in FIG. 16, and is mainly configured to implement a baseband processing function, for example, channel coding, multiplexing, modulation, or spreading. For example, the BBU (the processing unit) is configured to control the base station to perform an operation procedure related to the network device in the foregoing method embodiment.

In an example, the BBU 2200 includes one or more boards, and a plurality of boards jointly supports a radio access network (for example, an LTE network) having a single access standard, or separately supports radio access networks (for example, the LTE network, a 5G network, or another network) having different access standards. The BBU 2200 further includes a memory 2201 and a processor 2202. The memory 2201 is configured to store necessary instructions and data. The processor 2202 is configured to control the base station to perform a necessary action, for example, configured to control the base station to perform an operation procedure related to the network device in the foregoing method embodiment. The memory 2201 and the processor 2202 serves one or more boards. In other words, a memory and a processor is deployed on each board. Alternatively, a plurality of boards share a same memory and a same processor. In addition, a necessary circuit is further disposed on each board.

The base station 2000 shown in FIG. 17 implements each process related to the network device in the foregoing method embodiment. The operations or the functions of the modules in the base station 2000 are separately used to implement corresponding procedures in the foregoing method embodiment. For details, refer to the descriptions in the foregoing method embodiments. Details are not described herein again.

The BBU 2200 is configured to perform an action that is implemented inside the network device and that is described in the foregoing method embodiment, and the RRU 2100 is configured to perform an action of receiving or sending that is performed by the network device from or to the terminal device and that is described in the foregoing method embodiment. For details, refer to the descriptions in the foregoing method embodiments. Details are not described herein again.

Figure 18:
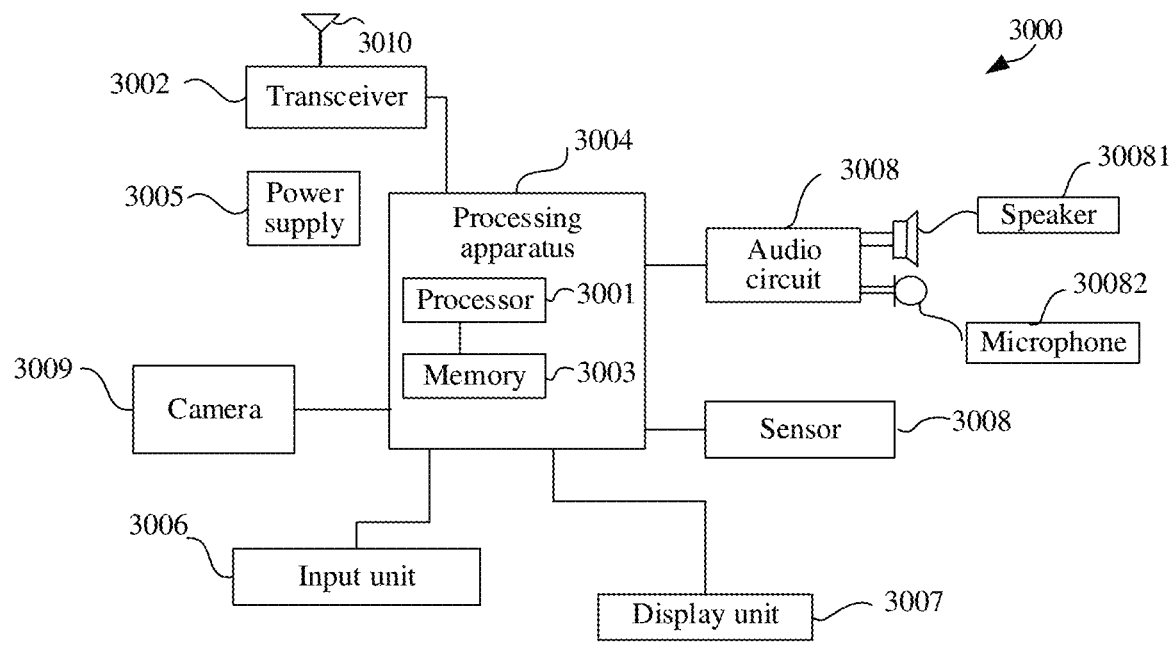
FIG. 18 is a schematic diagram of a structure of a terminal device according to at least one embodiment.

FIG. 18 is a schematic diagram of a structure of a terminal device 3000 according to at least one embodiment. As shown in the figure, the terminal device 3000 includes a processor 3001 and a transceiver 3002. Optionally, the terminal device 3000 further includes a memory 3003. The processor 3001, the transceiver 3002, and the memory 3003 communicates with each other through an internal connection path, and transfer a control signal and/or a data signal. The memory 3003 is configured to store a computer program. The processor 3001 is configured to: invoke the computer program from the memory 3003 and run the computer program, to control the transceiver 3002 to send and receive a signal.

The processor 3001 and the memory 3003 is integrated into one processing apparatus 3004. The processor 3001 is configured to execute program code stored in the memory 3003 to implement the foregoing functions. The processing apparatus 3004 shown in the figure is merely an example. During specific implementation, the memory 3003 is alternatively integrated into the processor 3001, or is independent of the processor 3001. This is not limited in embodiments described herein.

The terminal device 3000 further includes an antenna 3010, configured to send, by using a radio signal, uplink data or uplink control signaling output by the transceiver 3002.

It should be understood that, the terminal device 3000 shown in FIG. 18 implements each process related to the terminal device in the foregoing method embodiment. Operations or functions of the modules in the terminal device 3000 are respectively intended to implement corresponding procedures in the foregoing method embodiment. For details, refer to the descriptions in the foregoing method embodiments. Details are not described herein again.

Optionally, the terminal device 3000 further includes a power supply 3005, configured to supply power to various components or circuits in the terminal device.

In addition, to make functions of the terminal device more perfect, the terminal device 3000 further includes one or more of an input unit 3006, a display unit 3007, an audio circuit 3008, a camera 3009, a sensor 3008, and the like, and the audio circuit further includes a speaker 30081, a microphone 30082, and the like.

It should be understood that the processing apparatus is a chip. For example, the processing apparatus is a field programmable gate array (field programmable gate array, FPGA), is a general-purpose processor, a digital signal processor (digital signal processor, DSP), an application-specific integrated circuit (application-specific integrated circuit, ASIC), the field programmable gate array (field programmable gate array, FPGA), another programmable logic device, a discrete gate, a transistor logic device, or a discrete hardware component, is a system on chip (system on chip, SoC), is a central processing unit (central processing unit, CPU), is a network processor (network processor, NP), is a digital signal processing circuit (digital signal processor, DSP), is a micro controller unit (micro controller unit, MCU), or is a programmable controller (programmable logic device, PLD) or another integrated chip. The processor implements or performs the methods, steps, and logical block diagrams that are disclosed in at least one embodiment. The general-purpose processor is a microprocessor, or the processor is any conventional processor or the like. The steps in the methods disclosed with reference to at least one embodiment is directly performed and completed by a hardware decoding processor, or is performed and completed by using a combination of hardware in the decoding processor and a software module. The software module is located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

At least one embodiment further provides a computer program product. The computer program product includes computer program code. In response to the computer program code being run on a computer, the computer is enabled to perform the method performed by the terminal device or the network device in any one of the foregoing method embodiments.

At least one embodiment further provides a computer-readable medium. The computer-readable medium stores program code. In response to the program code being run on a computer, the computer is enabled to perform the method performed by the network device or the terminal device in the foregoing method embodiment.

At least one embodiment further provides a processing apparatus, including at least one processor and an interface, where the at least one processor is configured to perform the method performed by the terminal device or the network device involved in any one of the foregoing method embodiments.

All or some of the foregoing embodiments is implemented by using software, hardware, firmware, or any combination thereof. In response to software being used to implement the embodiments, all or a part of the embodiments is implemented in a form of a computer program product. The computer program product includes one or more computer programs or instructions. In response to the computer programs or the instructions being loaded and executed on a computer, the procedures or the functions according to at least one embodiment are all or partially implemented. The computer is a general-purpose computer, a dedicated computer, a computer network, or other programmable apparatuses. The computer programs or the instructions is stored in a computer-readable storage medium, or is transmitted by using the computer-readable storage medium. The computer-readable storage medium is any usable medium accessible by the computer, or a data storage device such as a server integrating one or more usable media. The usable medium is a magnetic medium, for example, a floppy disk, a hard disk drive, or a magnetic tape; or is an optical medium, for example, a DVD; or is a semiconductor medium, for example, a solid state disk (solid state disk, SSD).

In at least one embodiment, unless otherwise stated or there is a logic conflict, terms and/or descriptions between different embodiments are consistent and is mutually referenced, and technical features in different embodiments is combined based on an internal logical relationship thereof, to form a new embodiment.

An embodiment of the present invention further provides a communication system, including at least one access network device and at least one communication apparatus for executing embodiments of the present invention.

It should be understood that sequence numbers of the foregoing processes do not mean execution sequences in embodiments of the present invention. The execution sequences of the processes should be determined according to functions and internal logic of the processes, and should not be construed as any limitation on the implementation processes of embodiments of the present invention.

It should be understood that, in various embodiments of the present invention, the terminal device and/or the network device performs some or all of the steps in at least one embodiment. The steps or operations are merely examples. In at least one embodiment, other operations or variations of various operations is further performed. In addition, the steps is performed in a sequence different from a sequence presented in at least one embodiment, and not all operations in at least one embodiment is performed.

It should be understood that, an "embodiment" mentioned throughout this specification means that particular features, structures, or characteristics related to this embodiment are included in at least one embodiment. Therefore, embodiments in the entire specification do not necessarily refer to a same embodiment. In addition, these particular features, structures, or characteristics is combined in one or more embodiments in any appropriate manner.

The objectives, technical solutions, and beneficial effects of the present invention are further described in detail in the foregoing specific implementations. The foregoing descriptions are merely specific implementations of the present invention, but are not intended to limit the protection scope of the present invention. Any modification, equivalent replacement, or improvement made based on the technical solutions of the present invention shall fall within the protection scope of the present invention.

The foregoing mainly describes the solutions provided in embodiments of the present invention from a perspective of interaction between network elements. To implement the foregoing functions, the network elements such as the communication apparatus and the radio access network device include a corresponding hardware structure and/or software module for performing each of the functions. A person skilled in the art should easily be aware that, in combination with the units and algorithm steps in the examples described in embodiments disclosed in this specification, the present invention is implemented by hardware or a combination of hardware and computer software. Whether a function is performed by hardware or hardware driven by computer software depends on a particular embodiment and a design constraint of the technical solutions. A person skilled in the art is able to use different methods to implement the described functions for each particular embodiment, but the implementation does not go beyond the scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information sending method, wherein the method comprises:

determining a first mapping period of a group radio network temporary identifier, G-RNTI, wherein a first mapping relationship between a first beam and a first listening occasion is established in the first mapping period; and sending first information to a terminal device on a first listening occasion corresponding to the first beam by using the first beam, wherein the first beam and the first listening occasion that is in the first mapping period of the G-RNTI meet the first mapping relationship, wherein the first information is scrambled by using the G-RNTI, the first information includes control information, the control information is used to schedule a group of terminal devices to receive multicast broadcast service, MBS.

2. The method according to claim 1, wherein the method further comprises:

sending at least one piece of configuration information to the terminal device, wherein the at least one piece of configuration information indicates at least one of a first offset or the mapping period of the G-RNTI, the plurality of listening occasions are located in a first mapping window that is in the first mapping period and that is indicated by the first offset and the mapping period of the G-RNTI, and the plurality of listening occasions includes the first listening occasion.

3. The method according to claim 2, wherein there are a plurality of listening occasions corresponding to a plurality of beams in the first mapping window, the $1^{st}$ listening occasion in time domain of the plurality of listening occasions is an earliest listening occasion in time domain within the first mapping window.

4. The method according to claim 3, wherein a time domain start location of the first mapping window is determined based on the mapping period of the G-RNTI and the first offset.

5. The method according to claim 3, wherein a system frame number of the time domain start location and a slot number of the time domain start location of the time domain start location of the first mapping window meet the following rule:

$$(SFN \cdot N + n_{Slot} - O_g) \bmod K_g = 0, \text{ wherein}$$

$K_g$ is the mapping period of the G-RNTI;
N is a quantity of slots in a radio frame;
$O_g$ is the first offset;
SFN is the system frame number of the time domain start location of the first mapping window; and
$n_{Slot}$ is the slot number of the time domain start location of the first mapping window.

6. An information receiving method, wherein the method comprises:

determining a first mapping period of a group radio network temporary identifier, G-RNTI, wherein a first mapping relationship between a first beam and a first listening occasion is established in the first mapping period; and receiving first information from a network device on the first listening occasion corresponding to the first beam by using the first beam, wherein the first beam and the first listening occasion that is in the first mapping period of the G-RNTI meet the first mapping relationship, wherein the first information is scrambled by using the G-RNTI, the first information includes control information, the control information is used to schedule a group of terminal devices to receive multicast broadcast service, MBS.

7. The method according to claim 6, wherein the method further comprises:

receiving at least one piece of configuration information from the network device, wherein the at least one piece of configuration information indicates at least one of a first offset or the mapping period of the G-RNTI, the plurality of listening occasions are located in a first mapping window that is in the first mapping period and that is indicated by the first offset and the mapping period of the G-RNTI, and the plurality of listening occasions includes the first listening occasion.

8. The method according to claim 7, wherein there are a plurality of listening occasions corresponding to a plurality of beams in the first mapping window, the $1^{st}$ listening occasion in time domain of the plurality of listening occasions is an earliest listening occasion in time domain within the first mapping window.

9. The method according to claim 7, wherein a time domain start location of the first mapping window is determined based on the mapping period of the G-RNTI and the first offset.

10. The method according to claim 7, wherein a system frame number of the time domain start location and a slot number of the time domain start location of the time domain start location of the first mapping window meet the following rule:

$$(SFN \cdot N + n_{Slot} - O_g) \bmod K_g = 0, \text{ wherein}$$

$K_g$ is the mapping period of the G-RNTI;
N is a quantity of slots in a radio frame;
$O_g$ is the first offset;
SFN is the system frame number of the time domain start location of the first mapping window; and
$n_{Slot}$ is the slot number of the time domain start location of the first mapping window.

11. A wireless apparatus, comprising:
one or more processors; and
a memory, wherein the memory stores a computer program, and in response to executing the computer program stored in the memory, the one or more processors executes operations including:

determining a first mapping period of a group radio network temporary identifier, G-RNTI, wherein a first mapping relationship between a first beam and a first listening occasion is established in the first mapping period; and sending first information to a terminal device on the first listening occasion corresponding to the first beam by using the first beam, wherein the first beam and the first listening occasion that is in the first mapping period of the G-RNTI meet the first mapping relationship, wherein the first information is scrambled by using the G-RNTI, the first information includes control information, the control information is used to schedule a group of terminal devices to receive multicast broadcast service, MBS.

12. The apparatus according to claim 11, wherein the one or more processors is configured to execute operations including:
sending at least one piece of configuration information to the terminal device, wherein the at least one piece of configuration information indicates at least one of a first offset or the mapping period of the G-RNTI, the plurality of listening occasions are located in a first mapping window that is in the first mapping period and that is indicated by the first offset and the mapping period of the G-RNTI, and the plurality of listening occasions includes the first listening occasion.

13. The apparatus according to claim 12, wherein there are a plurality of listening occasions corresponding to a plurality of beams in the first mapping window, the $1^{st}$ listening occasion in time domain of the plurality of listening occasions is an earliest listening occasion in time domain within the first mapping window.

14. The apparatus according to claim 13, wherein a time domain start location of the first mapping window is determined based on the mapping period of the G-RNTI and the first offset.

15. The apparatus according to claim 13, wherein a system frame number of the time domain start location and a slot number of the time domain start location of the time domain start location of the first mapping window meet the following rule:

$(SFN \cdot N + n_{Slot} - O_g) \bmod K_g = 0$, wherein $K_g$ is the mapping period of the G-RNTI;
N is a quantity of slots in a radio frame;
$O_g$ is the first offset;
SFN is the system frame number of the time domain start location of the first mapping window; and
$n_{Slot}$ is the slot number of the time domain start location of the first mapping window.

16. A wireless apparatus, comprising:
one or more processors; and
a memory, wherein the memory stores a computer program, and in response to executing the computer program stored in the memory, the one or more processors executes operations including:
determining a first mapping period of a group radio network temporary identifier, G-RNTI, wherein a first mapping relationship between a first beam and a first listening occasion is established in the first mapping period; and
receiving first information from a network device on the first listening occasion corresponding to the first beam by using the first beam, wherein the first beam and the first listening occasion that is in the first mapping period of the G-RNTI meet the first mapping relationship, wherein
the first information is scrambled by using the G-RNTI, the first information includes control information, the control information is used to schedule a group of terminal devices to receive multicast broadcast service, MBS.

17. The apparatus according to claim 16, wherein the one or more processors are configured to execute operations including:
receiving at least one piece of configuration information from the network device, wherein the at least one piece of configuration information indicates at least one of a first offset or the mapping period of the G-RNTI, the plurality of listening occasions are located in a first mapping window that is in the first mapping period and that is indicated by the first offset and the mapping period of the G-RNTI, and the plurality of listening occasions includes the first listening occasion.

18. The apparatus according to claim 17, wherein there are a plurality of listening occasions corresponding to a plurality of beams in the first mapping window, the $1^{st}$ listening occasion in time domain of the plurality of listening occasions is an earliest listening occasion in time domain within the first mapping window.

19. The apparatus according to claim 17, wherein a time domain start location of the first mapping window is determined based on the mapping period of the G-RNTI and the first offset.

20. The apparatus according to claim 17, wherein a system frame number of the time domain start location and a slot number of the time domain start location of the time domain start location of the first mapping window meet the following rule:

$(SFN \cdot N + n_{Slot} - O_g) \bmod K_g = 0$, wherein $K_g$ is the mapping period of the G-RNTI;
N is a quantity of slots in a radio frame;
$O_g$ is the first offset;
SFN is the system frame number of the time domain start location of the first mapping window; and
$n_{Slot}$ is the slot number of the time domain start location of the first mapping window.

* * * * *